(12) United States Patent
Marusi et al.

(10) Patent No.: US 8,670,750 B2
(45) Date of Patent: Mar. 11, 2014

(54) SYSTEM AND METHOD FOR ACCESSING MULTI-MEDIA CONTENT VIA A MOBILE TERMINAL

(75) Inventors: Julien Marusi, Marseilles (FR); Franck Charrier, Allauch (FR)

(73) Assignee: Watchever Group, Levallois Perret (FR)

( * ) Notice: Subject to any disclaimer, the term of this patent is extended or adjusted under 35 U.S.C. 154(b) by 287 days.

(21) Appl. No.: 13/125,757

(22) PCT Filed: Oct. 15, 2009

(86) PCT No.: PCT/EP2009/007401
§ 371 (c)(1),
(2), (4) Date: Jul. 19, 2011

(87) PCT Pub. No.: WO2010/046054
PCT Pub. Date: Apr. 29, 2010

(65) Prior Publication Data
US 2011/0269437 A1    Nov. 3, 2011

(30) Foreign Application Priority Data
Oct. 22, 2008  (EP) ..................... 08290993

(51) Int. Cl.
*H04M 1/725*  (2006.01)
*H04M 3/42*   (2006.01)

(52) U.S. Cl.
USPC .................... 455/412.1; 455/414.1

(58) Field of Classification Search
USPC ........................... 455/412.1, 414.1
See application file for complete search history.

(56) References Cited

U.S. PATENT DOCUMENTS 7,200,633 B2 *  4/2007  Sekiguchi et al. ............ 709/203
7,200,680 B2 *  4/2007  Evans et al. ................... 709/246
(Continued)

FOREIGN PATENT DOCUMENTS

| GB | 2 433 138 | 6/2007 |
| WO | WO-01/26409 | 4/2001 |

OTHER PUBLICATIONS

Maheshwari, A., et al. (2002). "TranSquid: Transcoding and Caching Proxy for Heterogenous E-Commerce Environments," Research Issues in Data Engineering: Engineering e-Commerce/ e-Business Systems, 2002. Ride-2EC 2002. Proceedings. Twelfth International Workshop on San Jose, CA, USA, *IEEE Comput. Soc, US.* :50-59.

(Continued)

*Primary Examiner* — Wesley Kim
(74) *Attorney, Agent, or Firm* — Morrison & Foerster LLP

(57) ABSTRACT

A system for accessing multi-media content is provided, which is adapted to be accessed by a mobile terminal through a radio net work. The system comprises storage means adapted to store a plurality of multi-media content files having different digital formats. The system further comprises a mobile terminal characterizing unit, which is adapted to provide mobile terminal capabilities information indicating at least one capability of the mobile terminal, and a matching unit, which is adapted to identify a subset of the plurality of multi-media content files having at least one specific digital format wherein the at least one specific digital format is supported by the at least one capability of the mobile terminal, wherein the system is adapted to provide the subject of the plurality of multi-media content files having the at least one supported digital format to the mobile terminal. The mobile terminal characterizing unit is further adapted to receive terminal identification information from the mobile terminal and to provide the terminal capabilities information based on the terminal identification information, and wherein the matching unit is further adapted to identify the subset of the plurality of multi-media content files based on the terminal capabilities information.

10 Claims, 19 Drawing Sheets

(56) References Cited

U.S. PATENT DOCUMENTS

| | | | |
|---|---|---|---|
| 2005/0014531 A1* | 1/2005 | Findikli | 455/557 |
| 2005/0128956 A1 | 6/2005 | Hsu et al. | |
| 2005/0251848 A1* | 11/2005 | Al-Janabi | 725/135 |
| 2008/0310825 A1* | 12/2008 | Fang et al. | 386/124 |

OTHER PUBLICATIONS

International Search Report and Written Opinion mailed Nov. 20, 2009, directed to counterpart International Application No. PCT/EP2009/007401; 14 pages.

* cited by examiner

SYSTEM AND METHOD FOR ACCESSING MULTI-MEDIA CONTENT VIA A MOBILE TERMINAL

REFERENCE TO RELATED APPLICATIONS

This application is a national stage application under 35 USC 371 of International Application No. PCT/EP2009/007401, filed Oct. 15, 2009, which claims the priority of European Application No. 08290993.8, filed Oct. 22, 2008, the contents of which prior applications are incorporated herein by reference.

FIELD OF THE INVENTION

The present invention relates to a system for providing multi-media content and in particular to a system for accessing multi-media content, wherein the system is accessible by a mobile terminal through a radio network and provides a subset of the multi-media content which has a digital format supported by the mobile terminal.

BACKGROUND OF THE INVENTION

Mobile terminals comprise, for example, cellular phones and smart phones which are wide spread today and which are still developing very fast. These mobile phones allow the users to communicate via a radio network, for example cellular networks such as GSM and UMTS, the access to which is given by a network operator. While mobile phones in a first approach provide the users with audio communication, lots of mobile terminals are nowadays equipped with a more or less large screen allowing pictures and even videos to be displayed and often they are equipped with a photo camera as well. Additionally, mobile phones give access to the internet, which is a fixed communication network primarily allowing the interconnection of fixed digital communication units, e.g. personal computers. The Internet, and more precisely the World Wide Web, gives access to a multitude of websites. A website is collection of so called web pages and web applications hosted on one or more web servers. The website is connected to the internet and can be accessed by a URL (uniform resource locator), which is a digital address to the website. The user interface for accessing the website via the Internet is called web browser. A web browser is a software application that enables a user to display and interact with text, images, videos, music and other information typically located on web pages at a website on the internet or a local area network (LAN).

Mobile phones access the fixed communication network and the websites via a radio interface. A popular interface uses the wireless application protocol (WAP). WAP is an open international standard for applications that use wireless communication. It allows the internet to be accessed from a mobile terminal or device, for example a mobile phone or PDA. A so called WAP browser provides all of the basic services of a computer-based web browser but is designed to operate within the restrictions of a mobile device, such as its smaller screen size. Via the WAP browser so called WAP pages can be downloaded from a website and displayed on the mobile phone. WAP pages are typically written in, or dynamically converted to wireless markup language (WML). However, a conventional WAP browser can also display pages composed e.g. by XHTML or CHTML. As the bandwidth of the radio interface increases with new technologies more and more protocols and computer languages are also implemented in the WAP browsers which are already used in the world wide web. In the following the terms "WAP page" and "WAP pages" are synonymously used with pages statically or dynamically composed by XHTML, CHTML, etc.

Especially the young generation likes to individualize their phones with a special ring tone or original wallpaper. They interchange photos taken by themselves and download videos, full tracks (music songs) and so called video or computer games onto their mobile terminals. Multi-media content like ring tones, wallpapers, videos, video games and full tracks are provided by multi-media content providers, for example, via websites on the internet. This content is usually protected by a digital rights management system, i.e. the content is encrypted to prevent copying. While the communication via a radio network is highly standardized, the multi-media content is provided under a multitude of different digital formats and sub-formats such as MP3, WMA, WAV, OGG, VOX, MPC, AVI, JPEG, PNG, GIF, TIF, WMV, 3GP, MPEG, TIVX, ASF, HTML, XML, WML, etc which are not always compatible with each other and the constructors of phones must limit their phones to a small number of supported formats due to technical constraints. Thus, there is an incompatibility between systems providing content and mobile terminals as well as between different mobile terminals.

A user who wants to download multi-media content onto his mobile telephone must therefore make sure that the digital format, in which the multi-media content is provided, corresponds to the formats supported by his mobile. Often, the user does not know the supported formats and the technical information given in the handbook of the mobile terminal may be insufficient.

Content providers which offer multi-media content on such websites, also called portals, used to give a list of mobile phones which support the proposed content, i.e., which are compatible with the system. This does not solve the problem of incompatibility and not all users know the exact model they have, because the formats supported sometimes vary for the same model according to the version, i.e. the last software upgrade of the actual phone. Therefore, it happens quite often that multi-media content is bought by a user but cannot be displayed at the phone. It is also disappointing for the user to see an interesting content proposed and not being able to load it even after looking it up in a list. Additionally, there are still new digital formats arriving and new mobile telephone models with new features, so that these lists are not always up-to-date.

Network operators sometimes give access to multi-media content via their own website and, as they support only a limited number of phones, they try to make sure that the multi-media content proposed is compatible with these phones. Again, this does not solve the problem of incompatibility but helps only to bring together only compatible terminals with the system. This is of course not satisfactory as the user is limited in number of content and because the user is bound to his operator.

The probably most frequently used method is "trial and error", i.e. uploading content which is afterwards not visible on the screen or which is not audible, in the case of a ring tone. This is a very frustrating and expensive solution for the user.

SUMMARY OF THE INVENTION

It is an object of the present invention to provide a system and a method which are adapted to provide multi-media content to a user of a mobile terminal wherein the compatibility problems between the multi-media content and the formats supported by his mobile terminal are reduced.

It is an aspect of the invention to provide a system and methods which automatically adapt themselves to the mobile terminal accessing the system.

It is a further aspect of the invention to provide a system and methods which provide every individual user with a satisfactory access for choosing and downloading multi-media content independently of the mobile terminal used.

It is another aspect of the invention to provide a system and methods for accessing, choosing and uploading multi-media content via a mobile terminal, which allows access to multi-media content independently of the mobile used for accessing and also independently from the network operator.

It is still another aspect of the invention to provide a system and methods which allow an exchange of multi-media content files between or through different, incompatible mobile terminals.

It is yet another aspect of the present invention to provide an efficient way of providing information to mobile terminal, which is compatible with the mobile terminal.

The above object and other problems are solved by the subject matter of the independent claims. Advantageous embodiments of the invention are subject matters of the dependent claims.

One aspect of the invention is to provide a system for accessing multi-media content. The system is adapted to be accessed by a mobile terminal through a radio network. The system comprises storage means adapted to store a plurality of multi-media content files having different digital formats. The system further comprises a mobile terminal characterizing unit, which is adapted to provide mobile terminal capabilities information indicating at least one capability of the mobile terminal, and a matching unit, which is adapted to identify a subset of the plurality of multi-media content files having at least one specific digital format wherein the at least one specific digital format is supported by the at least one capability of the mobile terminal, wherein the system is adapted to provide the subset of the plurality of multi-media content files having the at least one supported digital format to the mobile terminal.

In a preferred embodiment, the mobile terminal characterizing unit is further adapted to receive terminal identification information from the mobile terminal and to provide the terminal capabilities information based on the terminal identification information, and wherein the matching unit is further adapted to identify the subset of the plurality of multi-media content files based on the terminal capabilities information.

Preferably, the mobile terminal characterizing unit further comprises a database, wherein the terminal capabilities information is stored, and wherein the mobile terminal characterizing unit is further adapted to get the terminal capabilities information from the database corresponding to the terminal identification information. Alternatively, the terminal capabilities information is comprised in the terminal identification information.

Furthermore, in the preferred embodiment the terminal capabilities information is a bit key of a specific length and the storage means are further adapted to store multi-media format information corresponding to each of the plurality of multi-media content files. Moreover, the matching unit is further adapted to identify the subset of multi-media content files by comparing the bit key with the multi-media format information. Additionally, the system further comprises receiving and transmitting means for receiving a request from the mobile terminal for specific multi-media content files, wherein the matching unit is further adapted to give the mobile terminal access only to a subset of the specific multi-media content files which have the at least one supported digital format. Alternatively, the system is adapted to provide no access to multi-media content files having digital formats which are not supported by the at least one capability of the mobile terminal.

According to a further aspect of the preferred embodiment the mobile terminal characterizing unit is further adapted to identify a type and/or a model of the mobile terminal accessing the system based on the terminal identification information and to retrieve the terminal capabilities information from the database based on the identified type and/or model of the mobile terminal. Furthermore, the bit key can have a length of 256 bits and specific bit positions of the bit key represent specific capabilities of the identified type and/or model of the mobile terminal, wherein the multi-media format information has a length of 256 bits and specific bit positions of the multi-media format information correspond to specific digital formats, and wherein a specific digital format supported by a specific capability has the same bit position in the multi-media format information as the specific capability in the bit key.

Another aspect of the invention is to provide a method for accessing multi-media content by a mobile terminal through a radio network. The method comprises the step of storing a plurality of multi-media content files having different digital formats. Moreover, the method comprises the steps of providing mobile terminal capabilities information indicating at least one capability of the mobile terminal, identifying a subset of the plurality of multi-media content files having at least one specific digital format wherein the at least one specific digital format is supported by the at least one capability of the mobile terminal and providing the subset of the plurality of multi-media content files having the at least one supported digital format to the mobile terminal.

According to a preferred embodiment of the method the step of providing mobile terminal capabilities information comprises the sub step of receiving terminal identification information from the mobile terminal, wherein the terminal capabilities information is provided based on the terminal identification information, and wherein the subset of the plurality of multi-media content files is identified based on the terminal capabilities information. The terminal capabilities information is stored in a database, and wherein the terminal capabilities information is received from the database corresponding to the terminal identification information. Alternatively, the terminal capabilities information is comprised in the terminal identification information.

Furthermore, the terminal capabilities information can be a bit key of a specific length and the multi-media format information corresponding to each of the plurality of multi-media content files is stored e.g. in a database in relation to the plurality of multi-media content files. The subset of multi-media content files is identified by comparing the bit key with the multi-media format information.

Additionally, features of the above mentioned preferred embodiment of the system can be further included in the preferred embodiment of the method according to the invention.

In another preferred embodiment a further system for accessing multi-media content is provided. The system is adapted to be accessed by a mobile terminal through a radio network and comprises a database adapted to store multi-media content files in a plurality of different digital formats. The radio network may be a cellular network, for example GSM or UMTS. A mobile terminal characterizing unit is adapted to receive identification information from the mobile terminal indicating capabilities of the mobile terminal. A matching unit is provided, which is adapted to match digital formats supported by the capabilities of the mobile terminal with the digital formats of the multi-media content files. Further, the system is adapted to provide information to the mobile terminal based on a result of the match performed by the matching unit. In other words, the matching unit is adapted to match the digital formats which are supported by the identified mobile terminal with the digital formats in which the multi-media content is available. Thus, the mobile terminal is given access only to content which is available in a digital format which is supported by the mobile terminal.

The system comprises at least one database in which a multitude of multi-media content files is stored in different digital formats. The database may get its content from several other databases. For each content file in the database the information is stored, in which digital format the content is available. The mobile terminal characterizing unit may be adapted to identify the mobile terminal model which accesses the system. The mobile terminal characterizing unit may also be further adapted to retrieve information from at least one data source and preferably from a plurality of data sources about the digital multi-media formats supported by each of the mobile terminals communicating in the radio network via which the terminals access the system. The characterizing unit may be further adapted to store the information retrieved.

In preferred embodiments the database comprises a first database in which multi-media content is stored in one or more digital formats as delivered by a content provider. In general, the content in the first database will be protected against unauthorized reproduction by encryption and comprise, for example, full tracks, ring tones, SMS alerts, videos, graphics and so on. A second database is also preferably provided, which is adapted to receive multi-media content files via the radio communication network or a fixed communication network. Thus, users may upload private content files from their mobiles or personal computers. These personal content files, for example, photos taken by the mobile, digital photos stored on the hard disk of a personal computer or other contents may be not protected by digital right managements.

When the system is provided with a second database for private multi-media content, the system preferably further comprises a transcoding cluster, which is adapted to transcode every uploaded private content file into all digital formats known by the mobile terminal characterizing unit. In this way, for example, a private photo taken by a digital camera in a first digital format is first uploaded to the system and then transformed or transcoded into all available digital formats and thus also into the digital format of the mobile of the user so he can transmit his photo to his phone. As the multi-media content files contained in the second database are not encrypted, transcoding is possible. In a preferred embodiment the transcoding cluster is adapted to scan continuously whether there is new content uploaded and to immediately start transcoding when new content is available. In the most preferred embodiment, a plurality of files of multi-media content can be transcoded in parallel by cloning the transcoding program automatically.

Preferably, the mobile terminal characterizing unit and the first database with multi-media content store the information about the digital multi-media formats in a true/false manner.

In the most preferred system, the mobile terminal characterizing unit is adapted to store the digital multi-media format information into a first bit field and the first database is adapted to store the digital multi-media format information into a second bit field, wherein the first and the second bit fields have the same predefined length and structure. The two bit fields may each be 256 bits long, for example, so that 256 different digital multi-media formats can be stored by marking, for example, in the first bit field a "1" for a digital format supported by the mobile terminal. Furthermore, a "1" can also be marked in the second bit field for the multi-media content available in this digital format. The matching unit can then be adapted to compare the first bit field with the second bit field for matching the digital formats. If the two bit fields are structured in the same manner and contain all information about all digital formats an almost instantaneous verification is possible, whether the multi-media content can be visualized, played or heard with the mobile terminal in question, i.e. the mobile terminal accessing the system. This compatibility test is done in one step and is extremely rapid. Preferably, the mobile terminal characterizing unit further stores other information about the telephone as screen size, supported colors, support of wallpapers and other features.

However, the bit fields, or at least one of the bit fields may be used in a different manner. For example, only a fragment or a part of the bit field may be used. Only specific bits of a bit field may be evaluated. The most significant bit (MSB) of a bit field or a fragment of a bit field may be evaluated by comparing the bit field of the respective fragment to a threshold value. The least significant bit (LSB) of bit field or a fragment may be evaluated by determining whether it is even or odd. The bit field may be represented in another format, as for example, hexadecimal or it may be filtered and evaluated thereafter. A portion of the bit field or the whole bit field may be extended for adding new formats in which the multi-media content should be available. Furthermore, a pointer may be set, so as to determine, which part of the bit field is to be used.

In the preferred system, a dedicated storage area is provided for each user who is identified by his mobile terminal. The user can transfer content files or rather a link to a content file, from any of the databases into his dedicated storage area, where this transferred content may remain stored for an unlimited time. In the state of the art, a user who purchases for example a ring tone or a full track cannot preserve it outside of the mobile terminal. With a change of his terminal he loses his uploads. This is prevented with the dedicated storage area from which he can reload his ring tone after a change of terminal. Multi-media content which is stored in this dedicated storage area may even be shared with other users known to the user, as far as this is allowed by the digital right management. In this case, for example an SMS message will be sent to the friend user communicating an address from which the friend user can upload the shared content.

In a preferred embodiment the system is a website on the internet for accessing multi-media content via a mobile terminal using a WAP interface. The website comprises a graphical user-system interface with a central page and a plurality of WAP trees, i.e. one or more subsets of one or more WAP pages, each WAP tree being accessible via a different address URL, wherein the central page comprises a dispatcher which is adapted to recognize the network operator and to direct the mobile terminal to the WAP tree specific for the recognized operator. Preferably, the website comprises a reference page which is adapted to provide a complete menu of the possible functions. Each WAP tree is adapted to inherit or to load the menu from the reference page unless there are changes to a menu that points specifically to this WAP tree.

Preferably, the functions are in a modular form so that it is possible to easily add new functions. The WAP trees, which are the set or subset of WAP pages visible to the user, inherit functions newly added to the reference page automatically. Using a reference page from which all WAP pages inherit or load their functions allows a new WAP tree to be created, that is a new WAP page for example for another network operator, who may operate in a different country with a different language or with other cultural habits, in a short time. This very fast adaptation is possible because this new WAP page, i.e. this new graphical interface, will inherit all functions already created in the reference page.

In a preferred embodiment, the website comprises a structure module in which the structure of the WAP pages is described in a META-language. Furthermore, a visualization unit is provided which translates the structure into a language which is supported by the mobile phone. Using a META-language inside a structure module allows the structure of the WAP page to be defined without regarding the capabilities of the different mobile terminals that access the website. If there are any changes to be made in the composition of the WAP page, for example a new button or a new line for a new function which has been added, there is no need to make this change in every specific WAP tree but only once in the structure module. The visualization unit will then translate the structure into the language supported and needed by the phone. While the reference page allows definition of the functions for all WAP pages, the structure module allows a definition of the composition of all WAP pages.

Preferably, the visualization unit gets its information about the telephone model from the mobile terminal characterizing unit.

The invention further provides methods for accessing multi-media content by a plurality of different models of mobile terminals. The methods allow access and/or exchange of multi-media content files between different, incompatible mobile terminals.

In one aspect of the invention, the method includes recognizing by a dispatcher unit the network operator of a mobile terminal connected to the interface of a system provided. Depending on the recognized network operator, the mobile terminal will be redirected to an interface specific to the recognized network operator. By using the inventive method, the system is automatically adapted to the mobile terminal in terms of constraints due to the operator, which may be a limitation in bandwidth or functions.

In another aspect of the invention, the method includes providing a system with a first database containing multi-media content in the form of multi-media content files and with an interface between the system and the radio communication network. For each multi-media content file a first bit field is created containing in a true/false manner the digital multi-media format of the multi-media content file and for each of the plurality of different models of mobile terminals a second bit field is created containing in a true/false manner the digital multi-media formats supported by each model. The model of the mobile terminal which is connected to the interface is identified and the second bit field corresponding to the identified model is matched with the first bit fields of the multi-media content files and access is given only to those multi-media content files which are in a digital multi-media format supported by the model of mobile terminal. By matching the first and second bit fields, all digital formats, in which content is available and which are supported by the mobile terminal, are identified in only one step. The system is thus adapted very rapidly to the capabilities of the mobile.

The present invention also provides a method for exchanging multi-media content between at least two mobile terminals out of a plurality of different models of mobile terminals through a radio communication network. There is a system with an upload server, a transcoding cluster and a database. There is also an interface between the system and the radio communication network. The method comprises creating for each of the plurality of different models of mobile terminals a bit field containing in a true/false manner the digital multi-media formats supported by each model, and uploading a multi-media content file in a first digital format from a first model of a mobile terminal into the upload server. The upload server is scanned continuously for new uploaded multi-media content files. Every new multi-media content file detected is transcoded immediately into a plurality of files with different digital formats and the plurality of files are stored in the database. The model of a second mobile terminal which is connected to the interface is identified and the digital format supported by the identified model is looked up. The multi-media content is then downloaded to the second mobile terminal in a digital format supported by the second mobile terminal.

The present invention provides also a dispatcher adapted to recognize a network operator and to redirect the mobile terminal to a specific WAP tree according to the recognized operator. In particular, the dispatcher can comprise a model view controller. In this regard, the dispatcher may further be adapted to select one of a plurality of WAP trees. Each of the plurality of WAP trees is adapted to be accessed via a different URL address. Furthermore, the dispatcher can be located on a central page of a website. The dispatcher is particularly adapted to select a specific WAP tree which is adapted to provide a link to a system for providing compatibility information for the mobile terminal. The compatibility information, to which the link is established, can preferably include a first bit field and a second bit field, wherein the first and the second bit field can have the same predefined length and structure. A first database can be adapted to store the digital multi-media format information into the second bit field.

The dispatcher may form part of the above described system for accessing multi-media content.

The mobile terminal characterizing unit may be adapted to identify the mobile terminal model which accesses the system. The mobile terminal characterizing unit may also be further adapted to retrieve information from at least one data source and preferably from a plurality of data sources about the digital multi-media formats supported by each of the mobile terminals communicating in the radio network via which the terminals access the dispatcher and thereby the system. The characterizing unit may be further adapted to store the information retrieved.

The mobile terminal characterizing unit provided in combination with the dispatcher can be adapted to store the digital multi-media format information into a first bit field and the first database is adapted to store the digital multi-media format information into a second bit field, wherein the first and the second bit fields have the same predefined length and structure. The two bit fields may each be 256 bits long, for example, so that 256 different digital multi-media formats can be stored by marking, for example, in the first bit field a "1" for a digital format supported by the mobile terminal. Furthermore, a "1" can also be marked in the second bit field for the multi-media content available in this digital format. The matching unit can then be adapted to compare the first bit field with the second bit field for matching the digital formats. If the two bit fields are structured in the same manner and contain all information about all digital formats an almost instantaneous verification is possible, whether the multi-media content can be visualized, played or heard with the mobile terminal in question, i.e. the mobile terminal accessing the system. This compatibility test is done in one step and is extremely rapid. Preferably, the mobile terminal characterizing unit further stores other information about the telephone as screen size, supported colors, support of wallpapers and other features.

However, the bit fields, or at least one of the bit fields may be used in a different manner. For example, only a fragment or a part of the bit field may be used. Only specific bits of a bit field may be evaluated. The MSB of a bit field or a fragment of a bit field may be evaluated by comparing the bit field of the respective fragment to a threshold value. The LSB of bit field or a fragment may be evaluated by determining whether it is even or odd. The bit field may be represented in another format, as for example, hexadecimal or it may be filtered and evaluated thereafter. A portion of the bit field or the whole bit field may be extended for adding new formats in which the multi-media content should be available. Furthermore, a pointer may be set, so as to determine, which part of the bit field is to be used.

With the dispatcher according to the invention, a dedicated storage area can be provided for each user who is identified by his mobile terminal. The user can transfer content files or rather a link to a content file, from any of the databases into his dedicated storage area, where this transferred content may remain stored for an unlimited time. In the state of the art, a user who purchases for example a ring tone or a full track cannot preserve it outside of the mobile terminal. With a change of his terminal he loses his uploads. This is prevented with the dispatcher using dedicated storage area from which he can reload his ring tone after a change of terminal. Multi-media content which is stored in this dedicated storage area may even be shared with other users known to the user, as far as this is allowed by the digital right management. In this case, for example an SMS message will be sent to the friend user communicating an address from which the friend user can upload the shared content.

The dispatcher can be on a website on the internet for accessing multi-media content via a mobile terminal using a WAP interface. The website can comprise a graphical user-system interface with a central page and a plurality of WAP trees, i.e. a plurality of WAP pages, each WAP tree being accessible via a different address URL, wherein the dispatcher is located on the central page. The dispatcher is then adapted to recognize the network operator and to redirect the mobile terminal to the WAP tree specific for the recognized operator. Preferably, the website comprises a reference page which is adapted to provide a complete menu of the possible functions. Each WAP tree is adapted to inherit or to load the menu from the reference page unless there are changes to a menu that points specifically to this WAP tree.

Preferably, the functions are in a modular form so that it is possible to easily add new functions. The WAP trees, which are the set or subset of WAP pages visible to the user, inherit functions newly added to the reference page automatically. Using a reference page from which all WAP pages inherit or load their functions allows a new WAP tree to be created, that is a new WAP page for example for another network operator, who may operate in a different country with a different language or with other cultural habits, in a very short time, for example in two hours. This very fast adaptation is possible because this new WAP page, i.e. this new graphical interface, will inherit all functions already created in the reference page.

In a preferred embodiment, the website comprises a structure module in which the structure of the WAP pages is described in a META-language. Furthermore, a visualization unit is provided which translates the structure into a language which is supported by the mobile phone. Using a META-language inside a structure module allows the structure of the WAP page to be defined without regarding the capabilities of the different mobile terminals that access the website. If there are any changes to be made in the composition of the WAP page, for example a new button or a new line for a new function which has been added, there is no need to make this change in every specific WAP tree but only once in the structure module. The visualization unit will then translate the structure into the language supported and needed by the phone. While the reference page allows definition of the functions for all WAP pages, the structure module allows a definition of the composition of all WAP pages.

Preferably, the visualization unit gets its information about the telephone model from the mobile terminal characterizing unit.

The dispatcher according to the present invention also provides the capability for exchanging multi-media content between at least two mobile terminals out of a plurality of different models of mobile terminals through a radio communication network as described above.

The present invention also provides a method of transcoding multi-media content. According to this method the multi-media content is received in a first format. Thereafter, the multi-media content is converted from the first format into a second format and only after the conversion step into the second format a request is received to provide the multi-media content in the second format. Therefore, the multi-media content is converted before the request is arrived. This is advantageous for large data files, which can not be translated "on the fly".

The method of transcoding may further include a step of deciding whether to convert the multi-media content before the request or instantaneously after the request. The request is preferably issued by a mobile terminal. The multi-media content can be stored in the first and the second format in a database. The step of converting can advantageously be performed when (i.e. starting immediately after upload) the multi-media content is uploaded to a database. Actually, an identification code can be shared between a first and a second user which refers to the converted multi-media content.

The present invention also provides a method of ingesting multi-media content and managing multi-media content. Therefore, a multi-media content can be flagged for indicating a user with whom the content is to be shared. A multi-media content can also be flagged for indicating the number of users with whom the content is to be shared.

The present invention also provides a method of managing digital rights, comprising providing multi-media content to a user based on the digital rights of a contract of a third party.

The above mentioned methods according to the present invention are preferably applied in a system for accessing multi-media content as described above, which includes a mobile terminal characterizing unit, which is adapted to receive identification information from the mobile terminal indicating capabilities of the mobile terminal and a matching unit, which is adapted to match digital formats supported by the capabilities of the mobile terminal with the digital formats of the multi-media content files. The system is adapted to provide information to the mobile terminal based on a result of the match performed by the matching unit. In other words, the matching unit is adapted to match the digital formats which are supported by the identified mobile terminal with the digital formats in which the multi-media content is available. Thus, the mobile terminal is given access only to content which is available in a digital format which is supported by the mobile terminal.

According to an further preferred embodiment of the present invention a method for generating a compatibility indicator code is provided wherein the method comprises the steps of creating first datasets comprising information regarding capabilities of a plurality of mobile terminals, supplementing the content of the first datasets by automatically comparing the content or part of the content of the first datasets with content or part of the content of second datasets and adding content or part of the content of the second datasets which is not comprised in the first datasets, continuing supplementing the content of the first datasets by automatically comparing the content or part of the content of the first datasets with content or part of the content of other datasets until each of the first datasets comprises a specified minimum content, and generating a compatibility indicator code for each of the first datasets representing the specified minimum content. Preferably, the method further comprises the step of verifying the specified minimum content of the first datasets by comparing the content or part of the content of the first datasets with content or part of the content of further datasets. The step of verifying may further comprise the sub steps of matching content or part of the content of the first datasets with the content or part of the content of the further datasets and substituting the content or part of the content of the first datasets which is not identical by the content or part of the content of further datasets. The sub step of matching preferably further comprises determining which content or which part of the content of the first datasets is not identical with the content or part of the content of the further datasets. Furthermore, priorities can be assigned to the second, the other and the further datasets and wherein the content or part of the content of the first datasets is supplemented or substituted by the content or part of the content of the second, the other and the further datasets based on the assigned priorities.

According to a further preferred embodiment of the present invention a system for generating a compatibility indicator code is provided which comprises creating means for creating first datasets comprising information regarding capabilities of a plurality of mobile terminals, supplementing means for supplementing the content of the first datasets by automatically comparing the content or part of the content of the first datasets with content or part of the content of second datasets and adding content or part of the content of the second datasets which is not comprised in the first datasets, and for continuing supplementing the content of the first datasets by automatically comparing the content or part of the content of the first datasets with content or part of the content of other datasets until each of the first datasets comprises a specified minimum content, and generating means for generating a compatibility indicator code for each of the first datasets representing the specified minimum content.

According to another preferred embodiment of the present invention a system and method for individualization of mobile content is provided. For this the system comprises means for individualization of mobile content according the capabilities of a mobile terminal accessing the mobile content. Accordingly, the system comprises a terminal characterizing unit and a dispatcher for directing a request of the mobile terminal for mobile content to a specific mobile content tree out of a plurality of mobile content trees. Each tree includes a structure module in which the composition or structure of a mobile content page is defined in a META-language for example XML. The trees further include an action module or several action modules for defining actions like selecting a multi-media content. The structure defined in a META-language in the structure module is translated by a visualization unit into a language supported by the capabilities of the mobile terminal. The visualization unit looks up in the mobile terminal characterizing unit which language is supported by the mobile terminal. Depending on the language supported, the visualization unit translates META-language file given by structure module into e.g. XHTML, WML or CHTML. The translated META-language file will then be sent to the mobile terminal.

BRIEF DESCRIPTION OF THE DRAWINGS

Further advantages and preferred embodiments are included in the dependent claims and will be better understood from the description below of a preferred embodiment, with reference to the accompanying drawings, in which:

DETAILED DESCRIPTION OF THE INVENTION

Figure 1:
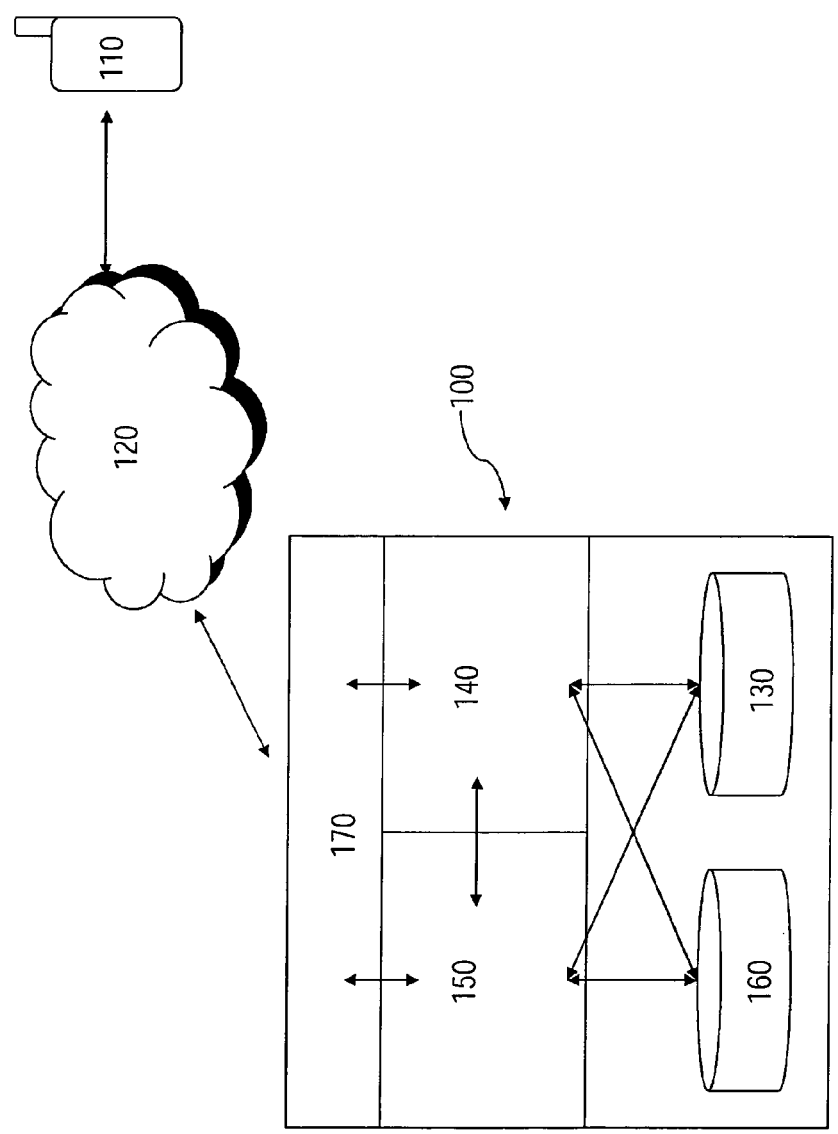
FIG. 1 is a simplified schematic diagram of the system according to an preferred embodiment of the invention.

The following paragraphs will describe various embodiments of the invention. For exemplary purposes only, most of the embodiments are outlined in relation to a portal server and the terminology used in the subsequent sections mainly relates to that technology. However, the used terminology and the description of the embodiments with respect to a portal architecture are not intended to limit the principles and ideas of the inventions to such systems.

Also the detailed explanations given in the Background of the Invention section above are merely intended to better understand the mostly portal and server specific exemplary embodiments described in the following and should not be understood as limiting the invention to the described specific implementations of processes and functions.

The ideas and principles that will be outlined in the subsequent sections may be applicable to systems providing access to content having specific formats in general enabling these systems to provide content which is compatible.

1. System for Accessing Multi-Media Content

According to a preferred embodiment of the present invention, the system for accessing multi-media content is a portal which can be accessed by the user via a mobile terminal and/or fixed terminal. The system provides audio content, image content, video content, video/computer games and other multi-media content or software which can be bought and/or downloaded by users having access to the portal. Furthermore, the users can upload own multi-media content to the portal and share multi-media content with other user.

According to the present invention the system automatically provides or generates multi-media content according to the capabilities of the mobile devices via which the multi-media content is requested. I.e. according to the identified digital format compatibility of the mobile device, its display capabilities, its loudspeaker capabilities, its decoding capabilities, etc. the provided content is filtered or generated. Thus, the system ensures that the best quality is delivered for each device while respecting specific publishing policies. The capabilities of the mobile terminal refer e.g. to its abilities to display, play, decode, execute or otherwise process content. This includes processing specific picture formats, audio formats, video formats, web pages, and other data formats.

To achieve this, the system provides a variety of services for the users accessing this portal.

One of the services of this portal is providing multi-media content, such as music, ringtones, videos, video/computer games, wallpapers, software, etc. This multi-media content is provided in the form of data files in the following of called multi-media content files, which may have different digital formats, such as MP3, WMA, WAV, OGG, VOX, MPC, AVI, JPEG, PNG, GIF, TIF, WMV, 3GP, MPEG, TIVX, ASF, HTML, XML, WML, AAC, etc.

These multi-media content files are stored by storage means. Preferably, the storage means comprises one or more databases and storage devices such as but not limited to disk arrays.

A further service of the portal according to the preferred embodiment of the invention is providing the possibility for the user to upload multi-media content files, such as pictures, wallpapers, music, ringtones, videos, video games, software etc. This uploaded content also can be stored in the above mentioned database or databases, respectively.

Another service of the portal according to the preferred embodiment of the invention is to provide a store where the user can buy multi-media content either file by file or by taking out a subscription. For this, the store can connect to the one or more databases which store the multi-media content files, in order to obtain information which multi-media content files can be offered to the user.

Additionally, the portal offers the possibility for the user to share content which is e.g. bought from the store or uploaded by the user itself with other users. For this, the user can inform other users about the multi-media content file which he or she intends to share with the others via e-mail, SMS, MMS, voice mail, etc. by forwarding e.g. a link to the multi-media content file to be shared. The content can also be downloaded from a subscriber's exclusive zone.

Alternatively, the user can specify a contact list or a so called buddy list for sharing multi-media content with the members of that buddy list.

In this regard, the portal also offers services such as e-mail, SMS, MMS, voice over IP (VoIP), voice mail, address book functionality, etc. Thus, the user can easily store contact data of other persons, such as "friends" and invite e.g. a friend using the contact data in the address book. So called "friends" may be other users which are specified in a specific contact list or so called buddy list. Furthermore, the contact data can be assigned to such buddy lists. By selecting one or several ways in which the friend has to be informed e.g. by SMS and e-mail, the friend will be informed by the portal via SMS and e-mail that he or she has access to one or more multi-media data files to which he or she is invited.

In order to provide all these services, the portal is accessible at least via a computer network, such as Internet and/or a wireless network, such as a GSM, GPRS, EDGE, UMTS, CDMA2000, HSDPA and/or WiFi-Network etc. Additionally, the portal may be accessed via wireless hotspots or other network connections or by connecting the mobile terminal to a local area network (LAN). For this, the portal provides the necessary interfaces to the respective networks. Accordingly, the portal may be accessed via a stationary terminal, such as a desktop computer or via mobile terminals, such as mobile phones, PDAs, handhelds, navigation systems, e-books, etc.

Preferably, the portal comprises at least two subsections for the access. These at least two subsections consist of a subsection for access via e.g. GSM, GPRS, EDGE, UMTS or HSDPA also called mobile portal and a further subsection for access via e.g. LAN or WiFi also called web portal. Preferably, these at least two subsections provide different functionalities depending on the channel via which they are accessed. Alternatively, the mobile access via UMTS or HSDPA with a high bandwidth is directed to the web portal offering the full scale of all functionalities. In a further alternative, the portal does not comprise subsections. The same functionality is provided for all access channels.

The portal according to the preferred embodiment of the invention comprises the necessary hardware and software components, such as firewalls, servers, databases, storage devices and other network equipments together with respective back-up systems.

From an architectural view, the portal is preferably based on a multi-tier architecture. According to a most preferred embodiment, the portal is based on a 3-tier architecture providing a data tier, application tier and a presentation tier. The presentation tier is responsible for displaying information related to the above described services. The application tier comprises the business logic which includes the functionality for performing the above mentioned services. The data tier is based on database servers. In the data tier information is stored and retrieved. Preferably, each tier comprises a plurality of software components which can communicate with each other via defined interfaces.

From a functional view, the portal comprises several functional entities, such as compatibility management, dispatcher, transcoding management, ingestion and content management, digital right management, billing, etc. Some of these functional entities are described in more detail further below.

As mentioned above, it is an aspect of the present invention to provide a system and method which is adapted to provide multi-media content to a user of a mobile device, e.g. a mobile phone, wherein the compatibility problems between the multi-media content and the formats by his or her mobile phone are reduced. In order to solve this object, the preferred embodiment of the present invention provides information regarding the capabilities of the mobile terminal. In view of the knowledge about the capabilities of the mobile terminal, a subset of the multi-media content files can be identified having at least one specific digital format which is supported by at least one of the capabilities of the mobile terminal. A subset of the multi-media content files means one or more multi-media content files. Thus, the system can provide a subset of multi-media content files for which it is guaranteed that they are compatible with the mobile terminal.

In order to describe the functionality of the preferred embodiment of the invention in more detail, in the following it is referred to FIG. 1 which shows a simplified schematic diagram of the system according to the preferred embodiment of the invention.

FIG. 1 shows the portal 100, wherein specific software and hardware components are combined to specific functional and architectural entities. This simplification of the structure of portal 100, however, is not intended to restrict the scope of protection of the invention. The structure of the portal in its architectural or functional view is described in more detail in the following.

The entities described in the following are not restricted to work as separate entities. Alternatively, they may be combined to one single entity without losing any of the functions described further below. Moreover, the entities described in the following also may comprise further sub-entities having additional functions.

As shown in FIG. 1, portal 100 comprises receiving and transmitting means 170 via which a mobile terminal 110, such as a cellular phone, PDA, handheld assistants, e-book, etc. can access via a radio network 120 to the portal 100. Preferably, receiving and transmitting means 170 comprise an interface to the radio network. This interface can be a SMS and/or WAP and/or i-MODE or another access interface. In an alternative embodiment the receiving and transmitting means 170 is a transceiver module capable to communicate not only via a radio connection with mobile terminal 110 but also via a wired network with fixed terminals such as desktops.

The mobile terminal 110 connected to the mobile portal 100 can have many capabilities, for example it can be used for taking photographs, displaying and modifying pictures, recording movie clips, recording and playing audio files, such as MP3 files, as well as for making and receiving telephone calls.

Therefore, the portal 100 further comprises a mobile terminal characterizing unit 140. The mobile terminal characterizing unit 140 preferably provides mobile terminal capabilities information which indicates at least one capability of the mobile terminal 110. For this, the mobile terminal characterizing unit 140 is connected to the receiving and transmitting means 170 so that information sent by the mobile terminal 110 can be forwarded to the mobile terminal characterizing unit 140. Preferably, the information received from the mobile terminal 110 when connecting to system 100 comprises data by which the model and/or type of the mobile terminal can be identified.

For this the mobile terminal 110 may be provided with an identifier, which may be different for each communication standard so that each identifier corresponds with a different communication standard.

Alternatively, the identifier can be always the same for each communication standard. In other words the mobile terminal 110 can be provided with just one identifier that is used for all the different communication standards. The identifier or identification code of the mobile terminal 110 may be provided as a specific field or part of information transmitted to the system 100 and received by receiving and transmitting means 170.

This information may be sent from the mobile terminal 110 to the portal 100 when setting up a connection or/and during the connection with the portal 100.

The mobile terminal characterizing unit 140 is additionally connected to database 160 which provides information regarding the capabilities of mobile terminals according to their type and/or model. Thus, mobile terminal characterizing unit 140 can retrieve information from database 160 about the capabilities of the mobile terminal 110 based on the identifier or identification code received from the mobile terminal 110.

Additionally, the mobile terminal characterizing unit 140 is functionally connected to matching unit 150. Matching unit 150 is adapted to identify a subset of the multi-media content files having at least one specific digital format, wherein the at least one specific digital format is supported by the at least one capability of the mobile terminal.

In order to identify the subset of multi-media content files, the matching unit 150 is connected to storage means 130 which is preferably also a database. In this database, the multi-media content files are stored, preferably together with information about the digital format of each of the multi-media content files. This information can be retrieved by the matching unit 150 from storage means 130. The information from the storage means 130 regarding the digital format of the multi-media content files can be matched with the information regarding the capabilities of the mobile terminal 110. Thus, the matching unit 150 can identify a subset of the multi-media content file which is compatible with the capabilities of the mobile terminal 110 and which also corresponds to the request of the mobile terminal 110 for specific multi-media content.

The matching unit 150 is furthermore functionally connected to the receiving and transmitting means 170 in order to provide information regarding the subset of multi-media data files to the mobile terminal 110. Furthermore, the matching unit 150 is functionally connected to database 160 in order to directly retrieve mobile terminal capability information. Furthermore, mobile terminal characterizing unit 140 may be also connected functionally to a storage means 130 in order to retrieve further information about the multi-media content files.

Preferably, the functional components of portal 100 use e.g. an inter-process communication technology so that they can interact with each other. In that way any functional component of the portal 100 is able to communicate with any other functional component of the portal 100, if necessary. This also includes all the databases.

Figure 2:
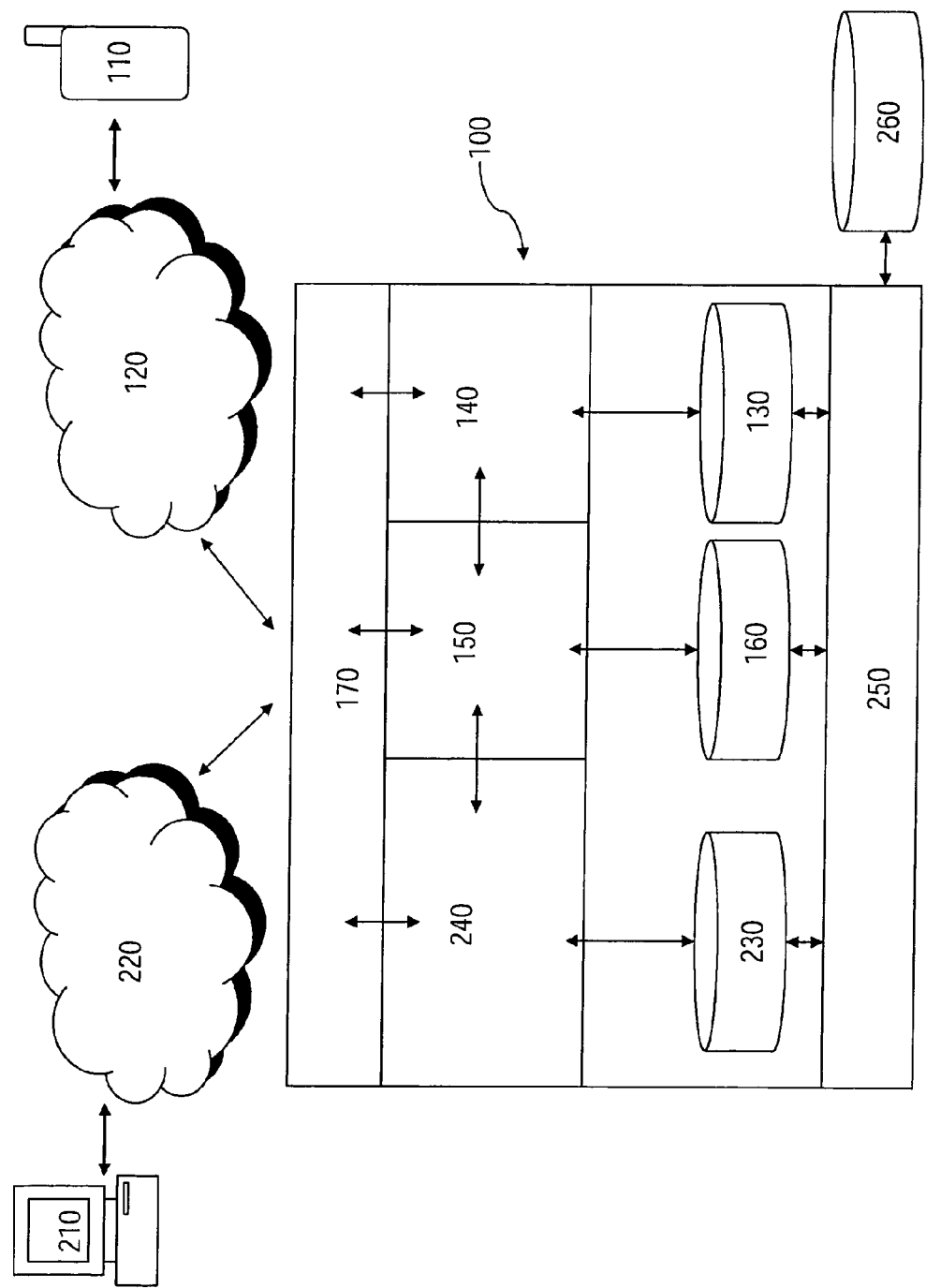
FIG. 2 is a schematic diagram showing a more detailed view of the system of FIG. 1.

FIG. 2 is a schematic diagram showing a more detailed view of the system of FIG. 1 which comprises further expansion states of system 100. As shown in FIG. 1, mobile terminal 110 can connect to the system 100 via radio network 120 e.g. in order to request specific multi-media content. In the case that the mobile terminal 110 is accessing portal 100 via UMTS the request of the mobile terminal 110 is received by a node B and forwarded to a so called gateway GPRS support node (GGSN) which is connected to an IP network. Via this IP network the request of the mobile terminal 110 is forwarded to the portal 100. For this, the system 100 comprises receiving and transmitting means 170 which forward the request from the mobile terminal 110 to the mobile terminal characterizing unit 140 and matching unit 150. Furthermore, system 100 can be accessed by fixed terminals 210, such as desktops, etc. via a computer network 220 which is preferably a wired and/or optical network. For this, the receiving and transmitting means 170 additionally comprise one or more interfaces for communicating with the computer network 220 and the network to which the base station of the radio network 120 is connected. In the case that the computer network 220 is an IP network and the radio network 120 is also connected to an IP network the request of the mobile terminal 110 is alternatively forwarded first to the IP network 220 and then to the receiving and transmitting means 170.

In that way, the user can access the portal 100 not only via a mobile terminal, but also via a fixed terminal. In the case that portal 100 provides a user account for the user, the user can log in via fixed terminal 210, connecting via the computer network 220 to the portal 100. This access might be used by the user, if services of the portal 100 are used which need a broad bandwidth for data transmission. In the case that the terminal 110 is equipped with HSDPA functionality or similar technology which offers a high data transfer capacity, it is also possible to access portal 100 via the radio network in the case that the services need a broad bandwidth for data transmission. As mentioned above, the portal also provides the services for the user to upload multi-media content files to his or her user account. For this, a high data transfer capacity is needed.

Under his or her user account, the user can store the uploaded multi-media content files, such as pictures, music, ringtones, videos, games, etc. System 100 comprises upload storage area 230 where the uploaded multi-media data files can be stored. Preferably, upload storage area 230 is a database.

Moreover, system 100 comprises upload and transcoding cluster 240 by which the user can transfer the uploaded multi-media data files to the upload storage area 230. Additionally, the upload and transcoding cluster 240 is adapted to transcode the uploaded multi-media data files either automatically or on request by the user. For a user requested transcoding the user can specify either by default selection stored e.g. in the user profile, or via specific selection made during uploading the multi-media content files in which format the multi-media content files shall be transcoded. Thus, the user can specify in the case that he has uploaded e.g. a music file with format MP3 that this multi-media content file shall be transcoded into WAV, WMA and OGG format. All three additional versions of the uploaded multi-media content file are also stored in the upload storage area 230.

As indicated above, the multi-media content files may be uploaded from the mobile terminal 110 or the fixed terminal 210 to the upload storage area 230. As at the moment computer networks offer a higher data transfer capacity than radio networks, most probably the user will upload the multi-media content files via computer network 220. When travelling, the user has access to his or her multi-media content files via mobile terminal 110 under his or her user account. Thus, the user can download specific multi-media content files from the upload storage area 230 to the mobile terminal 110 via the radio network 120.

Preferably, via accessing portal 100 via an internet terminal 210 via network 220, he or she also has access to all or a subset of the uploaded multi-media content files from anywhere in the world depending on eventual territory restrictions applying to the content.

Preferably, system 100 comprises in a further expansion stage the backend modules 250. Preferably, these backend modules 250 comprise modules for a shop or store, where multi-media content files can be bought by the users of portal 100. Furthermore, backend modules 250 can comprise modules for uploading multi-media content files to the stores and modules for managing the digital rights of the multi-media content files uploaded to the store or the digital rights of the multi-media content bought by the users. Moreover, backend modules 250 may comprise content management modules in order to manage the uploaded multi-media content files and e.g. web pages on which the multi-media content files are presented. Furthermore, backend modules 250 comprise modules for billing, authentication, security and logging user activities. Specific features of the backend modules 250 are outlined in detail further below.

Furthermore, system 100 provides a connection to external data sources 260. These external data sources comprise e.g. further information in regard to the capabilities of mobile terminals 110.

Moreover, portal 100 preferably comprises interfaces to third party content providers which provide e.g. news or other online services.

As also shown in FIG. 2, mobile terminal characterizing unit 140, matching unit 150, and uploading and transcoding cluster 240 are connected preferably in a bi-directional way to the receiving and transmitting means 170 which comprise preferably one or more transceiver modules in order to communicate with the networks 120 and 220. The receiving and transmitting means 170 is capable to forward multi-media content to the mobile terminal 110 and fixed terminal 210 based on SMS, i-Mode, WAP, HTTP, HTTP tunneling, etc. Furthermore, the receiving and transmitting means 170 is capable to receive requests based on SMS, i-Mode, WAP, HTTP, HTTP tunneling, etc. or similar techniques.

Moreover, the mobile terminal characterizing unit 140, matching unit 150 and uploading and transcoding cluster 240 are adapted to communicate with each other directly or as indicated in FIG. 2 indirectly in a bi-directional way. Moreover, mobile terminal characterizing unit 140, matching unit 150 and uploading and transcoding cluster 240 have access to each of the storage means 130, database 160 and upload storage area 230.

Mobile characterizing unit 140 and matching unit 150 can also access upload storage area 230 (not shown in FIG. 2). Preferably, the units of portal 100 comprise interfaces to communicate with specific and/or all the storage units/areas and the databases of portal 100.

The upload storage area 230 preferably also provides multi-media format information which is preferably a digital format key indicating the multi-media format of the respective multi-media file and which will be described further below. This multi-media format information is stored together with the multi-media content files when uploaded to the upload storage area 230. "Stored together" means that there is at least a reference from the multi-media format information to the multi-media content file to which it refers or vice versa. Additionally, multi-media format information is generated by the upload and transcoding cluster 240 when uploaded multi-media content files are transcoded. The thus generated multi-media format information is also stored with the corresponding transcoded multi-media content files in the upload storage area 230. The multi-media format information can be retrieved by the matching unit 150 from upload storage area 230 in the same way as the corresponding information from the storage means 160. Thus, the multi-media format information from upload storage area 230 can also be matched with the information regarding the capabilities of the mobile terminal 110.

Preferably, the mobile characterizing unit 140, matching unit 150, the receiving and transmitting means 170, the database 160, the storage means 130, the upload storage area 230, the upload and transcoding cluster 240 and the to external data source 260 are a combination of software and hardware modules. Alternatively, these components of system 100 are software modules implemented in electronic equipment.

As outlined above the upload storage area 230 is an area in which the user of the mobile terminal 110 may store their own personal uploaded files or the files downloaded from storage means 130. The upload storage area 230 may also be accessed by friends, so that its contents may be shared, preferably according to digital rights management as will be explained in more detail below. The upload storage area 230 may be accessed via the WAP interface 170 or via the WEB interface 170, or any other interface suitable for access from the radio network. It is possible to upload a multi-media content file from a mobile terminal 110 or from a personal computer 210 into system 100, more precisely into the upload storage area 230. The uploaded multi-media content file may be in any digital format, for example MP3, OGG, etc. The uploaded content file will be transcoded by the transcoding cluster 240 and stored in upload storage area 230.

Each user identified by his mobile communication unit 110 and accessing system 100 via the radio communication network 120 or via the fixed communication network 220 has a dedicated storage area which is preferably part of the upload storage area 230. From this storage area he may download multi-media content to his mobile 110 or to his personal computer 210. Into this area he can load multi-media content files from the storage means 130, provided that the matching unit 140 found a matching between the capabilities of the terminal 110 and the demanded multi-media content in database 130. The user may also load private content into the dedicated storage area.

Due to the transcoding of the multi-media content stored in the upload storage area 230 is preferably provided in all digital formats known to the system 100. The terminal characterizing unit 140 will make sure that when uploading multi-media content into the upload storage area 230 at least one file format is chosen which is compatible to the terminal 110 and which offers the best quality for this terminal. Preferably, in the upload storage area 230 the content files themselves are not stored but rather only an address of the content file is stored. Thus duplicating of files is avoided.

As digital right management could be also an issue for the uploaded content and not all uploaded files might be transcoded into all known formats alternatively the upload storage area 230 preferably generates a corresponding digital format key for the stored files.

Figure 3:
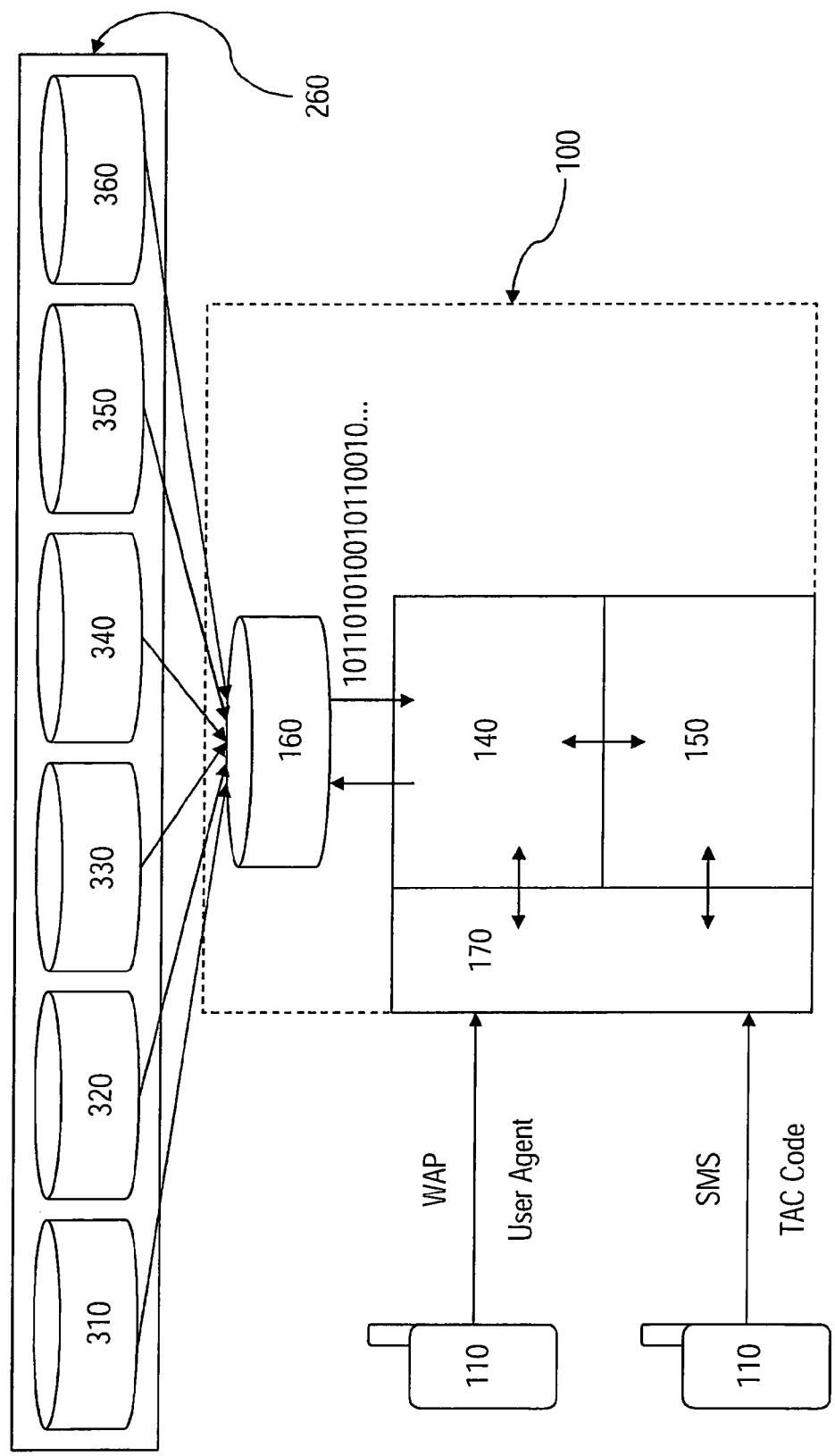
FIG. 3 is a schematic diagram illustrating a further aspect of the components of the system of FIG. 2.

Turning now to FIG. 3, a more detailed view of the external data sources 260 is shown together with further examples for different connections from the mobile terminals 110 to system 100.

According to one aspect of the preferred embodiment, data sources 260 comprises a first database 310 which preferably stores the so called Type Allocation Code (TAC code) of a variety of mobile terminals 110 together with the model or type of the mobile terminal corresponding to the TAC code. The TAC code is a portion of the 15-digit international mobile equipment identity (IMEI) code or the 17-digit international mobile equipment identity and Software Version (IMEISV) code used to uniquely identify wireless devices. The TAC code is an eight digit number that identifies a particular model and often also a revision of a mobile device for use e.g. on a GSM or UMTS or other IMEI or IMEISV supporting wireless network.

The IMEI or IMEISV code is transmitted by the mobile terminal 110 and thus can be used e.g. for identifying the type or model of mobile terminal 110 when accessing the system 100. Preferably, the IMEI or IMEISV code is transmitted to the operator network 120 which forwards the TAC code e.g. via the GGSN to the portal 100. Preferably, the TAC code is used to identify the mobile terminal 110 for the case that the mobile terminal contacts the portal 100 via SMS.

Prior to Apr. 1, 2004 the global standard for the IMEI included the six digit type allocation code, which indicated that the particular device was approved by a national GSM approval body. Furthermore, according to the previous IMEI format, a final assembly code (FAC) was also included in the IMEI, which could uniquely indicate the manufacturing company that had actually built and assembled the device. However, this is not always the same as the brand name of the mobile terminal.

Thus, first database 310 offers the possibility to uniquely identify the model of the mobile terminal 110 based on the TAC code.

Furthermore, data sources 260 comprise a second database 320 which is preferably a wireless universal resource file called WURFL. The WURFL is an XML configuration file which contains information about device capabilities and features for a variety of mobile terminals. In particular, the second database comprises information so that mobile terminals contacting a server or system 100 via WAP can be identified according to their model or type. Information about mobile devices is regularly contributed to the second database by mobile terminal manufacturers and this database is updated frequently, reflecting new wireless devices coming onto the market. In particular, the Wurfl data source 320 shown in FIG. 3 collects data about the mobile terminal 110 such as the brand and model, the screen size, and the kind of browser supported, e.g. whether the terminal supports CSS, XHTMLMP and DRM, for example.

In the case that the mobile terminal contacts the portal 100 via WAP, the second database 320 can be used to identify the capabilities of the mobile terminal as the second database provides information regarding the type or model of mobile terminal based on the information obtained e.g. by the HTTP header field "User-Agent" transmitted via WAP.

Using the first database 310 in order to identify the model or type of the mobile terminal 110 based on the TAC code the second database 320 can also be used to retrieve further information about the capabilities and features of the identified mobile terminal 110.

Moreover, data source 260 preferably comprises a third database 330 which provides information on capabilities of the mobile terminals. Third database 330 comprises information which is obtained e.g. from the manufacturers of the mobile terminals. This manufacturer database 330 stores the information depending on the type or model of the mobile terminals. Preferably, to each model or type of mobile terminal all relevant information is stored, such as screen size, CSS support, XHTMLMP support, DRM support, AVI support, MP3 support, WMA support, OGG support, . . . browser type, operating system, etc. The third database 330 may be one database for all manufacturers or consist of several databases each database covering information of one or more manufacturers. Thus, it is possible, based on the manufacturer database 330 to retrieve information regarding a specific mobile terminal based on the type of the mobile terminal.

Besides the first database 310, which provides information regarding the type or model of a mobile terminal based on the TAC code, e.g. transmitted via SMS, the second database 320, which provides information regarding the type or model of mobile terminal based on the information obtained e.g. by the HTTP header field "User-Agent" transmitted via WAP and the third database 330, which provides information regarding capabilities of mobile terminals based on the model or type of the mobile terminal, a further database 340 is provided, which comprises additional information regarding the capabilities of the mobile terminals. Preferably, information stored in the fourth database 340 is provided by the network operators.

Moreover, data source 260 preferably comprises an additional fifth database 350. This fifth database 350 is preferably provided by an external provider offering reliable information on the capabilities on the mobile terminals. Preferably, the fifth database 350 is a database with a standardized data format. Alternatively, the fifth database 350 is a proprietary database.

Additionally, a sixth database 360 is provided, which is a proprietary database and comprises highly-reliable data regarding the capabilities of the mobile terminals. Preferably, this proprietary database 360 additionally comprises the TAC codes and the WAP user agent codes corresponding to the model of the mobile terminals stored in the database. Thus, proprietary database 360 is able to provide data sets preferably comprising all necessary information such as the TAC code, the WAP user agent code and the capabilities for a respective model of a mobile terminal for identifying the capabilities of a specific mobile terminal 110. Preferably, all this information stored in the sixth database 360 is checked for its correctness.

According to one version of the preferred embodiment, the system 100 accesses as many databases of data sources 260 as possible, comparing the information retrieved from different data sources 260 and storing for each model of mobile terminal, which is known by the available data sources, which digital multi-media formats the different models support.

The type and version of browser supported by the mobile device 110 can be obtained via the Wurfl data source by an HTML- or WAP-based communication or by SMS, for example. However, any other type of supported communication means may be used. When this information is obtained by HTML- or WAP-based communication, information about the browser supported is obtained automatically using the information obtained from the HTTP header fields. However, by communicating via SMS only the identifier of the mobile device 110 i.e. the TAC code is sent and the information about the browser supported by the mobile device 110 is looked up in one of the databases or retrieved from database 160.

According to another version of the preferred embodiment, system 100 comprises its own data source, which is provided individually with information about the known properties of essentially all models of mobile terminals used to communicate through the radio network 120.

According to still another version of the preferred embodiment, priorities are assigned to the databases 310 to 360 of data source 260. As the proprietary database 360 comprises the data sets which are considered as most reliable, this database is assigned with the highest priority. Next priorities are assigned to the other databases according to their reliability of the data sets. The lower the reliability of the datasets is, the lower the priority assigned to it. Based on this priority concept, datasets can be formed for each known model of a plurality of mobile terminals. The generation of such datasets either might be performed on the fly for each request from the mobile terminal or alternatively once for all identified models of mobile terminals by storing all thus generated data sets in database 160.

It is clear that this aspect of the present invention is not restricted to a data source comprising six databases, but also works with two, three, four and five databases or even more than six databases in the same way.

In FIG. 3, the backend modules are not shown. As indicated in FIG. 3, database 160 may compile the final data sets directly from first to sixth database 310 to 360, according to the priorities given to the databases. Alternatively, the generation of the final data sets stored in database 160 is performed via the backend modules. As furthermore shown in FIG. 3, mobile terminals may access system 100 via wireless application protocol (WAP) or short message service (SMS).

By accessing system 100 via WAP, an identifier is transmitted from the mobile terminal 110 to the system 100 indicating the type or model of the mobile terminal. Preferably, this identifier is the HTTP header field "User-Agent" which provides information about the mobile device and its manufacturer. For example, if the mobile terminal 110 is a Samsung SGH D900 mobile phone, the content of the HTTP header field "User-Agent" is "Samsung-SGH-D900". In this context it has to be mentioned that the mobile terminal 110 can access the portal 100 not only via radio network 120 but also directly via computer network 220 in the case that the mobile terminal 110 is also equipped with Bluetooth and/or WiFi functionality. In both cases i.e. contacting the portal 100 via radio network 120 or via computer network 220 the HTTP header field "User-Agent" will be available for identifying the model or type of the mobile terminal 110.

In the same way, an identifier is provided in the case that the mobile terminal 110 accesses system 100 via SMS. Preferably, in that case the TAC code is transmitted. If a Nokia cellular phone of type 6234 is accessing system 100 via SMS, the transmitted TAC code is "35939500".

In an especially preferred embodiment the TAC code is only used to identify the mobile terminal 110 accessing through SMS and the HTTP header field "User-Agent" is only used to identify the mobile terminal 110 accessing through WAP.

This TAC code or the content of the HTTP header field "User-Agent" either might be stripped of from all the other information provided by the mobile terminal either by the receiving and transmitting means 170 or by the mobile terminal characterizing unit 140. Based on the user agent information or TAC code, mobile terminal characterizing unit 140 can e.g. contact database 160 retrieving the information regarding the mobile terminal capabilities corresponding to the TAC code or content of the HTTP header field "User-Agent". Preferably, database 160 provides on the request of the terminal characterizing unit 140 a key which indicates the capabilities of the type of mobile terminal for which the information has been requested. As indicated in FIG. 3, this key is preferably a bit code of a specific length.

The requests of the mobile terminal characterizing unit 140 to the database 160 are preferably forwarded as a database query. This database query is performed preferably via an ODBC interface. Alternatively, database requests are performed via other standard database interfaces or SOAP protocol or CORBA, GIOP, ICE, DCOM and/or COM. In a further alternative version, database 160 is an XML file comprising all compiled final data sets regarding the capabilities of the mobile terminals in XML format.

2. Compatibility Management

As outlined above it is one aspect of the system 100 to provide audio, image, video, games and other multi-media content in a way so that the best quality is delivered for the mobile terminal 110 accessing the system 100. For this the system 100 uses a compatibility management. Some aspects of this compatibility management have been already described above in general. In the following further details of this compatibility management will be outlined.

Music, video clips, sound clips (e.g. ringtones), games and photographs as well as the browser formats are stored in system 100 as data files which have different formats. E.g. a specific song can be stored as an MP3 data file and/or as a WMA data file. Further digital formats for music or video data files are e.g. AAC, HE-AAC, 3GP, MP4, WAV, WMA and AVI. Further digital formats are described further below in regard to Table 1. There are many other digital formats and there are still new digital formats arising. The different digital formats are based on different instructions or rules of how to encode a multi-media content file (e.g. music file, video file, sound file or picture file) into a succession of bits which can be transmitted and then decoded by an adapted decoder in a mobile phone, for example. In order to provide an efficient way for having the information on whether a digital format is supported by a specific model of a mobile terminal, the digital format capabilities of a mobile terminal 110 should be known.

Figure 4:
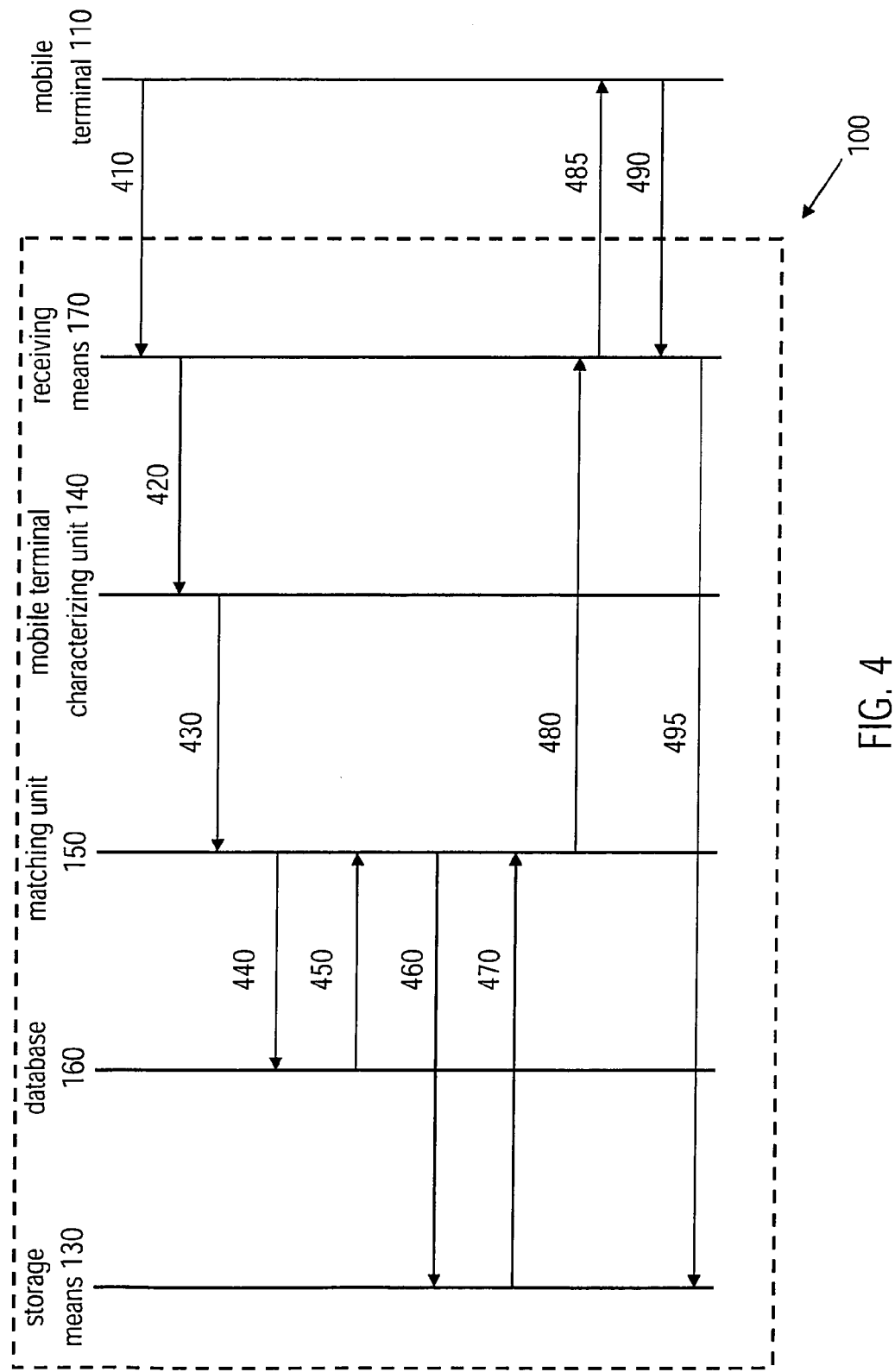
FIG. 4 is a flow diagram illustrating steps for accessing multi-media content files stored in a database according to the preferred embodiment of the invention.
Figure 5:
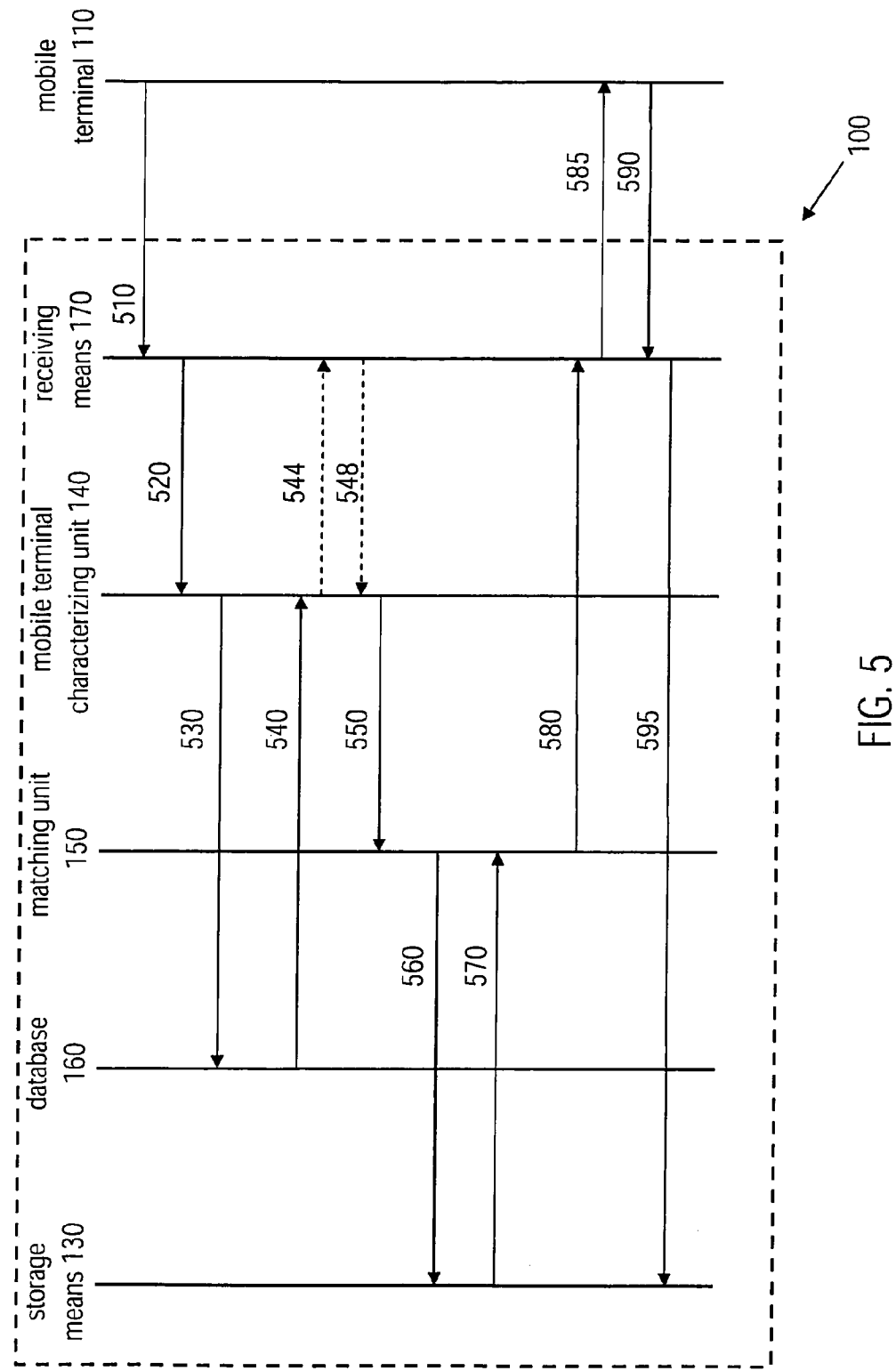
FIG. 5 is a flow diagram illustrating steps for an alternative way for accessing multi-media content files stored in a database according to the preferred embodiment of the invention.
Figure 6:
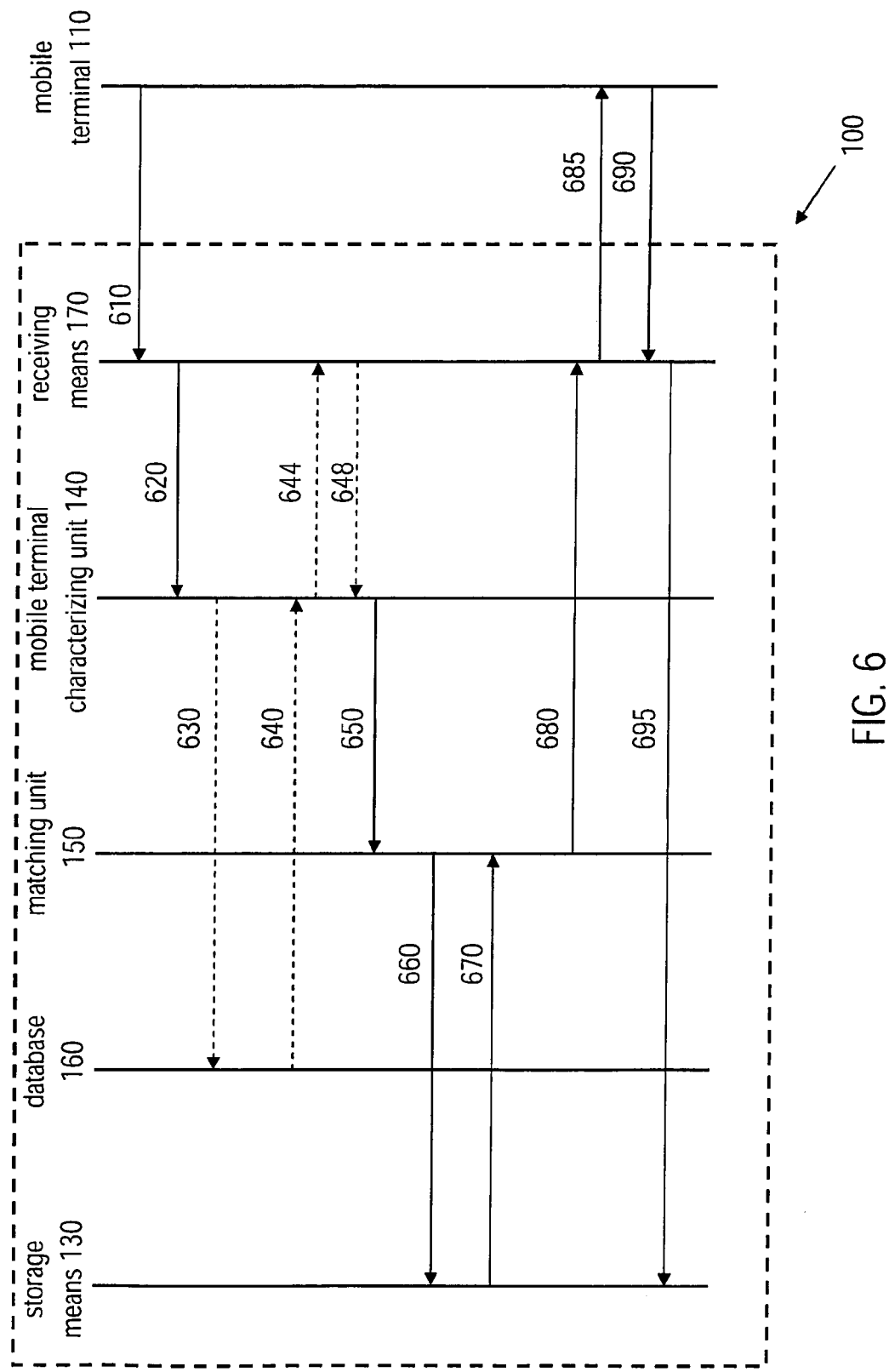
FIG. 6 is a flow diagram illustrating steps for another alternative way for accessing multi-media content files stored in a database according to the preferred embodiment of the invention.

Referring to FIGS. 4 to 6, alternative ways are described on how to obtain information regarding the capabilities of the mobile terminal 110 accessing the system 100 according to the preferred embodiment of the present invention.

FIG. 4 is a flow diagram illustrating steps for accessing multi-media content files stored in the database 130 according to the preferred embodiment of the invention. This "storing of a file in the database 130" is preferably performed by storing the file in a storage unit whereby a reference to this file in the storage unit is created and stored in a respective dataset of the database.

As shown in step 410, mobile terminal 110 sends a request to system 100 to access to multi-media content which is stored in the form of one or more multi-media content files. For example, mobile terminal 110 requests to access video "All Summer Long" from "Kid Rock" and to access song "Take a Bow" from "Rihanna". Furthermore, as an example, it is assumed that mobile terminal 110 is a Nokia 8800 cellular phone which sends the request via SMS.

The request is received in step 410 by receiving and transmitting means 170. Receiving and transmitting means 170 forward the request of the Nokia 8800 cellular phone to the mobile terminal characterizing unit 140 in step 420. Preferably, the request comprises the TAC code provided by the network operator. In the case that the request comprises the IMEI, the mobile terminal characterizing unit 140 retrieves from the IMEI the TAC code which uniquely identifies the model of the mobile terminal 110. In the specific case of the Nokia 8800 cellular phone, the TAC code is e.g. 35797300.

Preferably, together with the information that the mobile terminal 110 requests access to song "Take a Bow" and video "All Summer Long", the TAC code is transmitted from mobile terminal characterizing unit 140 to matching unit 150 in step 430.

In step 440 the matching unit 150 starts an enquiry to database 160 based on the TAC code "35797300" in order to obtain information regarding the capabilities of the respective mobile terminal. Based on the TAC code "35797300", a dataset is retrieved from database 160 in step 450 which corresponds to Nokia 8800 cellular phone and provides information, such as display resolution (208×208 pixels), camera resolution (600×800 pixels), display colors (262,144), preferred wallpaper resolution (128×128 pixels), MP3 support (true), 3GP support (true), etc. Based on the information obtained from database 160, the matching unit 150 has now the information that the mobile terminal 110 requesting access to the aforementioned multi-media content files is of the type of Nokia 8800 which supports MP3 and 3GP format.

In step 460, matching unit 150 requests for information regarding song "Take a Bow" and video "All Summer Long" from storage means 130. In response to this request, matching unit 150 receives in step 470 from storage means 130 the information, that song "Take a Bow" is available in the digital formats MP3 and WMA and the video "All Summer Long" is only available in the digital format WMV. Based on this information, matching unit 150 determines that access can be granted only to song "Take a Bow" and in particular to the digital format MP3, as only this format is supported by Nokia 8800. No access is granted to the video "All Summer Long" as this is only available in a format which is not supported by Nokia 8800. Therefore, matching unit 150 sends a grant for access only for song "Take a Bow" in the digital format MP3 to the receiving and transmitting means 170 in step 480. This access grant is further forwarded from the receiving and transmitting means 170 to the mobile terminal 110 in step 485. Now, the mobile terminal 110 can access in step 490 and 495 via receiving and transmitting means 170 and download the song "Take a Bow" (by Rihanna) from the storage means 130.

Alternatively, the access grant is not only forwarded to the mobile terminal 110 but also stored by portal 100 in relation to the mobile terminal 110 requesting the access. Future requests of the mobile terminal 110 are then handled by the receiving and transmitting means 170 based on the stored access grant.

In that way, it is avoided that access is granted to a multi-media content file which has a digital format which is not supported by mobile terminal 110. The aforementioned steps prevent a user from e.g. buying multi-media content files which are not supported by his or her mobile terminal 110.

Alternatively to the above described step 410, where a request for specific multi-media content files is send, a general request for any multi-media content files can be forwarded from the mobile terminal 110 to the receiving and transmitting means 170 e.g. in the case that the user "enters a shop hosted by portal 100. In that way, it is possible for the mobile terminal 110 to e.g. access a store of system 100 and search for specific multi-media content files. However, the store displays only multi-media content files which are supported by the capabilities of the mobile terminal 110. For this, the store may filter the available multi-media content files stored in storage means 130 by using matching unit 150. In that way, it is prevented that multi-media content files are presented to the user which are not supported by his or her mobile terminal 110.

In order to present the result in a suitable way, system 100 additionally comprises graphical use interface or any other frontend which is responsible for the presentation of the results in a way so that they can be displayed on a mobile terminal 110 or fixed terminal 210. The presentation of the results may be based on SMS, i-mode, WAP, web technology, etc.

Referring now to FIG. 5, a flow diagram is shown illustrating steps for accessing the multi-media content files stored in the database 130, according to an alternative embodiment of the invention. As already explained in context with FIG. 4, mobile terminal 110 sends a request to receiving and transmitting means 170 in step 510. This request can be a request for specific multi-media content files, but also can be a general request. As an example, the request of the mobile terminal 110 is made via WAP. In step 520, the request is forwarded from the receiving and transmitting means 170 to the mobile terminal characterizing unit 140. The mobile terminal characterizing unit 140 retrieves the information from the HTTP header field "User-Agent" which is, for example Samsung-SGH-Z400-Vodafone. This information is sent by the mobile terminal characterizing unit 140 in step 530 to database 160 in order to obtain information regarding the capabilities of that model. In step 540, database 160 sends the requested information to the mobile terminal characterizing unit 140. Depending on the request of the mobile terminal 110, mobile terminal characterizing unit 140 sends the complete information obtained from database 160 or only part of this information to matching unit 150 in step 540. In the case that the information regarding the requested access has not been forwarded in step 520 to mobile characterizing unit 140, mobile terminal characterizing unit 140 requests this information from receiving and transmitting means 170 in step 544 and receives this information in step 548 before contacting matching unit 150 in step 550.

Based on the general or specific request from mobile terminal 110, matching unit 150 starts a request to storage means 130 in step 560 and receives information regarding the digital format of the stored multi-media content files in step 570. Based on the complete information or only part of it, regarding the capabilities of the mobile terminal, the matching unit 150 determines which of the multi-media content files available have a digital format which is supported by the capabilities of the mobile terminal 110. The respective results are forwarded in step 580 to receiving and transmitting means 170 and transmitted in step 585 from receiving and transmitting means 170 to the mobile terminal 110. Based on the received information, mobile terminal 110 can access in steps 590 and 595 to the identified subset of multi-media content files having the format supported by the capabilities of the mobile terminal 110.

FIG. 6 shows a flow chart illustrating steps for accessing multi-media content files stored in the storage means 130 according to still another aspect of the preferred embodiment of the invention. In step 610, mobile terminal 110 sends a request for accessing multi-media content files to receiving and transmitting means 170. Contrary to the other alternatives explained in regard to FIGS. 4 and 5, the mobile terminal 110 sends in step 610 information indicating the capabilities of the mobile terminal. This information is received together with the request by the receiving and transmitting means 170 and forwarded in step 620 to mobile terminal characterizing unit 140. Mobile terminal characterizing unit 140 may counter-check the information regarding the capabilities of the mobile terminal by contacting database 160 in steps 630 and 640. In particular, the mobile terminal characterizing unit 140 may perform steps 630 and 640 in the case that the information regarding the capabilities of the mobile terminal 110 is not complete. In the case that information regarding the multi-media content files which the mobile terminal 110 wants to access has not been transmitted in step 620, mobile terminal characterizing unit 140 requests this information in steps 644 and 648. If mobile characterizing unit 140 has all information needed for identifying the multi-media content files according to the present invention, mobile terminal characterizing unit 140 forwards the information regarding the capabilities of the mobile terminal 110 and the information regarding the requested multi-media content to matching unit 150 in step 650. In steps 660 and 670 matching unit 150 requests and receives information from storage means 130 regarding the digital formats of the requested multi-media content. Again, matching unit 150 determines which multi-media content files have a digital format which is supported by the capabilities of the mobile terminal 110 and which correspond to the request of the mobile terminal. The respective results are forwarded to the mobile terminal 110 in steps 680 and 685 via receiving and transmitting means 170. Based on the transmitted information, the mobile terminal 110 has access via steps 690 and 695 to the requested multi-media content files.

In regard to FIGS. 4, 5 and 6 it has been outlined in which way it is determined by system 100 which multi-media content files are compatible with the capabilities of the mobile terminal 110. The delivery of this information to mobile terminal 110 also has been described in this regard. In the following, the information stored in database 160 and the information retrieved from storage means 130 is described in more detail. Moreover, the matching of the information retrieved from database 160 with the information retrieved from storage means 130 is also described in more detail in the following.

As outlined above, database 160, in the following also called "compatibility database 160" is an aggregation of the information preferably received from data source 260. The data stored in compatibility database 160 are updated periodically or on request in the case that new information is available from data source 260. According to a preferred version of the preferred embodiment, compatibility database 160 stores for each model of a mobile terminal identifiers used in the different communication standards, such as TAC code or content of the HTTP header field "User-Agent" together with the respective capabilities of the mobile phones, such as e.g. screen size, CSS support, XHTMLMP support, DRM support, display resolution, information regarding the operation system, information regarding the codecs, information regarding the WML script version and the WML version, information regarding the supported audio, video, games and image files, etc. This information is preferably stored in a data set. Additionally, the information regarding one model is also presented as aggregated information within one specific code which indicates the capabilities of the mobile terminal 110 by indicating the availability of the function by assigning "yes" or "true" or "0" and "1" according to a preferred version of the embodiment of the present invention.

2.1 Compatibility Key

Figure 7A:
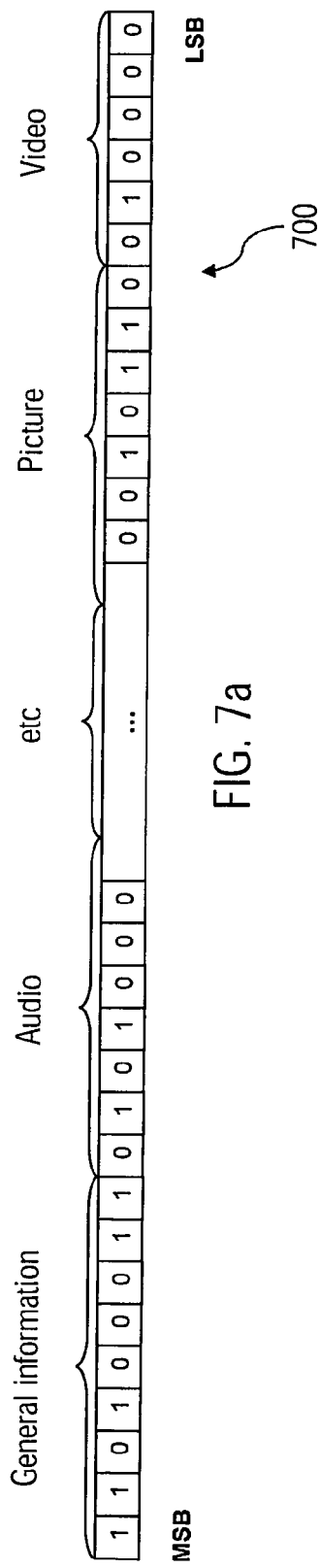
FIG. 7 is a schematic diagram of the compatibility key and the digital format key according to the preferred embodiment of the invention.

This aggregated information may be presented as one single key for each model or type of the mobile terminal 110 as, e.g. indicated in FIG. 7a. Alternatively, the key may consist of several parts, e.g. for indicating the capabilities for video, for picture, for audio, etc. separately, wherein the parts have a variable length depending on the number of digital formats which have to be supported. Providing the key in different parts, the length of the part for, e.g. audio, may be adapted in the case that new additional audio formats are introduced. In that case the length for the respective part can be adjusted.

FIG. 7a is a schematic diagram of the compatibility key 700 obtained from compatibility database 160, according to one version of the preferred embodiment of the invention. Preferably, this compatibility key 700 has a length of 256 bits, however, any length of this compatibility key 700 can be used, according to the present invention. Furthermore, the key provides different sections which preferably refer to different features of the mobile terminal such as general information, audio compatibility, picture compatibility, video compatibility, games compatibility, etc.

The compatibility key 700 as shown in FIG. 7a has the most significant bit at the leftmost position. Accordingly, the least significant bit is at the rightmost position. According to the compatibility key 700 shown in FIG. 7a, the first 9 bit positions of the key are assigned to the feature "general information". This information might represent specific features whether the mobile terminal supports Java script, WML script, whether it supports digital right management, CSS, etc. Alternatively, the length for the part "general information" is only 8 bit long or 16 bit long. Depending on the number of features of the mobile terminal which have to be covered by the compatibility key 700, the part "general information" may even have a longer length, too. Alternatively, no "general information" section is provided at all.

As further shown in FIG. 7a, the second section of the key refers to the audio capabilities of the mobile terminal 110. Indicated is a length of this part which is longer than 7 bits. Preferably, it is 8 bits long. However, it can be shorter or longer depending on the number of different audio formats which shall be covered by the key.

Each bit position of the audio section of compatibility key 700 refers to a specific audio format supported by the mobile terminal 110. For example, the bit positions shown in FIG. 7a correspond from left to right to audio formats MP3, WMA, WAV, OGG, VOX, MPC, AAC, etc.

As the first bit position of the audio section has the value "0", which corresponds to the audio format MP3, it follows that the mobile terminal 110 to which the compatibility key 700 corresponds, does not support audio files having a digital format of MP3. The second bit position of the audio section corresponds to the digital format WMA. The value in this bit field is "1". Thus, compatibility key 700 indicates that WMA files are supported by mobile terminal 110. The third bit position in the audio section, which corresponds to the audio format WAV, has the value "0" indicating that this format is not supported by mobile terminal 110. The fourth bit position in the audio section has value "1" indicating that digital format OGG, which corresponds to this bit position, is supported by the mobile terminal 110. Positions 5, 6 and 7, which correspond to the formats VOX, MPC and AAC, have the value "0" indicating that these formats are not supported by the mobile terminal 110.

Additionally, the compatibility key 700 comprises a section for indicating the compatibility in regard to picture formats. As indicated in FIG. 7a, the section for the picture formats may comprise more than 7 bit positions. Preferably, this picture section is also 8 bits long. However, it is not necessary that this section has the same length as other sections of the compatibility key 700. Depending on the available picture format, the picture section may be longer than 8 bits or even shorter than 8 bits.

As exemplarily shown in FIG. 7a, values "0" and "1" are filled into each bit field indicating whether a specific picture format is supported by the mobile terminal 110. Exemplarily, picture formats JPEG, PNG, GIF, TIF, etc. are assigned to the bit fields shown in the picture section from left to right. This means that JPEG and PNG format are not supported by mobile terminal 110, but picture format GIF is supported by the mobile terminal. Furthermore, as the value for the bit field corresponding to the TIF format has the value "0", it follows that this format is also not supported by mobile terminal 110.

Moreover, a section is provided in compatibility key 700 which indicates the compatibility of the mobile terminal 110 in regard to video formats. As exemplarily indicated in FIG. 7a, this video section is 6 bits long. Preferably, this video section comprises at least 8 bits, however, this section indicating the compatibility in regard to video formats can be shorter or longer than 8 bits depending on the number of different video formats covered by compatibility key 700.

As an example, video formats such as WMV, 3GP, MPEG4, AVI, TIVX and ASF are assigned to the bit fields in the video sections from left to right. With the exception of the second bit position which corresponds to the video format MPEG4, all other bit positions have the value "0". This means, mobile terminal 110 supports only digital video format MPEG.

Furthermore, the compatibility key 700 comprises additional sections indicating the compatibility of the mobile terminal 110 in regard to e.g. computer games, logos, screen savers etc.

The order of the sections of the compatibility key 700 shown in FIG. 7a is an exemplary order. Any different order of the sections is possible. Furthermore, according to an alternative version of the compatibility key 700, no sections are provided in the key 700. Each bit field in the key 700 is assigned a specific capability of the mobile terminal, however, there is no thematic order of the capabilities but a predefined other one. The compatibility key 700 may be used for sound, video and picture files, for WAP/HTML pages, messages, wallpapers, screen savers, logos, computer games, executable programs, etc. This will be explained in more detail further below.

Below Table 1 is a more detailed description of a preferred embodiment of the compatibility key 700. In the first column of the table the relevant bit position of the compatibility key is indicated. The second column describes which functions and formats are supported. The third and fourth column describe to which type of format (image, video or audio) and which subtype of format (browser, logo, video download, video streaming, ringtones, music) the respective bit position refers.

As indicated in Table 1 a first bit range (0 to 15) is reserved for general information such as color capability, phonic capabilities, Java capability, video capability, streaming capability, DoCoMo Java (DoJa) capability (an proprietary object oriented programming language) or Symbian capability (an open operating system). These first bit positions from 0 to 15 represent two bytes. As can be seen 5 bit positions are not yet defined and are usable for defining further general capabilities of the mobile terminal 110.

In a second range (bit positions from 16 to 79) image capabilities of the mobile terminal 110 are defined. These eight bytes are further subdivided. Two bytes (bit positions from 16 to 31) define specific image capabilities (browser-support) of the mobile terminal 110, further four bytes (bit positions from 32 to 63) define further image capabilities of the mobile terminal 110 regarding black and white and/or color logos and additional two bytes (bit positions from 64 to 79) define image capabilities of the mobile terminal 110 regarding animated logos. As already explained in regard to the first range not all bit positions are already reserved for specific image capabilities of the mobile terminal 110. There are unreserved bit positions which are usable for future capabilities of the mobile terminal 110.

In a third range (bit positions from 80 to 127) video capabilities of the mobile terminal 110 are defined. These six bytes are also further subdivided. Three bytes (bit positions from 80 to 103) define video capabilities of the mobile terminal 110 regarding downloaded videos and further three bytes (bit positions from 104 to 127) define video capabilities of the mobile terminal 110 regarding steamed videos. Similar to the first and second range specific bit positions of the compatibility key 700 are not yet assigned to specific capabilities of the mobile terminal 110. Thus it is possible to adapt the compatibility key 700 to future technologies also in regard to video capabilities.

The fourth range (bit positions from 128 to 255) refers to audio capabilities of the mobile terminal 110. Two bytes (bit positions from 128 to 143) define audio capabilities of the mobile terminal 110 to play specific monophonic or polyphonic formats for e.g. ringtones. Another two bytes (bit positions from 144 to 159) define audio capabilities of the mobile terminal 110 to play specific alert tones. Further eight bytes (bit positions from 160 to 223) define audio capabilities of the mobile terminal 110 to play specific real tone formats. Finally, four bytes (bit positions from 224 to 255) define audio capabilities of the mobile terminal 110 to play specific full track formats for e.g. music. Also for this fourth range specific bit positions of the compatibility key 700 are not yet assigned to specific capabilities of the mobile terminal 110.

TABLE 1

| Bit Position | Description | Product Type | Product Subtype |
| --- | --- | --- | --- |
| 0 | Color capable | | |
| 1 | Monophonic capable | | |
| 2 | Polyphonic capable | | |
| 3 | Realtone capable | | |
| 4 | Alert tone capable | | |
| 5 | Fulltrack capable | | |
| 6 | Java capable | | |
| 7 | Video capable | | |
| 8 | Stream capable | | |
| 9 | DoJa Capable | | |
| 10 | Symbian Capable | | |
| 11 | | | |
| 12 | | | |
| 13 | | | |
| 14 | | | |
| 15 | | | |
| 16 | wbmp | image | browsersupport |
| 17 | bmp | image | browsersupport |
| 18 | gif 87 | image | browsersupport |
| 19 | gif 89a animated | image | browsersupport |
| 20 | gif 89a transparent | image | browsersupport |
| 21 | jpeg | image | browsersupport |
| 22 | png 8 | image | browsersupport |
| 23 | png 24 | image | browsersupport |
| 24 | png transparent | image | browsersupport |
| 25 | | | |
| 26 | | | |
| 27 | | | |
| 28 | | | |
| 29 | | | |
| 30 | | | |
| 31 | | | |
| 32 | wbmp operator logo | image | bwlogo |
| 33 | wbmp screensaver | image | bwlogo |
| 34 | gif logo 5 kB | image | colorlogo |
| 35 | gif logo 10 kB | image | colorlogo |
| 36 | gif logo 14 kB | image | colorlogo |
| 37 | gif logo 19 kB | image | colorlogo |
| 38 | gif logo 25 kB | image | colorlogo |
| 39 | gif logo 29 kB | image | colorlogo |
| 40 | gif logo 38 kB | image | colorlogo |
| 41 | gif logo 47 kB | image | colorlogo |
| 42 | gif logo 57 kB | image | colorlogo |
| 43 | gif logo 90 kB | image | colorlogo |
| 44 | gif logo 140 kB | image | colorlogo |
| 45 | gif logo no limit | image | colorlogo |
| 46 | jpeg logo 5 kB | image | colorlogo |
| 47 | jpeg logo 7 kB | image | colorlogo |
| 48 | jpeg logo 10 kB | image | colorlogo |
| 49 | jpeg logo 12 kB | image | colorlogo |
| 50 | jpeg logo 15 kB | image | colorlogo |
| 51 | jpeg logo 19 kB | image | colorlogo |
| 52 | jpeg logo 24 kB | image | colorlogo |
| 53 | jpeg logo 29 kB | image | colorlogo |
| 54 | jpeg logo 50 kB | image | colorlogo |
| 55 | jpeg logo 57 kB | image | colorlogo |
| 56 | jpeg logo 63 kB | image | colorlogo |
| 57 | jpeg logo 150 kB | image | colorlogo |
| 58 | jpeg logo no limit | image | colorlogo |
| 59 | png logo no limit | image | colorlogo |
| 60 | | | |
| 61 | | | |
| 62 | | | |
| 63 | | | |
| 64 | gif logo animated 7 kB | image | animatedlogo |
| 65 | gif logo animated 10 kB | image | animatedlogo |

TABLE 1-continued

| Bit Position | Description | Product Type | Product Subtype |
|---|---|---|---|
| 66 | gif logo animated 14 kB | image | animatedlogo |
| 67 | gif logo animated 20 kB | image | animatedlogo |
| 68 | gif logo animated 24 kB | image | animatedlogo |
| 69 | gif logo animated 29 kB | image | animatedlogo |
| 70 | gif logo animated 33 kB | image | animatedlogo |
| 71 | gif logo animated 50 kB | image | animatedlogo |
| 72 | gif logo animated 57 kB | image | animatedlogo |
| 73 | gif logo animated 70 kB | image | animatedlogo |
| 74 | gif logo animated 78 kB | image | animatedlogo |
| 75 | gif logo animated 90 kB | image | animatedlogo |
| 76 | gif logo animated 100 kB | image | animatedlogo |
| 77 | gif logo animated 195 kB | image | animatedlogo |
| 78 | | | |
| 79 | | | |
| 80 | 3GP QCIF H263 AMRNB 100 Kbs 12 Kbps 8 Khz 15fps mono | video | download |
| 81 | 3GP QCIF H263 AWB 100 Kbs 24 Kbps 16 Khz 15fps mono | video | download |
| 82 | 3GP QCIF H263 AAC 100 Kbs 64 Kbps 32 Khz 15fps mono | video | download |
| 83 | MP4 QCIF AAC 100 Kbs 64 Kbps 32 Khz 15fps mono | video | download |
| 84 | MP4 QVGA AAC 100 Kbs 64 Kbps 32 Khz 15fps mono | video | download |
| 85 | 3GP QCIF H264 AAC 100 Kbs 64 Kbps 32 Khz 15fps mono | video | download |
| 86 | 3GP QVGA H264 AAC 100 Kbs 64 Kbps 32 Khz 15fps mono | video | download |
| 87 | Video download pour le WEB | video | download |
| 88 | 3GP QCIF MPEG4 AAC mono 3GP i-mode | video | download |
| 89 | 3GP QCIF MPEG4 AAC mono 3GP i-mode | video | download |
| 90 | | | |
| 91 | | | |
| 92 | | | |
| 93 | | | |
| 94 | | | |
| 95 | | | |
| 96 | | | |
| 97 | | | |
| 98 | | | |
| 99 | | | |
| 100 | | | |
| 101 | | | |
| 102 | | | |
| 103 | | | |
| 104 | 3GP2 | video | stream |
| 105 | Video preview pour le WEB | video | stream |
| 106 | | | |
| 107 | | | |
| 108 | | | |
| 109 | | | |
| 110 | | | |
| 111 | | | |
| 112 | | | |
| 113 | | | |
| 114 | | | |
| 115 | | | |
| 116 | | | |
| 117 | | | |
| 118 | | | |
| 119 | | | |
| 120 | | | |
| 121 | | | |
| 122 | | | |
| 123 | | | |
| 124 | | | |
| 125 | | | |
| 126 | | | |
| 127 | | | |
| 128 | Monophonic MIDI WAP | audio | monophonic |
| 129 | Monophonic RTTTL ext RTX SMS | audio | monophonic |
| 130 | | | |
| 131 | polyphonic 16 tones SP-MIDI | audio | polyphonic |
| 132 | polyphonic 32 tones SP-MIDI | audio | polyphonic |
| 133 | polyphonic 4 tones SP-MIDI | audio | polyphonic |
| 134 | polyphonic 16 tones MLD MFI-v2 i-mode | audio | polyphonic |
| 135 | polyphonic 32 tones MLD MFI-v3 i-mode | audio | polyphonic |
| 136 | polyphonic 32 tones MLD MFI-v3 MITSUBISHI-SAGEM i-mode | audio | polyphonic |
| 137 | polyphonic 16 tones SMAF-MA2 max8192bytes | audio | polyphonic |
| 138 | polyphonic 40 tones SMAF-MA3 volume 114 | audio | polyphonic |
| 139 | polyphonic 40 tones SMAF-MA3 volume 74 | audio | polyphonic |
| 140 | polyphonic 16 tones WAV Sagem codec ADPCM 8 Khz 4 bits max64 kB | audio | polyphonic |

TABLE 1-continued

| Bit Position | Description | Product Type | Product Subtype |
|---|---|---|---|
| 141 | polyphonic 16 tones extension WAV Sagem codec ADPCM 8 Khz 4 bits max30 kB | audio | polyphonic |
| 142 | | | |
| 143 | | | |
| 144 | 3GP AAC-LC 56 kbps mono 16 bits 32 khz 5 s | audio | alerttone |
| 145 | 3GP AAC-LC imode 64 kbps mono 16 bits 16 khz 5 s | audio | alerttone |
| 146 | 3GP HE-AAC 64 kbps stereo 16 bits 44.1 khz 5 s | audio | alerttone |
| 147 | AAC AAC-LC 64 kbps mono 16 bits 44.1 khz 5 s | audio | alerttone |
| 148 | AAC AAC-LC 96 kbps stereo 16 bits 32 khz 5 s | audio | alerttone |
| 149 | MMF SMAF-MA2 mono 8 khz 8 bits 5 s | audio | alerttone |
| 150 | MMF SMAF-MA3 mono 11.025 khz 16 bits 5 s | audio | alerttone |
| 151 | MP3 112 kbps mono 16 bits 44.1 khz 5 s | audio | alerttone |
| 152 | MP3 56 kbps mono 16 bits 22.05 khz 5 s | audio | alerttone |
| 153 | MP3 96 kbps stereo 16 bits 32 khz 5 s | audio | alerttone |
| 154 | MP4 AAC-LC 56 kbps mono 16 bits 32 khz 5 s | audio | alerttone |
| 155 | MP4 AAC-LC 96 kbps stereo 16 bits 32 khz 5 s | audio | alerttone |
| 156 | WAV IMA ADPCM 8 KHz-4 bits-mono 5 s | audio | alerttone |
| 157 | | | |
| 158 | | | |
| 159 | | | |
| 160 | 3GP AAC imode 30 s max210 kB | audio | realtone |
| 161 | 3GP AAC-LC 40 kbps 32 KHz mono 30 s max150 kB | audio | realtone |
| 162 | 3GP AAC imode 10 s max 100 kB pre-use WAP | audio | realtone |
| 163 | 3GP AAC-LC 40 kbps 32 KHz mono 45 s max225 kB | audio | realtone |
| 164 | 3GP AAC-LC 40 kbps 32 KHz mono 60 s max300 kB | audio | realtone |
| 165 | 3GP HE-AAC 48 kbps 44.1 khz 30 s | audio | realtone |
| 166 | AAC 64 kbps 44 KHz mono 30 s max240 kB | audio | realtone |
| 167 | AAC 64 kbps 44 KHz mono 45 s max360 kB | audio | realtone |
| 168 | AAC 64 kbps 44 KHz mono 60 s max480 kB | audio | realtone |
| 169 | AAC 96 kbps 32 KHz stereo 30 s max350 kB | audio | realtone |
| 170 | ADTS HE-AAC 48 kbps 44.1 khz 30 s | audio | realtone |
| 171 | AMR-NARROWBAND 12.2 kbps 8 KHz mono max50 kB 30 s | audio | realtone |
| 172 | AWB AMR-WIDEBAND 15.85 kbps 8 KHz mono max61 kB 30 s WAP | audio | realtone |
| 173 | MLD MFI-v3 Mitsubishi-M430i max30 kB 7 s i-mode | audio | realtone |
| 174 | MLD MFI-v3 Nec-N400i max30 kB 7 s i-mode | audio | realtone |
| 175 | MLD MFI-v3 Samsung-S341i max30 kB 7 s i-mode | audio | realtone |
| 176 | MMF SMAF-MA2 12 s max48 kB 12 s | audio | realtone |
| 177 | MMF SMAF-MA2 max100 kB 25 s with pre-use 3sfadout WAP | audio | realtone |
| 178 | MMF SMAF-MA2 max30 kB 7 s | audio | realtone |
| 179 | MMF SMAF-MA3 11 Khz max85 kB 15 s | audio | realtone |
| 180 | MMF SMAF-MA3 11 KHz max165 kB 30 s WAP | audio | realtone |
| 181 | MMF SMAF-MA3 16 KHz max120 kB 15 s | audio | realtone |
| 182 | MP3 112 kbps 44.1 kHz mono max412 kB 30 s | audio | realtone |
| 183 | MP3 32 kbps 16 KHz max60 kB special-TIM 15 s | audio | realtone |
| 184 | MP3 40 kbps 16 KHz mono max140 kB 30 s | audio | realtone |
| 185 | MP3 56 kbps 22 KHz mono max105 kB 15 s | audio | realtone |
| 186 | MP3 56 kbps 22 KHz mono max225 kB 30 s | audio | realtone |
| 187 | MP3 56 kbps 22 KHz mono max338 kB 45 s | audio | realtone |
| 188 | MP3 56 kbps 22 KHz mono max450 kB 60 s | audio | realtone |
| 189 | | | |
| 190 | MP3 stereo 64 kbps 22 KHz 30 s max240 kB | audio | realtone |
| 191 | MP3 stereo 96 kbps 32 KHz 30 s max355 kB | audio | realtone |
| 192 | MP4 AAC 56 kbps ABR 32 KHz 30 s max230 kB | audio | realtone |
| 193 | MP4 AAC 56 kbps ABR 32 KHz 30 s max230 kB peak −1.5 dB | audio | realtone |
| 194 | MP4 AAC 56 kbps CBR 32 KHz 30 s max250 kB | audio | realtone |
| 195 | MP4 AAC 56 kbps CBR 32 KHz 45 s max375 kB | audio | realtone |
| 196 | MP4 AAC 56 kbps CBR 32 KHz 60 s max500 kB | audio | realtone |
| 197 | MP4 AAC 96 kbps 32 KHz stereo 30 s max360 kB | audio | realtone |
| 198 | RMF 11 KHz max90 kB 15 s | audio | realtone |
| 199 | WAV IMA ADPCM 11 Khz max170 kB 30 s | audio | realtone |
| 200 | WAV IMA ADPCM 16 Khz max240 kB 30 s | audio | realtone |
| 201 | WAV IMA ADPCM 8 Khz 4 bits 30 s max130 kB | audio | realtone |
| 202 | WAV Sagem codec ADPCM 8 Khz 4 bits 15 s max64 kB | audio | realtone |
| 203 | WAV Sagem codec ADPCM 8 Khz 4 bits 30 s max130 kB | audio | realtone |
| 204 | WAV Sagem ADPCM 7 s 8 KHz 4 bits max30 kB | audio | realtone |
| 205 | WAV codec PCM 16 Khz 8 bits max188 kB 12 s | audio | realtone |
| 206 | | | |
| 207 | | | |
| 208 | | | |
| 209 | | | |
| 210 | | | |
| 211 | | | |
| 212 | | | |
| 213 | | | |
| 214 | | | |
| 215 | | | |

TABLE 1-continued

| Bit Position | Description | Product Type | Product Subtype |
|---|---|---|---|
| 216 | | | |
| 217 | | | |
| 218 | | | |
| 219 | | | |
| 220 | | | |
| 221 | | | |
| 222 | | | |
| 223 | | | |
| 224 | WMA 192 kbps 44 KHz stereo web full | audio | fulltrack |
| 225 | WMA 96 kbps 22 KHz stereo web preview (stream) 30 s | audio | fulltrack |
| 226 | MP3 64 kbps 44 KHz stereo mobile full | audio | fulltrack |
| 227 | MP3 64 kbps 44 KHz stereo mobile 120 s | audio | fulltrack |
| 228 | MP3 64 kbps 44 KHz stereo mobile 90 s | audio | fulltrack |
| 229 | AAC 64 kbps 44 KHz stereo mobile full | audio | fulltrack |
| 230 | AAC 64 kbps 44 KHz stereo mobile 120 s | audio | fulltrack |
| 231 | AAC 64 kbps 44 KHz stereo mobile 90 s | audio | fulltrack |
| 232 | 3GP AAC-LC 64 kbps 44 KHz stereo mobile full | audio | fulltrack |
| 233 | 3GP AAC-LC 64 kbps 44 KHz stereo 120 s | audio | fulltrack |
| 234 | 3GP AAC-LC 64 kbps 44 KHz stereo 90 s | audio | fulltrack |
| 235 | MP4 AAC 64 kbps 44 KHz stereo mobile full | audio | fulltrack |
| 236 | MP4 AAC 64 kbps 44 KHz stereo mobile 120 s | audio | fulltrack |
| 237 | MP4 AAC 64 kbps 44 KHz stereo mobile 90 s | audio | fulltrack |
| 238 | HEAAC 64 kbps 44 KHz mono mobile full imode 1 Mo max | audio | fulltrack |
| 239 | | | |
| 240 | | | |
| 241 | | | |
| 242 | | | |
| 243 | | | |
| 244 | | | |
| 245 | | | |
| 246 | | | |
| 247 | | | |
| 248 | | | |
| 249 | | | |
| 250 | | | |
| 251 | | | |
| 252 | | | |
| 253 | | | |
| 254 | | | |
| 255 | | | |

As explained above Table 1 describes a preferred embodiment of the compatibility key 700. Alternatively, the compatibility key 700 may comprise more bit positions or even less bit positions, more ranges or less ranges. Furthermore, the arrangement of the subdivisions may be varied.

In a further alternative embodiment different specific compatibility keys 700 are assigned to specific type or model of mobile terminal 110 e.g. for image capabilities, video capabilities, audio capabilities and computer game capabilities.

According to another alternative embodiment a first compatibility key 700 is used for image capabilities, video capabilities and audio capabilities and a second compatibility key 700' is used for capabilities to run games. For this, the second compatibility key 700' comprises compatibility information on the operation system, display resolution, kind of game controller keys, etc. which can be used to identify a specific version of a video or software game which fits best to a particular mobile terminal 110 as it has been described above in regard to FIGS. 4 to 6 for music files.

2.2 Digital Format Key

Preferably, the counter part to compatibility key 700 is a key or part of a key which indicates the digital formats which are available for a specific multi-media content. Preferably, the data format key refers to a group of multi-media content files which belong together. As an example the song "Take a Bow" may be stored as two multi-media content files wherein one multi-media content file has format MP3 and one multi-media content file has format WMA.

Figure 7B:
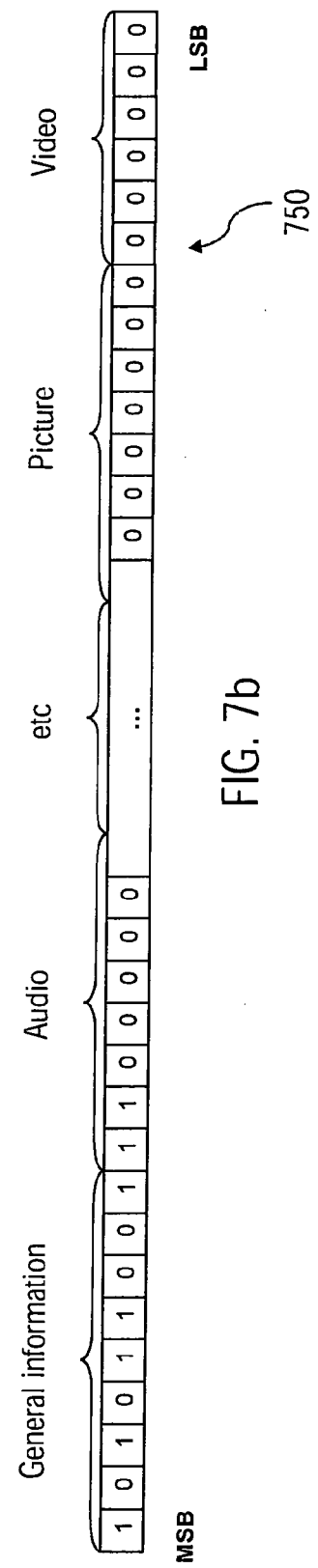

Preferably, one digital format key is assigned to this group of multi-media content files. An example for such a digital format key is shown in FIG. 7*b*. Corresponding to compatibility key 700, digital format key 750 has a section regarding general information of the multi-media content files, a section regarding the audio formats provided by the group of multi-media content files, a section for indicating the different picture formats provided by the group of multi-media content files and a section for indicating the different video formats provided by the multi-media content files. Furthermore, digital format key 750 may comprise additional sections regarding information about other digital formats.

The length of the sections of the digital format key 750 corresponds to the length of the sections of the compatibility key 700. Furthermore, each bit position in the digital format key 750 corresponds to the same digital format as the corresponding bit position in the compatibility key 700.

As shown in FIG. 7*b* the digital format key 750 has the most significant bit at the leftmost position. Accordingly, the least significant bit is at the rightmost position. Corresponding to the compatibility key 700 shown in FIG. 7*a*, the first 9 bit positions of the digital format key 750 are assigned to the feature "general information". This information might represent specific information regarding the multi-media content file or files to which it corresponds. As explained in regard to the compatibility key 700 the length of the section general information may be even longer or shorter, too.

The second section in the digital format key 750 is the audio section. The first bit position, i.e. the leftmost bit position in FIG. 7b of the audio section of digital format key 750, corresponds to MP3 as the first bit position of the audio section of the compatibility key 700 also corresponds to the digital format MP3. The song "Take a Bow" is available in format MP3. Therefore, the value in this bit field is "1". Accordingly, the second bit position of the audio section corresponds to the digital format WMA. The value in this bit field is "1" as the song "Take a Bow" is available also in WMA format as mentioned above. The third bit position in the audio section, which corresponds to the audio format WAV, has the value "0" indicating that this format is not available for the song "Take a Bow". The fourth bit position in the audio section has value "0" indicating that digital format OGG, which corresponds to this bit position, is also not available. Positions 5, 6 and 7, which correspond to the formats WAX, MPC and AVI, have also the value "0" indicating that these formats are also not available.

Additionally, the digital format key 750 comprises a section for indicating the compatibility in regard to picture formats. As indicated in FIG. 7b, the section for the picture formats may comprise more than 7 bit positions. Preferably, this picture section is also 8 bits long. However, it is not necessary that this section has the same length as other sections of the compatibility key 700. Depending on the available picture format, the picture section may be longer than 8 bits or shorter than 8 bits.

As exemplarily shown in FIG. 7b, only values "0" are filled into each bit field indicating that no picture format is available as only audio formats MP3 and WMA are available for the song "Take a Bow". Exemplarily, picture formats JPEG, PNG, GIF, TIF, etc. are assigned to the bit fields shown in the picture section from left to right.

Moreover, a section is provided in digital format key 750 which indicates the compatibility of the mobile terminal 110 in regard to video formats. As exemplarily indicated in FIG. 7b, this video section is 6 bits long. Preferably, this video section comprises at least 8 bits. However, this section indicating the compatibility in regard to video formats can be shorter or longer than 8 bits depending on the number of different video formats available.

As an example, video formats such as WMV, 3GP, MPEG, AVI, TIVX and ASF are assigned to the bit fields in the video sections from left to right. All bit positions have the value "0". This means, no digital video format is available for the song "Take a Bow".

Furthermore, the digital format key 750 comprises additional sections indicating the availability of other formats and versions e.g. for computer games.

Preferably, the digital format keys 750 corresponding to the multi-media content have the same bit length. Moreover, all audio sections in the digital format keys 750 have preferably the same length. Preferably, the same is valid for the general information section or header section, the picture section, the video section, etc.

As the digital format keys 750 are the counter part to compatibility keys 700 both keys have preferably the same bit length. Preferably this is the case, if the compatibility keys 700 and the digital format keys 750 are provided in full bit length. For the above-mentioned exemplary embodiment this would mean that both keys are provided in full 256 bit length.

According to a preferred embodiment the digital format key 750 is also structured in accordance with Table 1. If, for example the song "Viva La Vida" from "Coldplay" is available in the formats WMA 192 kbps 44 KHz stereo web full, MP3 64 kbps 44 KHz stereo mobile full, AAC 64 kbps 44 KHz stereo mobile full, 3GP AAC-LC 64 kbps 44 KHz stereo mobile full, MP4 AAC 64 kbps 44 KHz stereo mobile full and HEAAC 64 kbps 44 KHz mono mobile full imode 1Mo max the bit positions 224, 226, 229, 232, 235 and 238 would be flagged with value "1". All other bit positions would be marked with "0". Furthermore, if the music video "Comme II Se Doit" from "Marc Antoine" is available in the formats "3GP QCIF H263 AMRNB 100 Kbs 12 Kbps 8 Khz 15 fps mono", "3GP QCIF H263 AWB 100 Kbs 24 Kbps 16 Khz 15 fps mono", "3GP QCIF H263 AAC 100 Kbs 64 Kbps 32 Khz 15 fps mono", "MP4 QCIF AAC 100 Kbs 64 Kbps 32 Khz 15 fps mono", "MP4 QVGA AAC 100 Kbs 64 Kbps 32 Khz 15 fps mono", "3GP QCIF H264 AAC 100 Kbs 64 Kbps 32 Khz 15 fps mono" and "3GP QVGA H264 AAC 100 Kbs 64 Kbps 32 Khz 15 fps mono" for download and as "3GP2" for streaming the bit positions 81 to 86 and 104 would be flagged with value "1". All other bit positions would be flagged with "0".

In the case that the digital format key 750 would comprise also a section for computer games additionally bit positions in the "general section" (bit positions 0 to 15) could be flagged in the case that the computer games require specific capabilities such as Java, DoJa or Symbian compatibility.

According to an alternative embodiment, a specific digital format key 750' is provided for video or software games which correspond to the above described compatibility key 700'. Both keys, 700' and 750', are used in the same way as the keys 700 and 750. However, compatibility key 700' and digital format key 750' refer to features of software or video games.

2.3 Alternative Embodiments of the Keys

Alternatively, only parts of the compatibility key 700 and the digital format key 750 are used in order to determine whether a specific song is available in a digital format supported by the capabilities of terminal 110. In that case either an additional header section which indicates the number of sections, the order of sections and their length, is provided for both keys or this information is placed in the section general information. Thus, the sections can be identified from the information in the header of the key and used separately by concatenating the key according to the header information.

For this alternative embodiment of the compatibility keys 700 and the digital format keys 750 only the audio section of the compatibility key 700 and the audio section of the digital format key 750 is used in the case that the mobile terminal sends a request for audio files. In the same way, sections for pictures, videos, etc. can be used if corresponding requests are sent by the mobile terminal 110. Thus less information has to be exchanged and less information has to be compared for determining which multi-media content files are supported by the capabilities of the mobile terminal 110.

For the alternative embodiment of the compatibility keys 700 and the digital format keys 750 wherein only parts of the keys are provided there is the additional option that the bit length of the sections of each key differ. For example the audio section of the compatibility key 700 of a specific mobile terminal 110 is 6 bits long wherein the audio section of the digital format key 750 corresponding to a group of multi-media content files is e.g. 10 bits long. As the order of the digital formats assigned to the respective bit fields in each of the audio sections is the same both information can be compared for determining which multi-media content files are supported by the capabilities of the mobile terminal 110.

According to a further alternative embodiment of the digital format key 750 the digital format key 750 covers only specific digital formats. If the digital format key 750 refers to a music file the digital format key 750 comprises information that it refers only to music formats and information indicating the available digital formats. Thus, an exemplary embodiment of this alternative version of the digital format key 750 referring e.g. to a music song comprises a header section indicating that the digital format key 750 refers to music formats, and only one section which represents the digital formats available for this music song.

In an other alternative embodiment of the compatibility keys 700 and the digital format keys 750 do not provide specific sections for audio, video, picture etc. formats but comprise the same order of formats assigned to the bit fields in the compatibility keys 700 and the digital format keys 750.

The compatibility keys 700 retrieved in steps 450 or 540 from database 160 may be stored in parts or completely by the matching unit 150 and/or the mobile terminal characterizing unit 140 for the complete session of the user when the user has logged into the system 100. Alternatively, the compatibility keys 700 or parts of it are retrieved from database 160 for each request of the mobile terminal 110. The information regarding the compatibility of the mobile terminal 110 provided e.g. in step 610 may be stored in parts or completely by the receiving means and/or the mobile terminal characterizing unit 140 and/or the matching unit 150 for the complete session of the user when the user has logged into the system 100. Alternatively, the information regarding the compatibility of the mobile terminal 110 or parts of it are provided by the mobile terminal 110 for each request of the mobile terminal 110.

For all these embodiments mentioned above an additional feature is that according to the order of the bit fields in regard to the MSB and the LSB a priority is assigned. This would mean e.g. that a bit position closest to the MSB has the highest priority. For the embodiment in which different sections are provided this would mean that e.g. the bit position of the audio section closest to the MSB i.e. the first bit position of the audio section has the highest priority. Alternatively, the highest priority can be assigned the bit position closest to the LSB.

Alternatively to the aforementioned option an additional priority key may be provided indicating the priority of each format indicated in the key. This additional priority key assigns to each bit position and thus to each digital format corresponding to that bit position a priority.

By providing additional priority information either via the order of the bit positions or an additional priority key or an additional field in the compatibility key 700 and/or the digital format key 750 it is possible to select the multi-media content files with the highest priority from the all the multi-media content files which are supported by the capabilities of the mobile terminal 110. For the above mentioned example where the song "Take a Bow" is provided in formats MP3 and WMA it might be that the mobile terminal 110 supports both digital formats. If the highest priority is assigned to digital format MP3, only access to the multi-media content file with the digital format MP3 may be granted to the mobile terminal 110 by the system 100. Alternatively, the multi-media content file with the digital format MP3 may be highlighted or otherwise marked as the preferred version of the requested multi-media content.

In the following further examples are given in order to further illustrate the concept for identifying a subset of the plurality of multi-media content files having one or more specific digital formats which is or are supported by the capabilities of the mobile terminal 110.

2.4 Further Illustrative Examples

In the most preferred embodiment the compatibility key 700 has a length of 256 bits and is reserved for each model. However, this is an illustrative example only and any bit length, format and coding scheme may be used as mentioned above.

As an alternative to the above described version of the compatibility key 700 another key structure is described in the following.

While the first bits, for example bits 1 to 20, of the compatibility key 700 are reserved for general compatibility information such as "supporting videos yes/no", "supporting images yes/no", all following bits are associated to one specific digital format, a "1" signifying for example that the format is supported, a "0" signifying that the digital format is not supported. An example of this is illustrated in Table 1.

TABLE 1

| Type or format of multi-media content file | ID | Binary ID | Priority (ranking) |
|---|---|---|---|
| MP3 | 1 | 00001 | 3 |
| AAC | 2 | 00010 | 1 |
| 3GP | 4 | 00100 | 2 |
| MP4 | 8 | 01000 | 1 |
| AVI | 16 | 10000 | 2 |

Table 1 shows how the information regarding the five different digital formats MP3, AAC, 3GP, MP4 and AVI can be arranged. In the above exemplary case a five bit long section of the compatibility key 700 represents the information regarding whether or not these digital formats are supported by the mobile terminal. The decimal value "1" is assigned to the digital format MP3 for the case that this format is supported by the mobile terminal 110. In a binary notation this corresponds to "00001" meaning that the LSB has been assigned to the digital format MP3. Correspondingly, the binary value "00010" is set in the case that the mobile terminal 110 supports the digital format AAC. The value "00100" represents the case that the mobile terminal 110 supports the digital format 3GP and the value "01000" indicates that the mobile terminal 110 supports the digital format MP4. Value "10000" expresses that the mobile terminal 110 supports the digital format AVI.

In the case that the mobile terminal 110 supports all five digital formats the above mentioned section of the compatibility key 700 would have the value "11111". The decimal value of this code section would then be "31".

Transferring either the value "11111" or the value "31" to a lookup table comprised e.g. in system 100 the respective capabilities of the mobile terminal 110 can be identified.

The respective information could be also expressed with hexadecimal values preferably for the case that the above mentioned code section would have the size of 8 bits. The code section indicating that the mobile terminal 110 supports the digital formats MP3, AAC, 3GP, MP4 would then have the value 0x0F.

Examples how these values are matched with the respective sections of the digital format key 750 are described further below.

In a corresponding way the format of the digital format key 750 can be set up.

As shown in Table 1 a priority value is additionally assigned to each bit field representing a digital format. This priority value may be used in the case that several different digital formats are available for the same multi-media content such as e.g. for a specific music video, wherein several or all of these available digital formats are supported by the mobile terminal 110. In the case that the mobile terminal 110 supports MP3, AAC, 3GP, MP4 and AVI and the requested music video is available in 3GP and MP4 the multi-media content file with digital format 3GP will be presented as the preferred version as its priority is higher than the priority of the MP4 format. Alternatively, only the multi-media content file with digital format 3GP is presented to the user.

In an alternative version the capabilities of the mobile device 110 are ranked in priority order. This means that the most important capability is allocated to the most significant bit (MSB). MP3 is the least significant bit in the above example.

On a classical database, the maximum length of an integer code word is 8 bytes. Using these integer code words of 8 bytes length and the above mentioned bit coding 8 times 8 bits would be available for the description of the capabilities of the mobile terminal 110. Therefore, according to this limitation only 64 different formats can be registered. However, the present invention is not limited to this number of formats and any number may be registered.

The compatibility key 700 which thus represents a compatibility indicator code i.e., the compatibility of the capabilities of the mobile device 110 with the different types of multi-media content can then be computed as follows.

If, for example, a mobile device 110 has the capability to play or display AAC, 3GP and AVI files, its compatibility indicator ID or code (found by an OR combination), respectively the corresponding part of the compatibility key 700, is

AAC+3GP+AVI

2+4+6=22 or

00010+00100+10000=10110

If the media source; i.e., the requested multi-media content, stored in storage means 130 has the multiple digital formats MP3, AAC and 3GP, its compatibility indicator ID is (also found by an OR combination), respectively the respective section of the digital format key 750, is

MP3+AAC+3GP

1+2+4=7 or

00001+00010+00100=00111

According to an above mentioned version of the digital format key 750 it refers to a limited number of digital formats only and comprises only information representing the limited number of digital formats available for this music song. For the above mentioned example the digital format key 750 may comprise a header section for indicating that it refers to a limited number of digital formats only and the section 00111.

Matching the section "10110" of the compatibility key 700 and the section "00111" of the digital format key 750 e.g. by an AND operation would give the result "00110" indicating that the supported formats AAC and 3GP are available.

Additionally considering that AAC has priority value "1" and 3GP has the priority value "2", the multi-media content with the 3GP format is the preferred file format as the digital format 3GP has the higher priority level.

Furthermore, another type of digital format could be, for example, where the first 10 Bits indicate
the Browser:
0000000001=Opera 1.0,
0000000010=Opera 1.1,
0000000011="Browser XYZ", etc.
or Screen Size:
0000000001=128×160, etc In the example here, the browser Opera is used, since this is a browser that is commonly used by mobile devices and that many mobile devices have already installed when they are bought. However, any other web browser that is compatible with the mobile terminal 110 could be used.

Furthermore, using the assignment of the capabilities to MSB or LSB, simple filters can be used. For example filtering odd values may be used in order to find all parts of the keys where the LSB is set. Furthermore, by filtering for even values, all parts of keys may be obtained where the LSB has the value "0". Furthermore, threshold values may be used in order to identify parts of the keys or keys where bits above or below a specific position are set.

Storing the information of specific digital formats supported by a mobile model will be further explained, by way of example only, with a bit field comprising only five bits and no general compatibility information bits: In this exemplary first bit field, the least significant bit may stay for the digital format MP3, the second bit for AAC, the third bit for 3GP, the fourth bit for MP4, and the most significant bit for AVI. A mobile terminal supporting only the digital format MP3 would have a first bit field reading 00001, a mobile terminal supporting only 3GP would have a first bit field reading 00100, while a mobile supporting all five digital formats would have an associated first bit field reading 11111.

Besides the digital formats supported, the characterizing unit 140 also stores other information. Other properties stored about the mobile terminals include screen size, supported colors, supported software languages, etc. Further, the above-described keys are not restricted to a length of 5 bits—any number of bits may be used. Just parts of the 256 bit key may be used by the matching unit 150 for matching the capabilities of the mobile terminal 110 with the digital format or, alternatively, the complete 256 bit key can be used for matching.

As outlined above, in each bit code, each type of multi-media content is allocated a certain number of bits, i.e., a "sub key", which is a fragment of the key. For example, the first ten bits can relate to general information, the second ten bits to music or audio files (a "music sub key"), the third ten bits to video files (a "video sub key"), the fourth ten bits to picture files (a "picture sub key"), and so on. Each bit is allocated a place in the sub key but there may also be some empty spaces for storing later uploaded content; e.g. ringtones.

2.5 Matching

Figure 8:
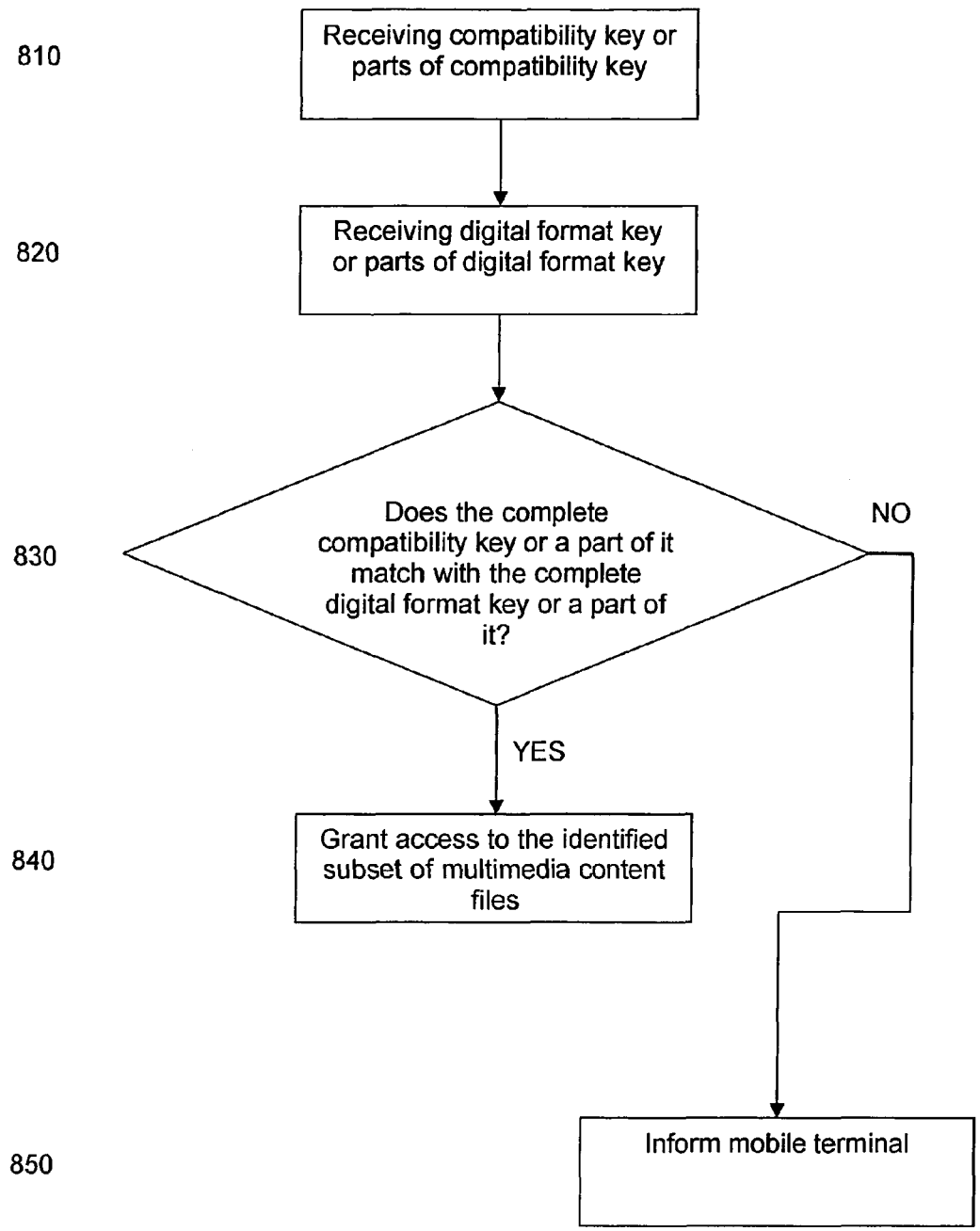
FIG. 8 is a flow chart illustrating the steps for matching the compatibility key with the digital format key according to the preferred embodiment of the invention.

FIG. 8 shows a flow chart for matching the compatibility key 700 with the digital format key 750. According to this preferred version of the matching process, the compatibility key or sub keys of the compatibility key 700 are received in step 810. As shown in FIGS. 4 to 6, compatibility key 700 may be received by mobile terminal characterizing unit 140 or matching unit 150 from database 160.

In step 820, one or more digital format keys 750 are retrieved from storage means 130 depending on the requests sent by the mobile terminals 110. In the case that the mobile terminal 110 requests only one specific multi-media content, such as one specific music song, only one digital format key 750 or parts of it is retrieved from storage means 130, which corresponds to the requested song. In the case that the mobile terminal 110 requests access for e.g. several music songs or music songs and video clips, the corresponding digital format keys 750 or at least parts of them are retrieved from storage means 130.

In step 830, the compatibility key 700 or parts of the compatibility key 700 are matched with the digital format keys 750 or parts of it. In the case that database 160 provides a complete digital format key or in the case that the mobile terminal 110 has provided a complete compatibility key 700, matching unit 750 or mobile terminal characterizing unit 140 may determine whether it uses for the matching step 830 the complete compatibility key 700 or only parts of it. Furthermore, if the storage means 130 have provided one or more digital format keys 750, preferably matching unit 150 may determine whether it uses the complete digital format key 750 or only sub keys of it.

As the matching of both keys is performed in the matching unit 150, a preferred solution is that the matching unit 150 stores the compatibility key 700 for a certain time, preferably, at least as long as the session of the mobile terminal with the system 100 lasts. Thus, the matching unit 150 can reuse the compatibility key 700 for successive requests from the mobile terminal 110 and decide whether it uses parts of the compatibility key 700 or the complete key for the matching with the digital format key 750.

Preferably, corresponding sub keys of the compatibility key 700 and the digital format key 750 are matched. This matching can be performed e.g. by an AND operation wherein the results indicate by "0" or "1" which digital formats are available and are supported by the capabilities of the mobile terminal 110. The matching step 830 will be explained in detail further below.

In the case that the matching of the complete compatibility key or parts of it with one or more complete digital format keys 750 or parts of them gives the result that at least one multi-media content file is identified which provides a digital format which is supported by the capabilities of the mobile terminal 110 the mobile terminal 110 will be informed about this result in step 840. Via this information access may be granted to the identified subset of multi-media content files which have digital formats supported by the capabilities of the mobile terminal 110.

In the case that the result of the matching step 830 is that no multi-media content file could be found which is available in a digital format that supports the capabilities of the mobile terminal 110, the mobile terminal 110 is informed about that result in step 850.

In that way, the user of the system is informed about the availability of compatible multi-media content files before he or she buys this multi-media content. Furthermore, unnecessary transmission costs may be avoided in that way, as no multi-media content files are transmitted which are not compatible with the capabilities of mobile terminal 110.

Figure 9:
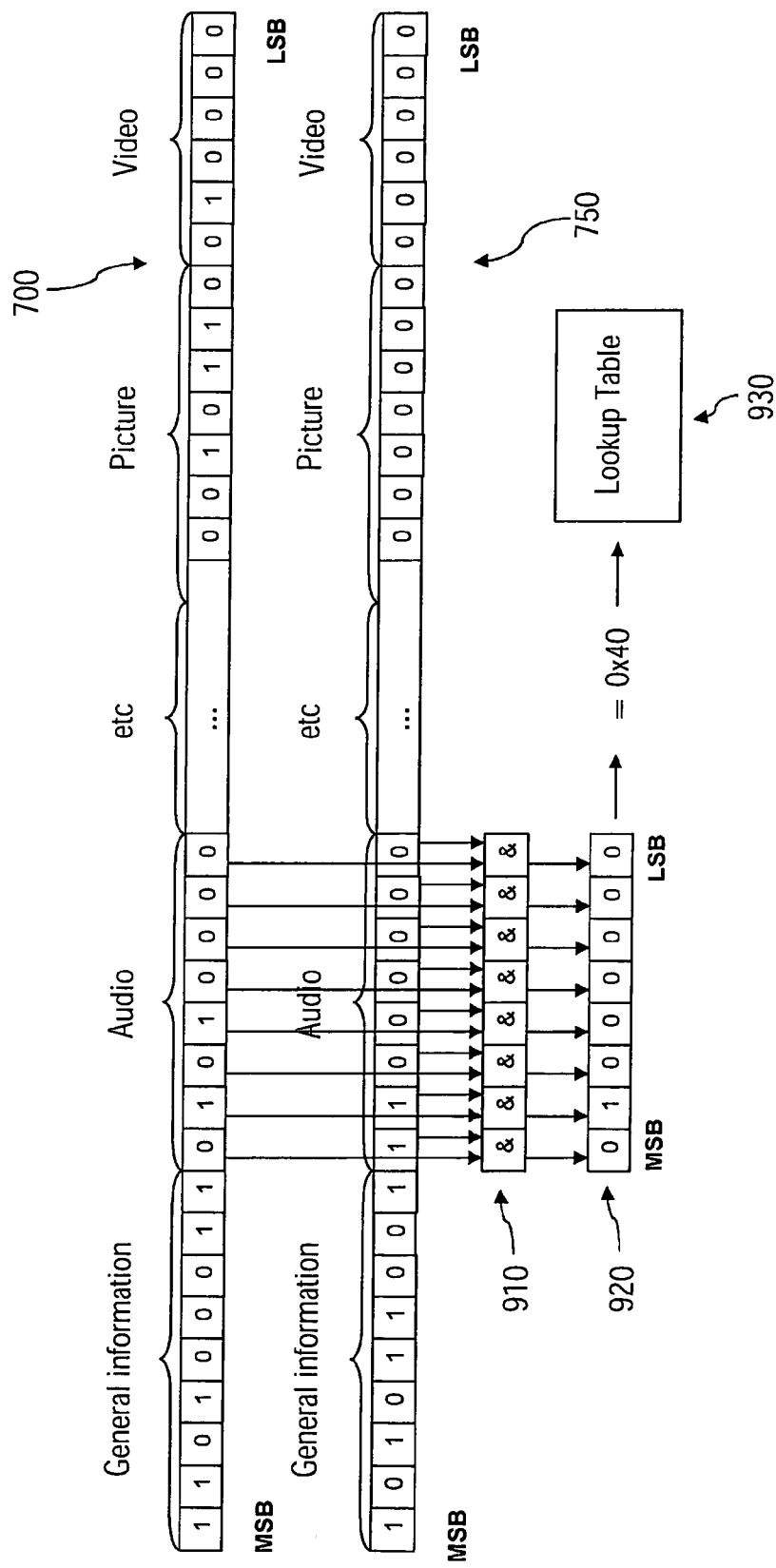
FIG. 9 is a schematic diagram illustrating matching the compatibility key with the digital format key according to the preferred embodiment of the invention.

FIG. 9 is a schematic diagram of the matching the compatibility key 700 with the digital format key 750. As shown in FIG. 9, compatibility key 700 and digital format key 750 have an identical format. However, as already explained above, the format of both keys may differ in the case that only parts of them are matched with each other. According to FIG. 9, compatibility key 700 and digital format key 750 comprise at least the sections "general information", "audio", "picture" and "video". In the following, exemplarily the matching of the audio section of the compatibility key 700 with the audio section of the digital format key 750 is described.

The audio section of the compatibility key 700 and the audio section of the digital format key 750 comprise each 8 bit fields. The leftmost bit position of the audio section, i.e. the MSB corresponds with the capability of the mobile phone to play MP3 songs. The second bit position of the audio section corresponds with the capability of the mobile terminal 110 to play WMA files. Furthermore, third, fourth, fifth, sixth, seventh and eight bit position correspond with the capability of the mobile terminal 110 to play and/or decode WAV, OGG, VOX, MPC, AVI, etc. files.

Correspondingly, the bit fields in the audio section of the digital format key 750 correspond from left to right, i.e. from MSB to LSB to the availability of a MP3, WMA, WAV, OGG, VOX, MPC, AVI, etc. digital format for the requested multi-media content file is available.

As mentioned above, matching is performed preferably by performing an AND operation. In FIG. 9, a respective unit 910 is shown for performing an AND operation on the bit fields of the audio section of the compatibility key 700 and the bit fields of the audio section of the digital format key 750. For this, the value of the first bit field of the audio section of the compatibility key 700 is forwarded together with the first bit field of the audio section of the digital format key 750 to unit 910. On both values an AND operation is performed in unit 910. As shown in FIG. 9, the value in the first bit field of the audio section of the compatibility key 700 is "0". The value of the first bit field in the audio section of the digital format key 750 is "1". Accordingly, an AND operation on these values will result in the value "0". The respective result is output by unit 910 to result unit 920. As the values for the second bit fields in the audio sections of the compatibility key 700 and the digital format key 750 are both "1", the AND operation on these values will result in value "1", which is also output by unit 910 to result unit 920. As for the other bit fields none of the corresponding values are both "1", the AND operation on bit fields 3 to 8 results in "0"s. Consequently, the result obtained by result unit 910 is "01000000" which corresponds to hexadecimal value "0x40".

In the case that the above mentioned operation results in value "0", then no digital format is available for the request that multi-media content file which is supported by the capabilities of the mobile terminal 110. Accordingly, system 100 would inform the mobile terminal 110 in step 850 that no compatible format for the requested song can be provided by system 100. In the case that the value of the result of the matching step is larger than "0", at least one digital format of the requested multi-media content is available which is supported by the capabilities of the mobile terminal 110. In order to identify which digital format version of the requested multi-media content shall be forwarded to the mobile terminal 110, a look up table 930 may be used, which provides pointers to the respective digital formats. For the case described in FIG. 9, hexadecimal value "0x40" points to digital format WMA. In the case that matching step would result in a value "0xC0" which corresponds to the binary format "11000000", look up table 930 would provide pointers to the digital formats MP3 and WMA.

As mentioned above, according to an alternative embodiment of the present invention, additionally priority values may be provided for the respective digital formats. Preferably, these priority values are fed to the look up table which then decides and forwards the respective information which digital format version of the requested multi-media content is the preferred version. Alternatively, the priority ranking is provided via ordering the respective digital formats in the respective section, according to their priority. For the exemplary case shown in FIG. 9 MP3 digital format which corresponds to the most significant bit would then have assigned the highest priority. Correspondingly, the LSB in the audio section would have assigned the lowest priority. In that way, no additional information is necessary for look up table 930 to determine which format is the preferred digital format.

In an alternative version of the matching, several different matching steps are performed in order to identify the subset of multi-media content files which corresponds to the request from the mobile terminal 110 and which is supported by the capabilities of the mobile terminal 110. In the case that the highest priority is assigned to the MSB in the respective section, it might be checked for the compatibility key 700 which is the leftmost bit field, i.e. the bit field with the highest value which is not "0". When this bit position is identified, it can be checked in a subsequent step whether the value in the corresponding bit position of the digital format key 750 is also not "0". In the case that the respective value in the digital format key 750 is "1", a positive result is obtained and the mobile terminal can be informed according to step 840. In the case that the corresponding value in the digital format key 750 is "0", in the next step the next lower non-"0" bit position in the compatibility key 700 is determined and the respective bit position in the digital format key 750 is checked. This routine is repeated until a positive result is achieved or until the LSB is reached without obtaining a positive result. In that case, mobile terminal 110 is informed according to step 850.

Alternatively, digital filtering techniques could be used for matching compatibility key 700 with digital format key 750, such as filtering for odd or even values or specific threshold values.

Furthermore, partitioning both keys in corresponding blocks of e.g. 8 bit length, respective blocks can be easily matched and the results forwarded to the look up table which provides pointers to the respective digital formats. In an alternative version, the content of the result unit 920 is matched with priority values before the results of the matching step are forwarded to the look up table.

As outlined above each multi-media content file is provided with a digital format key 750. While the first bits of each digital format key 750 preferably characterize the kind of multi-media content as video, ring tone, full track etc., the other bits of the digital format key 750 are associated to a different digital format each. The above example given for a digital music file can also be applied to digital files containing videos, pictures, ring tones, etc.

The structure of the digital format keys 750 is identical to the structure of the compatibility keys 700. Therefore, the explanation given for the compatibility keys 700 representing the identifiers of the mobile device 110 in the characterizing unit 140 applies here as well. For example, as explained above with reference to Table 1, a multi-media content which is provided in the digital formats MP3, AAC and 3GP would have a respective sub key reading 00111.

The compatibility of the capabilities of the mobile device with the type of digital format of the multi-media files stored in the database 130 is then found by the matching unit 140 by an AND combination of the two compatibility indicator IDs. I.e., 10110
00111
00110=6=AAC and 3GP.

Therefore the mobile device is able to download the AAC and 3GP files from the storage means 130. Since, as shown in Table 1, the AAC file has a higher priority ranking than the 3GP file, the 3GP file will be provided from the database 130 to the mobile device 110.

In the storage means 130 a multitude of multi-media content files is stored in a plurality of different digital formats. Usually, this multi-media content is provided by commercial multi-media content providers. The multi-media content can be provided via a so called ingestion and content management system and via a contract management system, as will be described in more detail below. These systems are coupled to the storage means 130, and preferably also to upload storage area 230 and are designed preferably to manage the database or databases or to provide the database or databases with content, information (e.g. digital rights management (DRM)) and interface with providers. Thus it is possible that a content provider can automatically upload multi-media content which is automatically transcoded according to the respective digital rights and all necessary information regarding the DRM formats etc. is generated automatically. Preferably, the generation of respective digital format keys 750 is handled by these systems. Transcoding and digital rights management will be described in more detail below.

These commercial content providers provide their content in a limited number of digital formats, for example MP3, AAC, 3GP, MP4, AVI etc. Some content providers provide multi-media content in only one of these digital formats, some provide multi-media content in only a few of these formats and limited to only these formats and some content providers provide multi-media content files in all possible available formats. Digital rights prevent transcoding of these files into other digital formats. By analogy to the mobile terminal characterizing unit 140, information about the digital format in which the multi-media content is provided in the storage means 130 and can, for example, be provided in the digital format keys 750. However, the information about the digital format in which the multi-media content is stored in the storage means 130 may also be stored in other places and forms, using different bit keys.

For example the 5 bit key and 256 bit key (or any other bit length key) may be generated for different applications and purposes. These keys may also be stored in storage means 130 having a pointer to a specific song for downloading onto the mobile device 110. An example of this is illustrated below wherein the song "Locomotive Breath" is stored in different digital formats.

Song: Locomotive Breath
Interpreter: Jethro Tull
Available formats: MP3, WAV, WMA, OGG, etc. . . . .

In one embodiment, a fragment key or sub key is assigned to this song which is 1111 . . . having only as many bits as formats. This provides the advantage that the system is flexible. If more formats are available, this "music key" becomes longer.

This fragment key/"music key" is stored with or in relation with this song in the database.

Alternatively a complete key is stored having the complete length.

Alternatively, for each song and each version a separate key is stored, for example:

Jethro Tull: Locomotive Breath, MP3→1000
Jethro Tull Locomotive Breath, WAV→>0100, etc., for the fragment key and separate long keys having the same length as the compatibility key 700 for the long version of the keys.

If a mobile terminal 110 supporting the three digital formats AAC, 3GP and AVI, i.e., with a corresponding compatibility key 700 or sub key of it, for example, 10110 (computed as illustrated above from the binary IDs given in Table 1), accesses system 100 and wants to download the above mentioned multi-media content, the matching unit 140 will compare the compatibility key 700 or sub key with the "music key" by effecting a conjunction or AND operation between the respective bit fields as shown in FIG. 9 and as set out in the above example.

Although the AND operation is explained illustratively as an example above, the bit code could also be transformed into hexadecimal (HEX) format and be filtered to an odd or even threshold as already explained above.

Furthermore, the matching may also be performed outside the matching unit 140. For example, the bit key may be forwarded to another software application or unit either in the system 100 or outside the system 100, for example to the mobile terminal 110, which can also perform a matching operation; i.e., adding the capability code of the mobile terminal 110 or parts of it with the bit key. Instead of adding the capability code of the mobile terminal with that of the bit key representing the digital content of the multi-media file, also masking or other operations could be used, where the result is 0 or 1.

For example, if the mobile terminal 110 has the capability to play the music formats MP3, WAV, WMA, OGG, its compatibility indicator ID, i.e. compatibility key 700 is 1111, according to one embodiment of the invention. Furthermore, the digital format MP3 is assigned with the highest priority. Then the first highest priority key is 1000, second highest priority key is 0100, etc. The music key, i.e. the sub key for music formats of the digital format key 750 is then, e.g. 0111, meaning that the song is only available in WAV, WMA, OGG.

The masking of the respective keys is preferably performed in the following way.

In a first step the sub key of the compatibility key 700 "0111" is masked with the highest priority key "1000" and music key "0111". As this masking is performed via an AND operation the result of this masking is "0". As the result is "0" in a subsequent step the sub key of the compatibility key 700 "0111" is masked with the second highest priority key "0100" and music key "0111". The result of this masking is a non zero value.

As mentioned above the priority handling of the multi-media content gains the more importance the more different digital formats are available simultaneously. A music key of 00110 indicates that the multi-media content is available in two digital formats, e.g. AAC and 3GP which are also might be supported by the mobile terminal 110. The matching unit 140 preferably further comprises means for weighting the digital formats in terms of technical quality and/or bandwidth requirements. In cases as shown in the example where the matching unit finds two or more matching digital formats, the digital format with the highest priority will be used. The priority given for the five digital formats of our example, may be AAC and MP4 as the best formats, 3GP and AVI on second place and, with less priority, MP3. Alternatively, the prioritization can be performed by another entity provided in another layer of the system 100 or by another application outside the system 100, for example in the mobile terminal 110 itself. Alternatively, the matching unit 140 generates the respective priority keys based on the means for weighting the digital formats in terms of technical quality and/or bandwidth requirements and/or other capabilities of the mobile terminal 110 according to a specified rule.

2.6 Generation of the Key

Figure 10:
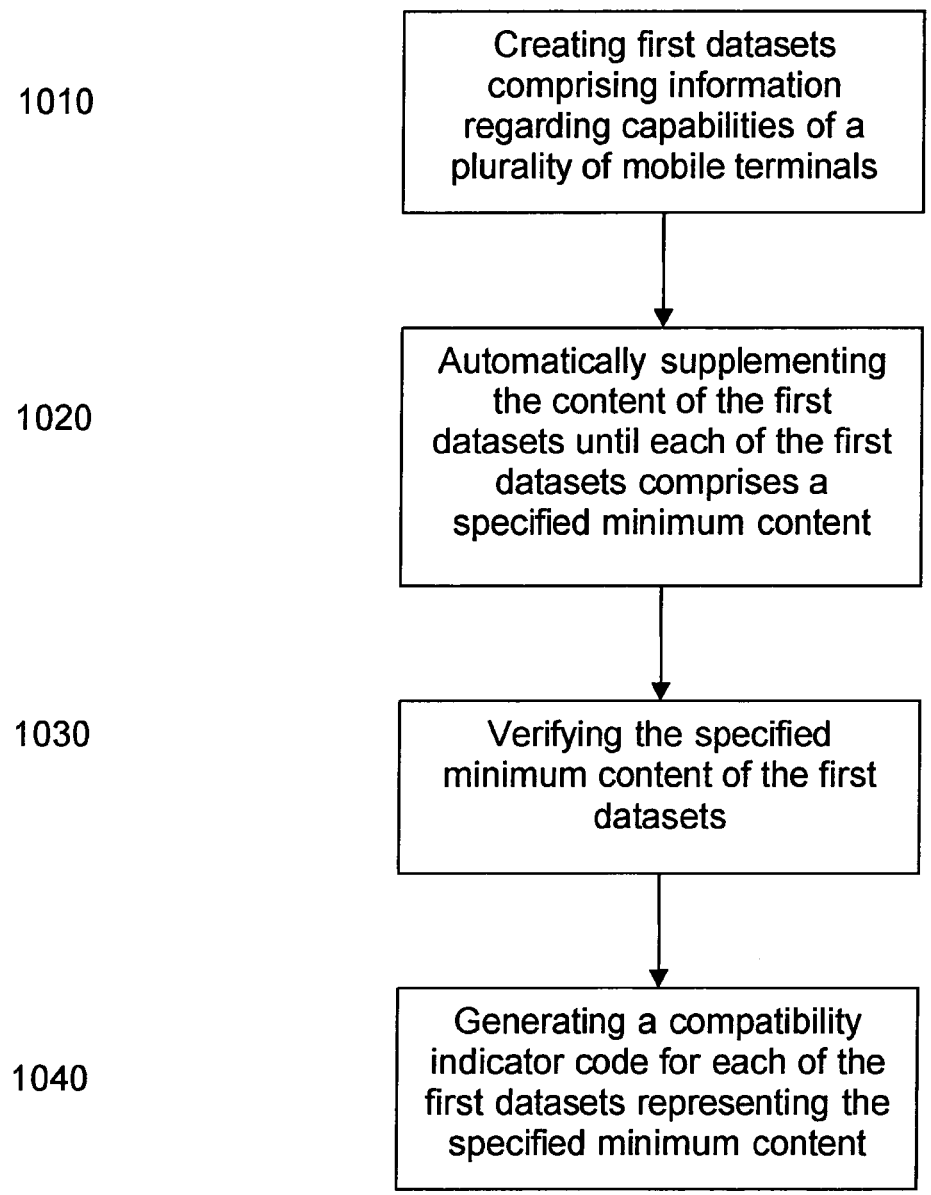
FIG. 10 is a flow chart visualizing the steps for generating the compatibility key according to the preferred embodiment of the invention.

FIG. 10 is a flow chart which describes the generation of the compatibility key 700. In a first step 1010, a dataset is created which comprises as much information as possible regarding the capabilities of a plurality of mobile terminals. These first datasets may be generated based on an automatic analysis of the models of mobile terminals 110 available on the market. By analyzing the capabilities of a specific mobile terminal, e.g. Nokia N95-2 with 8 GB storage, one may obtain information on the screen size, e.g. 240×320, regarding the camera resolution, e.g. 2,582×1,944, display colors, e.g. 262, 144, etc.

Based on these first datasets which are preferably stored in a database, additional information may be retrieved in step 1020 regarding all models of mobile terminals 110 already identified in the first datasets but also regarding models of mobile terminals 110 which are not yet comprised by first datasets. Step 1020 is performed until each of the first datasets comprises a specified minimum content. The specified minimum content preferably comprises information regarding the capabilities regarding reading, decoding and playing audio files and video files, showing pictures, etc. Step 1020 may be performed in regard to several different databases 310 to 360 which may be contacted automatically and in a respective order.

By using a number of different databases 310 to 360 in order to complete the datasets for obtaining the specified minimum content for each of the datasets, arises the problem that redundant information may be obtained from these databases 310 to 360. In order to handle this, specific priorities can be assigned to the respective databases which depend on the reliability of the content they provide. This means, in the case that a database provides a highly reliable content, a high priority is assigned to this database. In the case that two more databases provide contradictory information regarding one specific feature of one specific model of a mobile terminal 110, the information of the database with the highest priority is chosen for supplementing the respective datasets.

Furthermore, if the first datasets comprise already information which is in contradiction to the information provided by database with the highest priority, a further verification process is used by matching the content or part of the content of the first datasets with the content or part of the content of datasets of the other databases. This is performed in step 1030 and is preferably an optional step. When the content or part of the content of the first datasets is matched with the content or part of the content of the other databases, it is determined which content or which part of the content of the first datasets is not identical with the content or part of the content in the datasets comprised in the other databases. According to these results, e.g. depending on the priority and the number of databases which provide identical information, it is determined to substitute the content or part of the content of the first datasets with the corresponding content of the other databases in the case that this specific content of the first datasets is not identical with that of the other databases.

Furthermore, in step 1040 a compatibility indicator code, i.e. preferably compatibility key 700 is generated for each of the first datasets representing the specified minimum content and having preferably a length of 256 bits.

In that way, it is achieved that for as many as possible different models of mobile terminals a minimum amount of compatibility information is automatically collected from the databases. In the case that the first dataset does not comprise, in step 1010, information regarding TAC, system 100 would contact, e.g. a TAC code database in order to obtain the TAC code of, e.g. Nokia N95-2 8 GB which is "35954201", and supplement the first dataset accordingly. In the case that the first dataset would not comprise the value for the HTTP header field "User-Agent", system 100 would contact in step 1020 database WURFL in order to retrieve this information. For e.g. Nokia N95-2 8 GB, the content of this field would be "Nokia N95 Smartphone".

Furthermore, from another database information regarding video codecs or audio codecs, the information regarding the software platform used in the mobile terminal 110 or the Java Platform Micro Edition may be retrieved. In the case that, e.g. a specific first database provides information regarding the Wireless Mark-up Language maximum deck size of Nokia N95 as "357,000" and a second database provides for the same feature a contradictory value, such as "257,000" then system 100 decides on the priority assigned to the first and second database which value is the most reliable value and, thus, the value which is added to the first dataset.

Below, an exemplary embodiment of such a first dataset comprising the specified minimum content is shown.

Nokia N95-2 8 GB
TAC: 35954201
User Agent Nokia N95 Smartphone
Platform: Flash Lite Version: 1.0, Flash Lite Version: 1.1, Flash Lite Version: 2.0
Symbian OS Version: 9.2
Audio codecs: aac
Video codecs: h263 v0, mpeg4, real media 8
Screen size: 240×320
Display Colors: 262144
Camera Size: 2582×1944
Java Platform Micro Edition (J2ME):
CLDC version: 1.0, CLDC version:1.1
MIDP version: 1.0, MIDP version: 2.0
Specific JSR: JSR-75 (File system), Specific JSR: JSR-82 (Bluetooth)
Specific JSR: JSR-120 (Wireless Messaging API)
Specific JSR: JSR-135 (Mobile Media API)
Specific JSR: JSR-179 (Location API)
Specific JSR: JSR-184 (Mobile 3D Graphics API)
Wireless Markup Language (WML):
Max Deck Size: 357000
wml script: script 1.0, script 1.1 script 1.2, script 1.3
wml version: wml 1.1, wml 1.2, wml 1.3
Audio formats: MP3, WMA, WAV, OGG, VOX, MPC, AVI
Video formats: AAC, 3GP, MP4, AVI
Picture formats: JPEG, PNG, GIF, TIF Based on this information, compatibility key 700 is generated. According to a given format for compatibility key 700, the information of the dataset regarding Nokia N95-2 8 GB is used in order to fill into the defined format of the compatibility key 700 the respective true or false values or "1"s and "0"s. Thus, the compatibility key 700 is filled up with all required information regarding the capabilities of N95-2 8 GB.

As shown in the above dataset support is given form JPEG, PNG, GIF and TIF. Accordingly, respective bit fields in the compatibility key 700 will be filed with "1". All other bit field of compatibility key 700 which correspond to formats which are not supported by N95-2 8 GB are filled with "0".

2.7 Further Applications of the Key

As mentioned above, the compatibility key 700 may be used for sound, music, video and picture files, for wallpapers, games, etc. but also for WAP/HTML pages, for messages, etc. which will be explained in more detail below.

Figure 11:
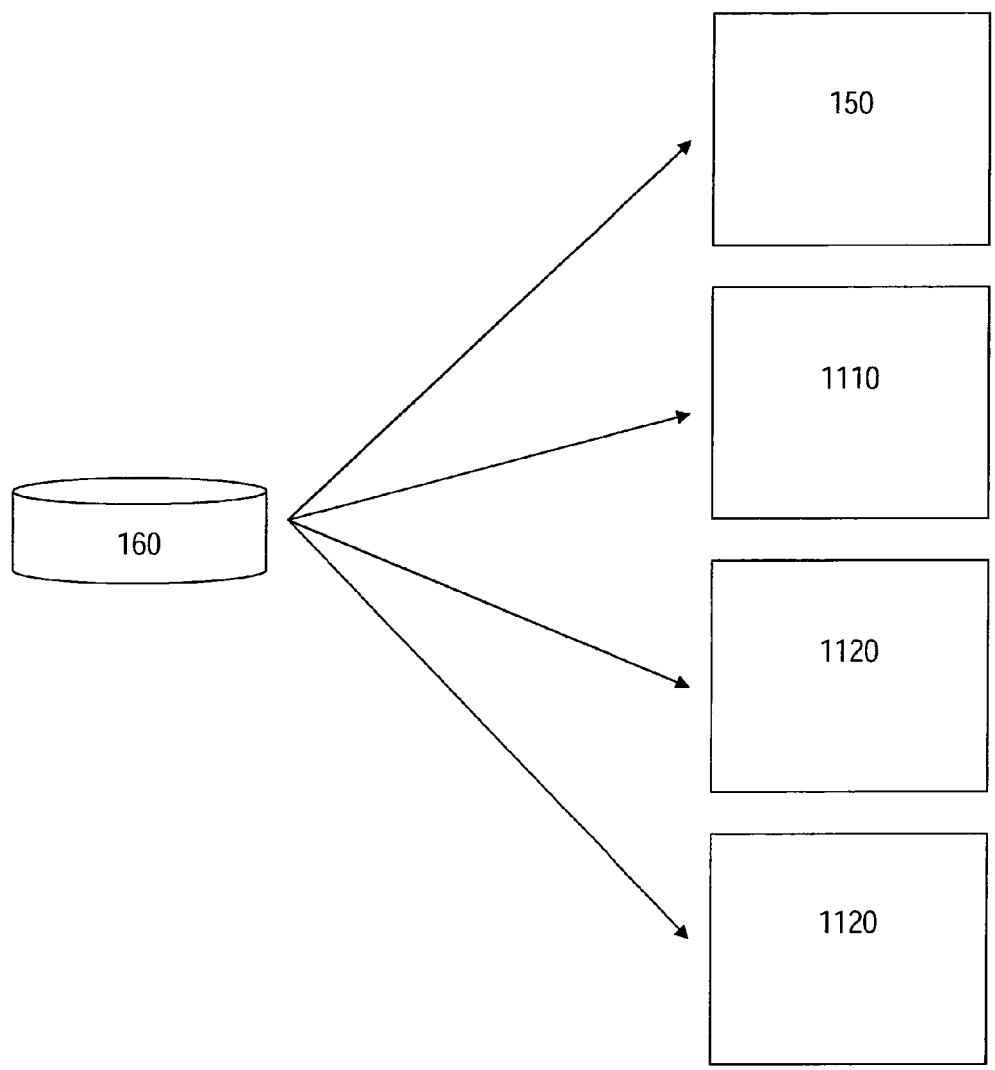
FIG. 11 is schematic diagram illustrating further applications of the compatibility key according to the preferred embodiment of the invention.

Furthermore, the compatibility key 700 is used by matching unit 150 to identify a subset of multi-media content files which correspond to the request from the mobile terminal and which are also supported by the capabilities of the mobile terminal. For this, matching unit 150 preferably retrieves the compatibility key 700 from compatibility database 160. As shown in FIG. 11, the compatibility key 700 can also be used for further applications such as a frontend module 1110 for publishing the personalized WAP/HTML web pages, for an assistant or crawler module 1120 for providing or searching specific content and for an address book 1130 for storing data about the capabilities of the mobile terminals of other persons with which multi-media content files shall be shared.

Frontend module 1110 preferably uses compatibility key 700 in order to determine, e.g. the screen size, the available display colors, information regarding the Java platform and further information regarding the WML script, etc. In that way, personalized or mobile terminal specific content can be generated which fits best to the display of the mobile terminal 110 on which the content is displayed.

Furthermore, the compatibility key 700 can be used in an assistant or crawler unit 1120 which offers the service to search in the world wide web for specific content such as music, video clips, etc. Based on the compatibility key 700, the assistant or crawler module 1120 is able to filter information which is not supported by the capabilities of the mobile terminal 110. In that way, it is avoided to display hits of a search which cannot be displayed or otherwise used on the mobile terminal 110.

Moreover, the compatibility key 700 can be used as additional information in an address book or the above-mentioned buddy lists for the case that multi-media content files shall be shared with persons listed in the address book or buddy lists. By storing information about the capabilities of the mobile terminal 110 of a specific person in address book 1130, it is possible to determine whether specific multi-media content files which have a specific digital format can be displayed on a mobile terminal 110 of a person with which the specific multi-media content file shall be shared. Generally, there is the possibility to transcode multi-media content so that it is available in the most popular digital formats. However, it might be that specific multi-media content is protected by digital rights. In that case, it is not possible to transcode a specific multi-media content file with a specific digital format into another digital format. In that case, by knowing the capabilities of the mobile terminal 110 of a person with which the multi-media content files shall be shared, helps to identify whether the available digital format is supported by the other person's mobile terminal 110. If the digital format of the multi-media content file is not supported by the capabilities of the mobile terminal 110 of the other person, it would not make sense to inform this person that one would like to share the multi-media content with him or her.

3. Other Subsystems

While FIGS. 1 to 11 give an overview over system 100 in regard to the compatibility management, other subsystems of portal 100 are described in detail in the following.

3.1 Dispatcher

Figure 12:
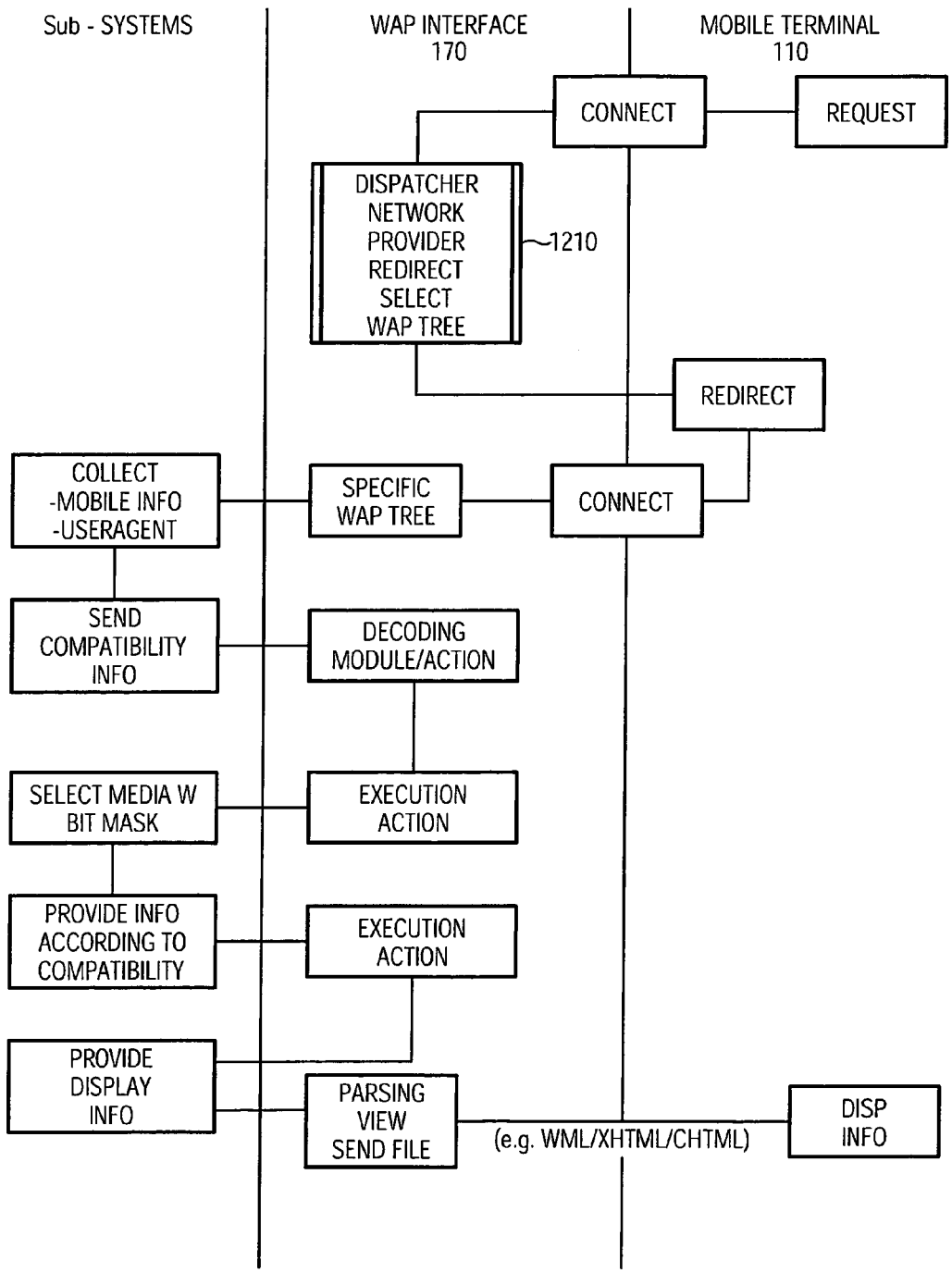
FIG. 12 visualizes steps of an embodiment of the method of a preferred embodiment of the invention for accessing a content providing system by a mobile terminal.

The interaction of the so called front end of the system 100 with a mobile terminal 110 will be explained with reference to FIG. 12. In the preferred embodiment, in which the system is implemented as a website on the internet in the world wide web, access to the system is effected by giving the URL (Universal Resource Locator) of the website directly into the browser provided on the mobile terminal 110. Another possibility, frequently used to invite users to access the world wide web who are not yet familiar with the browser, is to send an SMS (Short Message Service) (or MMS); i.e., a request, with a given number or code which will lead to a first connection to the system 100. In FIG. 12 the vertical line on the left stands for the system 100, the vertical line in the middle stands for the WAP interface 170 between the system 100 and the radio network 120 and the vertical line on the right stands for the mobile terminal 110. The connecting process is to be followed from top to bottom.

Contact (initial contact) from the mobile terminal 110 to the receiving and transmitting means 170 is requested, as explained above, by selecting the URL of the portal 100 or receiving a SMS with the contact data for the portal 100, for example. Based on this information the mobile terminal 110 contacts the portal 100 via the receiving and transmitting means 170. This can be established by sending a SMS from the mobile terminal 110 to the receiving and transmitting means 170 of the system 100 or via sending a page request from the WAP browser of the mobile terminal 110 to the receiving and transmitting means 170.

Preferably, receiving and transmitting means 170 comprise a WAP gateway for receiving the page requests from the mobile terminals 110. The gateway fetches the requested page and binary-encodes it for passing the binary-encoded page to the mobile terminal 110. Pages comprising WML (Wireless Markup Language) or XHTML (Extensible Hyper-Text Markup Language) MP (Mobile Profile) are accessed via the WAP gateway. XHTML is the extension of HTML that enforces the strict syntax checking of XML and the Mobile Profile variant is a subset that addresses some of the constraints of mobile browsers.

The request for connection is received by a dispatcher 1210, which is symbolized by a rectangle on the interface. The dispatcher according to a preferred embodiment will be explained below.

By accessing portal 100 via WAP the IP address of the radio network operator's gateway can be used by the dispatcher for identifying the radio network operator via which the mobile phone 110 is connected to the portal 100. Accessing the portal via SMS the dispatcher uses the identification of the Short Message Service Centre for. It is of course possible to use other identification codes that may arise in the future.

After recognizing the network operator, the dispatcher looks up in a table, for example, the WAP tree or WAP page adapted to this operator. A WAP page defines the graphical interface between the system and the user showing menu points for the navigation of the user. The adapted or specific WAP page may include another language (English, German, French etc.) or drop or add specific menu points. Each of these WAP pages has its own URL. Therefore, the dispatcher redirects the request to the mobile terminal 110, giving the URL specific to the network operator to the mobile. Without any interaction of the user the mobile terminal 110 connects to the specific WAP tree. This is shown schematically in FIG. 12 by CONNECT to specific WAP tree".

Next, the mobile terminal characterizing unit 140 will be accessed. The mobile terminal characterizing unit 140 will identify the model of the mobile by reading the information given in the type allocation code (TAC) or the WAP user agent code and looking up the corresponding compatibility key 700 for this mobile model comprising the information about all digital standards supported and other specific characteristics of the mobile concerning display information. Once the display information have been retrieved from the characterizing unit 140 a decoding will be effected at the interface and the next action will be based on the display possibilities of the mobile terminal, the first bit field and the specific WAP page.

Depending on the system configuration, the user will then be automatically directed to his dedicated storage area or he will directly access the storage means 130 where he can select media content. The access to the storage means 130 will be effected via matching unit 140, thus the user can only see and select multi-media content which is adapted to his mobile terminal because the compatibility key 700 is used as a bit mask, masking content which is not compatible to the mobile.

Today's mobile terminals not only vary in screen size but also by supported mark-up language. Actually, the language HTML (Hyper Text Mark-up Language) usually used in WEB pages is not widely used on mobile phones but becomes more and more popular as the data transfer rate increases. Other languages used for creating mobile content for mobile phones are XHTML (Extensible HTML), WML (Wireless Mark-up Language) and CHTML (Compact HTML). Thus, before sending information to the mobile terminal 110 which has to be displayed in the browser of the mobile terminal 110, it is looked up in terminal characterizing unit 140 which display languages are supported by mobile 110. To adapt a WAP page easily to different languages and even to new emerging languages, a structure module is used, describing the WAP page structure in a META-language as XML, which is only in a last step transformed to a language as XHTML, WML or CHTML supported by the mobile terminal.

Figure 13:
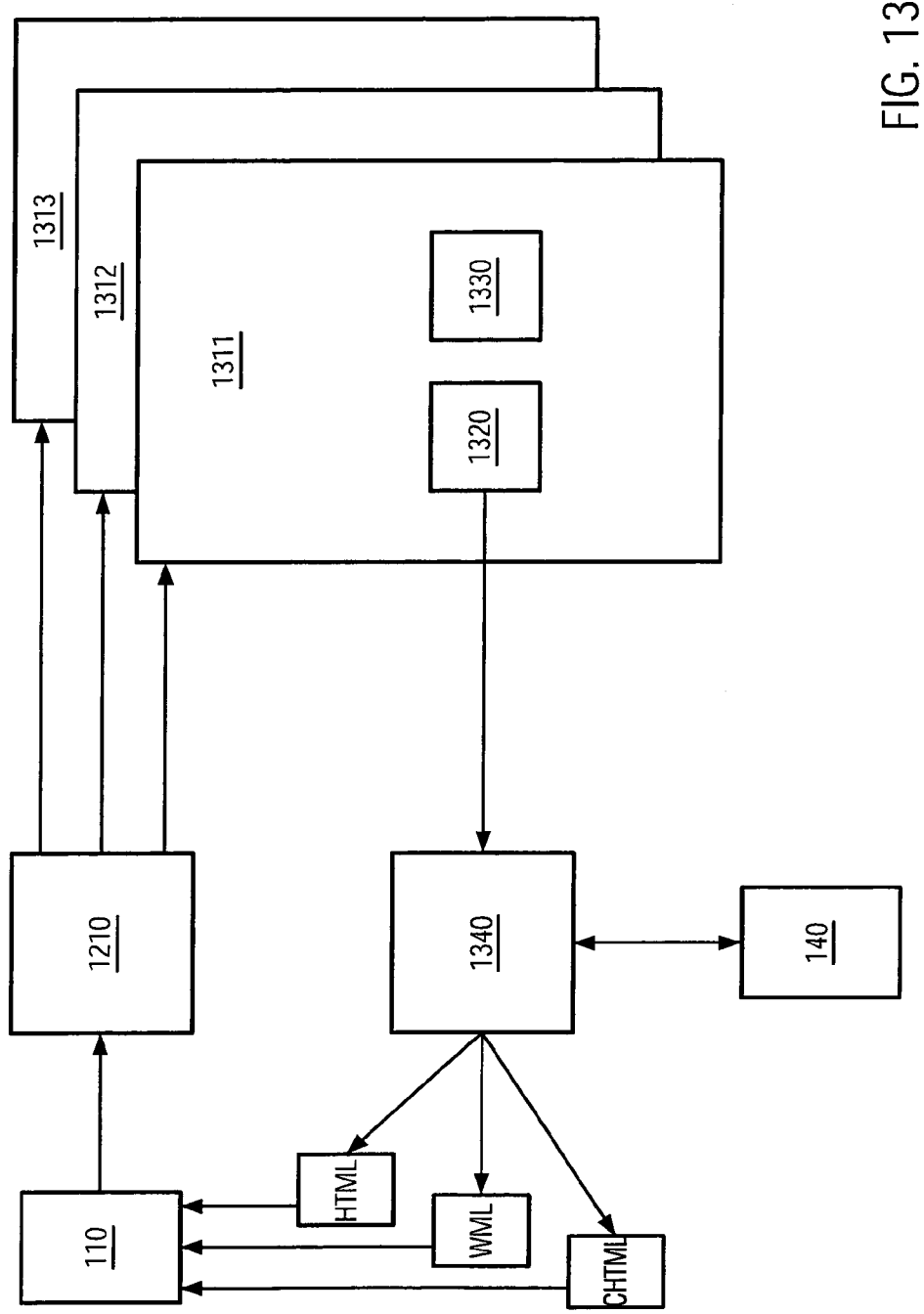
FIG. 13 is a schematic diagram showing the adaptation of the system to a mobile terminal by using a plurality of WAP trees according to a further aspect of the preferred embodiment of the invention.

FIG. 13 illustrates in another way of this aspect of individualization of mobile content for each model of mobile terminal 110. The mobile terminal 110 accesses the system via a dispatcher 1210. The dispatcher 1210 recognizes for example via the IP address of the radio network operator's gateway the network operator for this mobile terminal 110 and directs its request to the specific WAP tree 1311, 1312 or 1313. Of course there may be more than three WAP trees. Each WAP tree includes a structure module 1320 in which the composition or structure of the WAP page is defined in a META-language for example the wide spread XML. The WAP trees further include an action module or several action modules 1330 for defining actions like selecting a multi-media content. The structure defined in a META-language in the structure module 1320 is translated by a visualization unit 1340 into the language supported by the mobile terminal 110. Visualization unit 1340 looks up in the mobile terminal characterizing unit 140 which language is supported by the terminal 110. Depending on the language supported, visualization unit 1340 will translate the XML file given by structure module 1320 into XHTML, WML or CHTML, for example. In this language the WAP page will then be sent to the mobile terminal 110.

Figure 14:
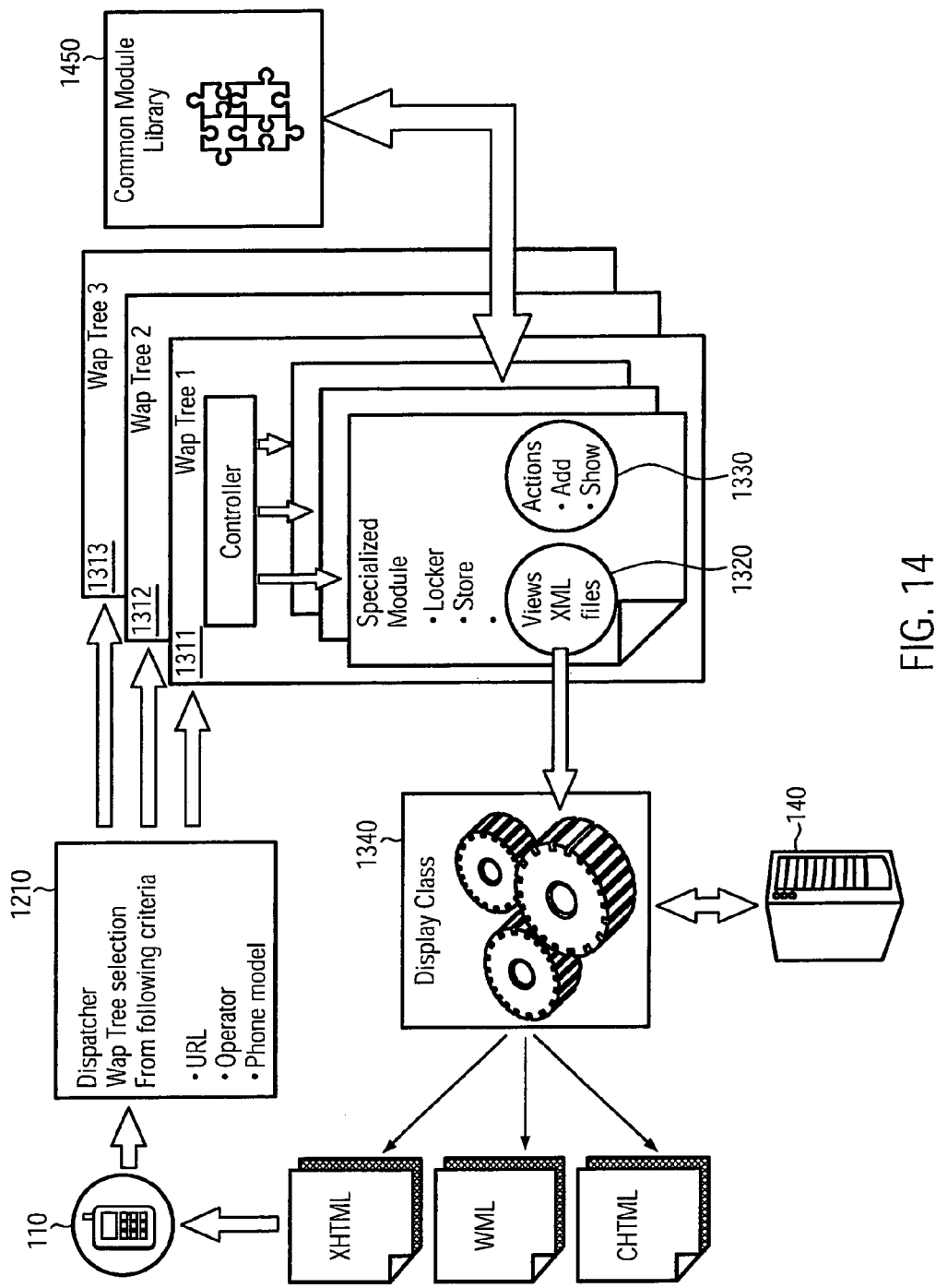
FIG. 14 is a more detailed schematic diagram showing the adaptation of the system to a mobile terminal by using a plurality of WAP trees as shown in FIG. 13.

FIG. 14 illustrates this aspect of individualization for each model of mobile terminal in more detail. The mobile terminal 110 accesses the system via the dispatcher 1210, which performs a WAP tree selection from the criteria of URL, network operator and mobile device model, for example phone model. The dispatcher 1210 recognizes for example the IP address of the radio network operator's gateway the network operator for this mobile. The type of the mobile terminal 110 is determined e.g. by terminal characterizing unit 140 via TAC code or USER AGENT code. The dispatcher 1210 directs the request accordingly to a specific WAP tree 1311, 1312 or 1313. Again, there may be more than three WAP trees.

Each WAP tree includes a specialized module which specifies content an functionalities for lockers, stores, "subscriber's exclusive zone", etc. according to the WAP tree selected. The design, functionality and the choice of the lockers, stores, "subscriber's exclusive zone", etc. depends of the on the WAP tree selected. The WAP trees further include the above mentioned two modules, the structure module 1320 and the action module or several action modules 1330.

The WAP pages of a specific WAP tree are based on a common module library 1450 which allows a basic functional setup for each of the content such as lockers, stores, "subscriber's exclusive zone", etc. provided via the specific WAP tree. The structure defined in a META-language in the structure module 1320 is translated by the visualization unit 1340 into the language supported by the mobile terminal 110; i.e., XHTML, WML or CHTML, for example. For this the visualization unit 1340 contacts the terminal characterizing unit 140 in order to obtain the information which language is supported by the terminal 110. Preferably, this is done by providing the compatibility key 700 for the mobile terminal 110. Depending on the language supported by the mobile terminal 110, the visualization unit 1340 translates the XML file provided by the visualization unit 1340 into XHTML, WML or CHTML, for example. The translated file is then sent via the WAP gateway and the receiving and transmitting means 170 to the mobile terminal 110.

3.2 Transcoding Cluster

As already explained with reference to FIG. 3, system 100 also provides a upload storage area 230 into which private multi-media content files may be stored. Private media content is, in contrast to the content stored in the storage means 130, preferably not protected by digital rights. Private multimedia content files use also a plurality of different digital formats. For transmitting a private photograph taken by a digital camera to a mobile, for example, another digital format is probably required. Equally, for the transfer of videos or pictures from one mobile terminal to another mobile terminal, the digital format must be changed, when the different terminals support different digital formats.

Figure 15:
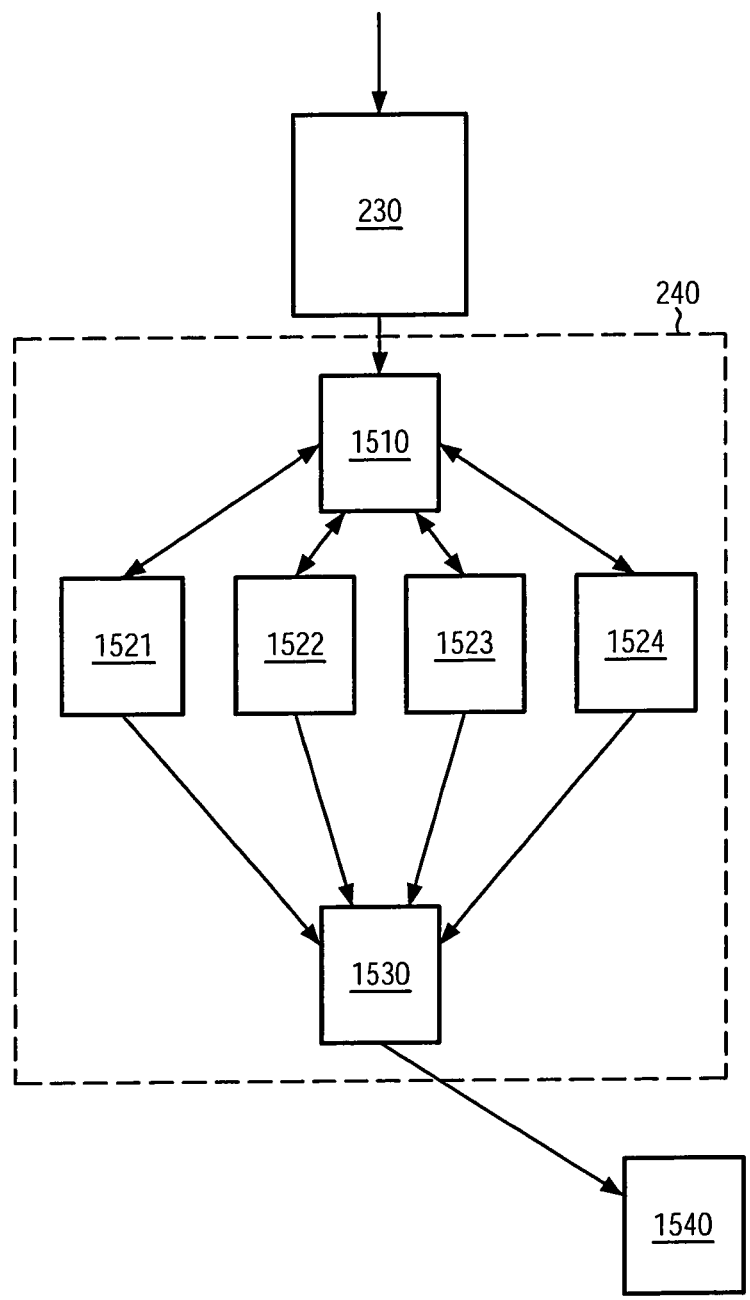
FIG. 15 is a schematic diagram of a transcoding cluster according to yet another aspect of the preferred embodiment of the invention.

Therefore, system 100 provides a transcoding cluster 240 which is shown in FIG. 15 with several transcoding units 1521 to 1524. The upload storage area 230 receives the content file uploaded by a user. The upload can be made via the WEB interface or the WAP interface of the receiving and transmitting means 170. If the user uploads via the WEB interface from his personal computer, the upload is facilitated by a program enabling the browser to see the private hard disc on the personal computer. The upload server checks whether the uploaded file is effectively a multi-media file. For this, the extension of the file name, as for example .jpg, is verified. Furthermore, the SHA hash functions are checked, hash functions include an encrypting algorithm and allow calculation of a check sum to verify the integrity of digital data. Both measures make sure that no multi-media content is uploaded which is protected by digital rights, i.e. which is encrypted. The upload storage area 230 further comprises means to ensure that any file is only uploaded once. All files stored in the upload storage area 230 are registered in a source shared directory 1510 thus forming a network area storage (NAS). The different transcoding units 1521 to 1524 included in the transcoding cluster 240 differ in the digital formats they can transcode. For example, transcoding unit 1521 may be able to transcode mobile videos, whereas transcoding unit 1522 may transcode ring tones and full tracks. Transcoding unit 1523 transcodes videos uploaded from the web, whereas transcoding unit 1524 may be adapted to transcode images uploaded from the desktop 210 or from the mobile terminal 110. Of course, this is only an example of organization of the transcoding cluster 240. A smaller or a higher number of transcoding units is of course possible with other transcoding capabilities.

Each transcoding unit 1521 to 1524 regularly scans the shared directory 1510 for new sources, respectively new files, and launches a transcoding process if a new file is found which the transcoding unit is able to transcode. Preferably, the scan is carried out in very short intervals, so that transcoding of a new file is started more or less instantaneously after uploading. For scanning the source shared directory 1510, a so-called daemon is used. If there are too many uploads at the same time, the transcoding programs will duplicate or clone themselves automatically. Therefore, a plurality of multi-media content files can be transcoded in parallel. After the transcoding process, all private uploaded multi-media content is available in all digital formats known to the transcoding cluster 240. The available files are stored in the upload storage area 230 and their addresses are inscribed in a destination shared directory 1530. Alternatively, as shown in FIG. 15 the available files are stored in an additional database 1540 in order to store these file separate from the originally uploaded private multi-media content files.

Figure 16:
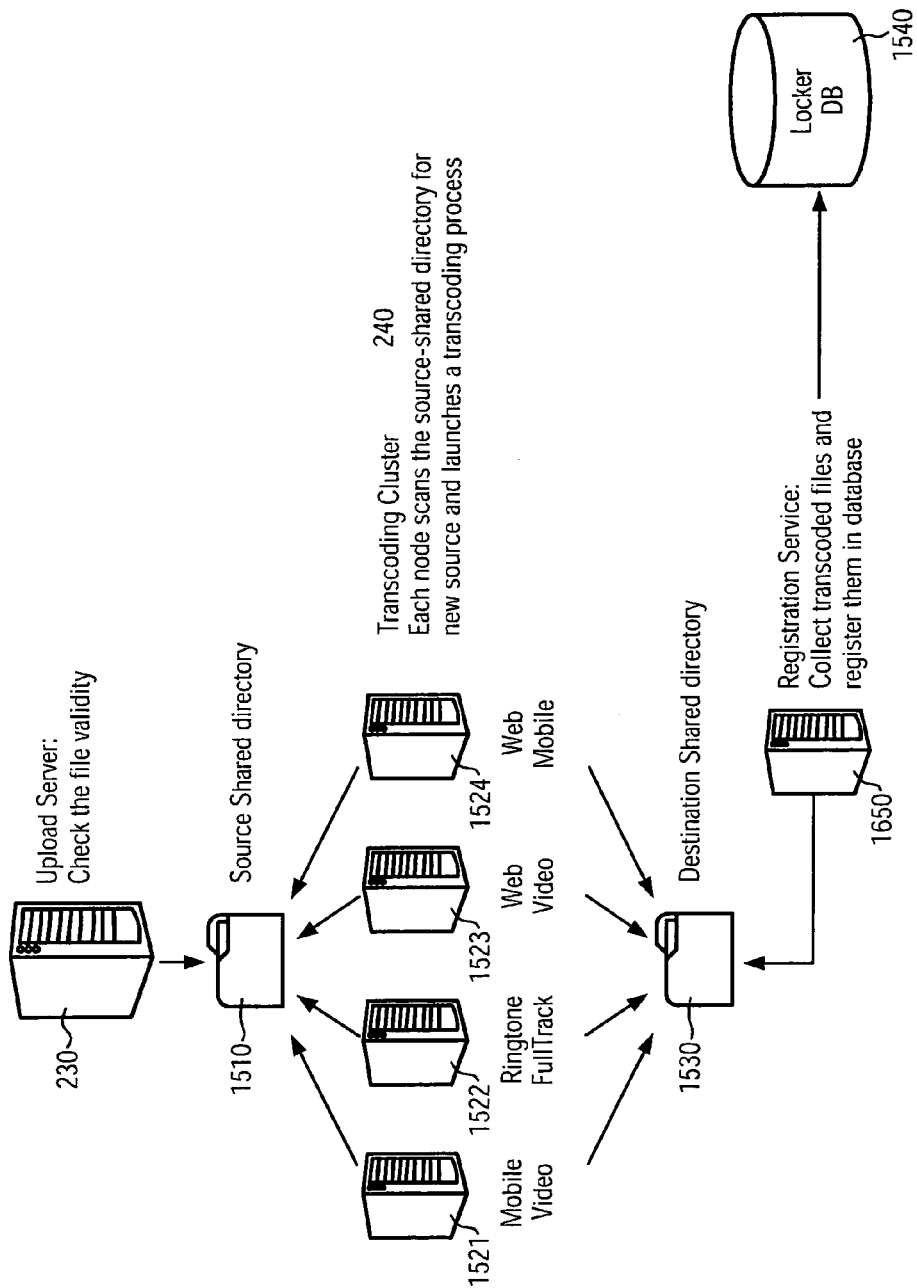
FIG. 16 is a further schematic diagram of a transcoding cluster shown in FIG. 15.

A transcoding cluster 240 according to a preferred embodiment of the invention is shown in detail in FIG. 16. Four transcoding units 1521 to 1524 are provided and are implemented by servers. Each transcoding unit preferably transcodes only one type of multi-media content file; i.e., music, pictures, etc. For example transcoding unit 1521 is adapted to transcode mobile video files uploaded from a mobile device only, transcoding unit 1522 is adapted to transcode music files such as ring tones and full track. The transcoding unit 1523 is adapted to transcode web video files having the formats WMA or WMV. The transcoding unit 1524 is adapted to transcode picture files. Preferably, an upload server is also included in the upload storage area 230 for receiving the content files uploaded by a user. A registration service 1650 collects the transcoded files and registers the transcoded files in the additional database 1540.

Figure 17:
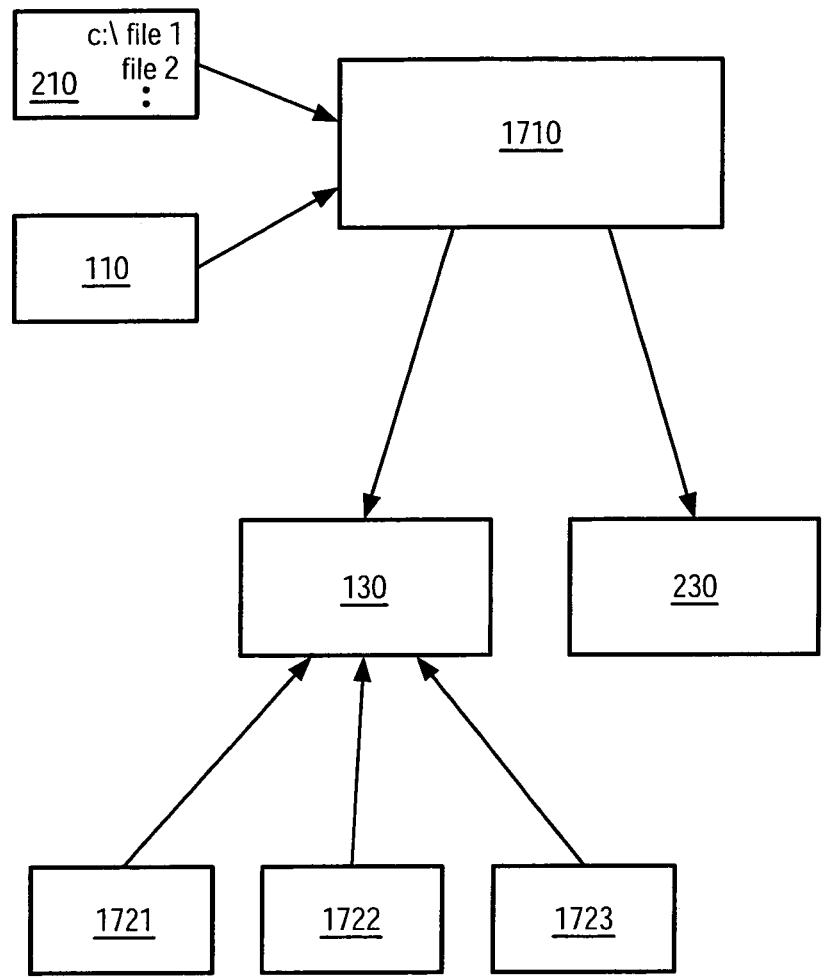
FIG. 17 is a schematic diagram showing a more detailed view of the system of FIG. 2 and in particular showing a dedicated storage area according to the preferred embodiment of the invention.

With reference to FIG. 17, the function of a dedicated storage area 1710 will now be explained. When accessing system 100 for the first time, each user automatically reserves a dedicated storage area 1710. The user can access his dedicated storage area by the WEB interface or the WAP interface of the receiving and transmitting means 170. The dedicated storage area 1710 is interconnected with the storage means 130 and with the upload storage area 230. Additionally, according to the alternative embodiment the dedicated storage area 1710 is also interconnected with the additional database 1540.

A user may purchase digital multi-media content which is protected by digital rights from the storage means 130, which gets its content from different content providers 1721, 1722 and 1723, for example. The content purchased will then be stored automatically in the user's dedicated storage area 1710 or, more precisely, a link or address to this content in the storage means 130 will be stored together with information about the size of this content in the user's dedicated storage area. Once the content, and respectively the address of the content, is stored in the dedicated storage area 1710, the user may download the content to his mobile terminal 110 or, if suitable, to his personal computer 210.

In the state of the art, if a user changes his mobile terminal 110, a content file as for example a ring tone he has once downloaded from a content provider is lost. With the dedicated storage area, a user changing his mobile terminal may re-download the same ring tone to his new mobile terminal. Thus the ring tone is not lost with the old mobile terminal.

Preferably, the dedicated storage area 1710 is part of a database system which also comprises the upload storage area 230, the storage means 130 and the additional database 1540.

In the case of upload of private content, the private content file is uploaded via the upload storage area 230 and stored passing by the transcoding cluster 240 in the additional database 1540 or the upload storage area 230. Alternatively, the transcoded multimedia files are stored in the dedicated storage area 1710. In that case, only a link to the private content files stored in the upload storage area 230 or the additional database 1540 is stored in the dedicated storage area 1710 as for the commercial multi-media content in storage means 130.

If a user wants to share private content with a friend who is also registered to system 100, he sends him a link to the content to be shared from his dedicated storage area 1710. For private content files there are generally no restrictions to any exchange. However, the system 100 preferably allows the user to set optional restrictions for the exchange of private content files. For exchanging a private content file from a first mobile terminal to a second mobile terminal, the first user uploads the content file to his dedicated storage area and sends a link to the content file to the second user. As transcoding is done immediately after uploading, the user has an impression of immediate transfer even if the two terminals do not support the same digital formats. Thus it is possible to exchange private content files between mobile phones at once, without bothering about the compatibility of phones and without knowing about the digital formats supported.

If a user wants to share content purchased from the storage means 130, i.e. content which is protected by digital rights, this is only possible if the content provider agrees. The content provider may, for example, limit the number of exchanges to five times. In this case, a digital multi-media content file purchased from database 130 is provided with means for counting transfer when stored in the dedicated storage area 1710, for controlling the number of exchanges.

A user may give a friend viewing access to his dedicated storage area 1710. In this case, the friend will only see such content in the dedicated storage area 1710 which is suitable to his proper mobile terminal, as matching unit 140 will put the bit mask of the friend's communication terminal over the content files purchased from the storage means 130, thus controlling immediately the compatibility.

3.3 Ingestion and Content Management

Figure 18:
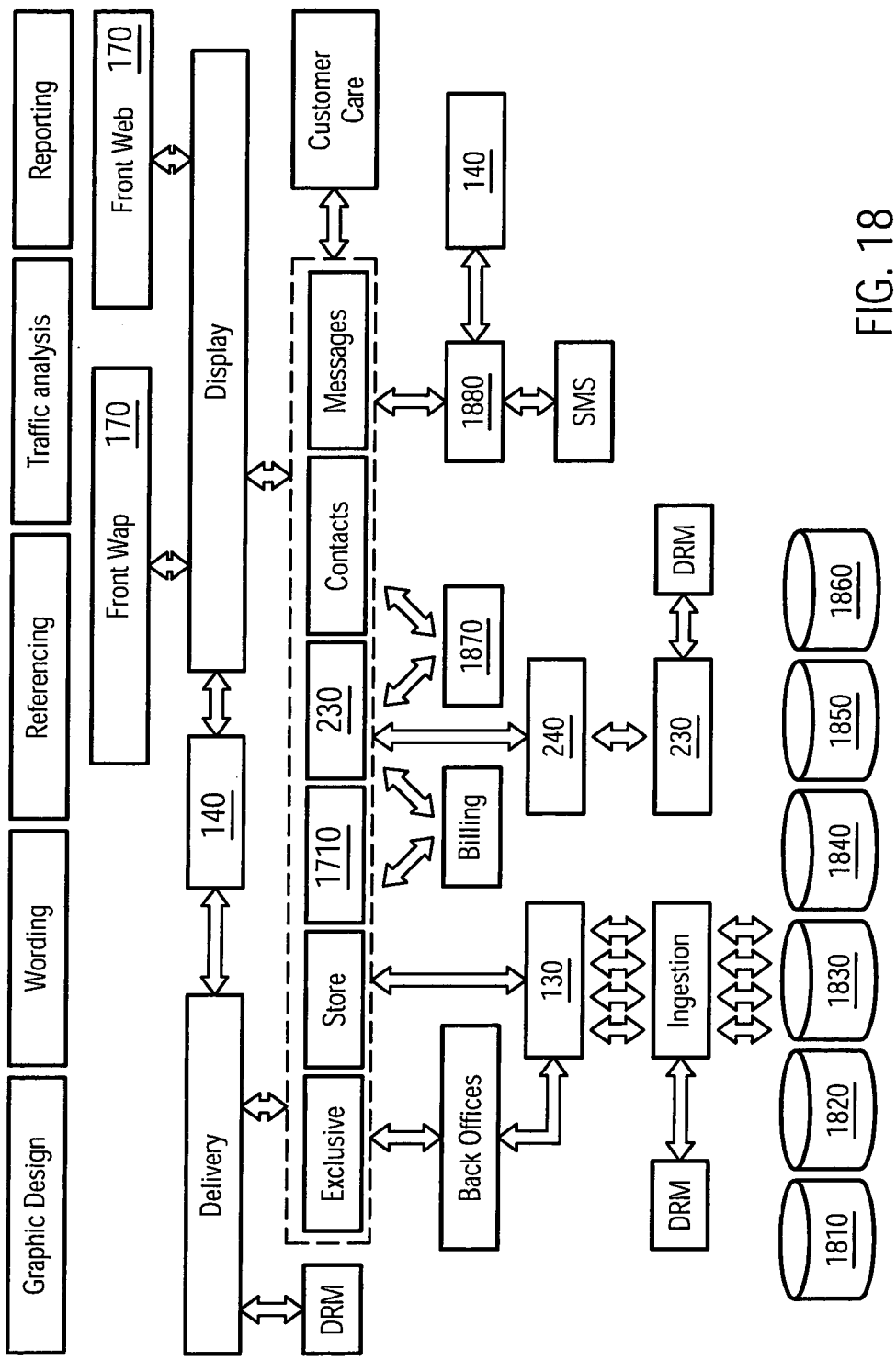
FIG. 18 is a schematic diagram of specific functional entities and in particular of an ingestion and contract management scheme in the system according to the preferred embodiment of the invention.

FIG. 18 shows an overview of specific functional entities of system 100 according to the preferred embodiment. The system 100 is fed with digital multi-media content from different commercial providers 1810, 1820, 1830, 1840, 1850 and 1860. The ingestion module collects the digital multi-media content of commercial providers and establishes the digital rights management (DRM) based on the specifications given by the content providers. There are different models possible and a number of default parameters related to the digital multi-media content are stored according to the specifications given by the content providers 1810, 1820, 1830, 1840, 1850 and 1860.

Firstly, it is to be decided in which digital format (for example MP3, etc) the multi media content will be provided by the content provider. It is possible to provide the digital multi-media content in only one digital format, which gives the best quality for reproducing the digital multi-media content on a mobile phone but this has the disadvantage that only some mobile terminals will be able to play this digital multi-media content. Preferably, the digital multi-media content is provided in several different digital formats, thus providing a compromise between quality of reproduction and number of mobile terminals supporting this format. The content provider may also accept a transcoding of his files, as described above. All information concerning the digital rights management (DRM) is entered into a database of the system 100.

Secondly, it is to be decided whether content bought by a user may be shared with other users. It is possible to allow free sharing, sharing with a limited number of friends or no sharing at all. For example, as mentioned above, a user of the mobile terminal 110 may have a dedicated storage area 1710 where he can store multi-media files that he has uploaded from the data sources 230 and share the stored multi-media files with other users. For this the user who uploaded and stored the files has the option to specify which stored multi-media files shall be shared with which users. Optionally, the user who uploaded and stored the files can specify the time how long specific stored multi-media files shall be shared. In order to differentiate his own private files, such as photographs that he has taken using the mobile terminal 110, which are not subject to digital rights management, from files uploaded from commercial databases, which are subject to digital rights management, two different storage areas may be provided. Alternatively, the user of the mobile terminal 110 may make his own private files subject to digital rights management.

Thirdly, the content provider may limit distribution of his digital multi-media content to the WEB or the WAP interface. This channel restriction is equally entered into a database of the system.

Fourthly, the content provider may limit distribution of his digital multi-media content to territories and authorized dates. As outlined above by accessing portal 100 via WAP the network address of the radio network operator's gateway is received by the portal 100. Via this network address the radio network operator can be identified and even "localized". Commercial and proprietary databases such as geocoded IP databases provide information on network addresses such as location (country, state, city, etc.), organization or company to which they belong. Via such databases the territory of the radio network operator can be identified. For this the portal 100 either comprises an additional database which provides geocoded IP address information or comprises an interface to an external database with geocoded IP address information or both.

Accessing the portal via SMS the dispatcher uses the identification of the Short Message Service Centre for determining the territory from which the mobile terminal 110 accesses the portal 100.

As the mobile gives with its identification (in the TAC code) also identification of the country where the mobile terminal is based, a mobile may be given no access to certain digital multi-media content files which are not authorized for its country of origin.

Fifthly, a certain stock is provided, where the amount of the digital copies of the multi-media content to be sold or downloaded is limited.

Sixthly, the content provider may agree or not to special offers or limitation of access to special users.

According to the digital rights agreed upon, the digital multi-media content is flagged. The digital formats in which the multi-media content is provided are marked in the digital format keys 750 and 750'.

When all digital rights are negotiated and noted the digital multi-media content files are stored in the storage means 130.

Content in the storage means 130 can be adapted to local needs. Local inputs on contents include price management on a local base, separation of different genre of content, an event management, a WEB homepage management and even provision of a welcome pack management.

A back office unit connected to database 130 will keep a record of the sales purchases, downloads and/or copies. Invoices, receipts and reports are preferably also produced by the back office unit.

Furthermore, portal 100 comprises a subscriber's exclusive zone unit (Exclusive) which is restricted to subscribers only. This exclusive zone provides access to specific features and offers of the store.

Any purchase from the store or from the subscriber's exclusive zone is factored via a billing unit which may be of course interconnected with the data provided by the back office unit.

The upload storage area 230 contains private content, as already explained above, which can be shared freely with friends. A digital rights management (DRM) control is provided which makes sure that no files are uploaded which are protected by digital rights. New files are uploaded via the upload storage area 230 passing by the transcoding cluster 240.

All users of system 100 are preferably provided with a private contact list, contacts including contact details of their private friends. Telephone numbers of the private friends are stored in a contact directory database 1870.

A user willing to share a content which is in his dedicated storage area 1710 or upload storage area 230, i.e. a commercial content which the user bought via the store, which is stored in storage means 130 and which is allowed to be shared or a private content which the user uploaded and stored via upload storage area 230, will send a message via a messages unit to his friend using the contact list stored in the contact directory database 1870. Preferably the message will be sent to the friend using an SMS passing by a messaging unit 1880.

The message will invite the friend to contact to system 100. When connecting, the mobile terminal characterizing unit 140 will detect all information concerning the mobile terminal of the friend. Thus, if the content the user wants to share is not compatible with the mobile terminal of the friend, the friend will not see the content file proposed for upload on its mobile terminal.

In a preferred embodiment, the compatibility keys 700 and 700' concerning the mobile terminals of friends are already included in the contact lists or in the contact directory database 1870 and the user can check before sending a message, whether his friend is able to see this content file, in the case of commercial multi-media content stored in storage means 130 or a private content stored in his dedicated storage area 1710 or upload storage area 230.

A customer care unit is provided which allows all necessary interactions in case of system failures or for providing help to users.

The user can connect to system 100 via the WAP interface 170 or via WEB interface 170. In both cases a display unit adapts the view according to the user, taking into account the network provider and the capabilities of the mobile device 110. The adaptation includes language constraints, display capabilities of the mobile device 110 in the case of WAP interface 170, menu limitations according to demands of network providers and so on. The display unit gets information from the mobile terminal characterizing unit 140 and outputs the multi-media content files and the WAP pages in accordance with the results of the dispatcher 1210.

A delivery unit carries out the actual download of a multi-media content file checking the digital rights and the mobile terminal characterizing unit 140.

System 100 is further preferably provided with a graphic design unit in which, separately from the system structure, the graphic views of the WEB and WAP pages are defined.

System 100 is further preferably provided with a wording unit in which, independently from actions the description for different menu points are defined in different human languages and/or adapted to demands of network providers.

System 100 is further preferably provided with a referencing unit for managing the references to the different multi-media content files.

System 100 is further preferably provided with a traffic analysis unit tracing all interactions in the system and thus providing information about any congestion problems and giving valuable information about user comportment.

System 100 is further preferably provided with a reporting unit delivering reports, for example about access to the different multi-media content files which are important for content providers.

Figure 19:
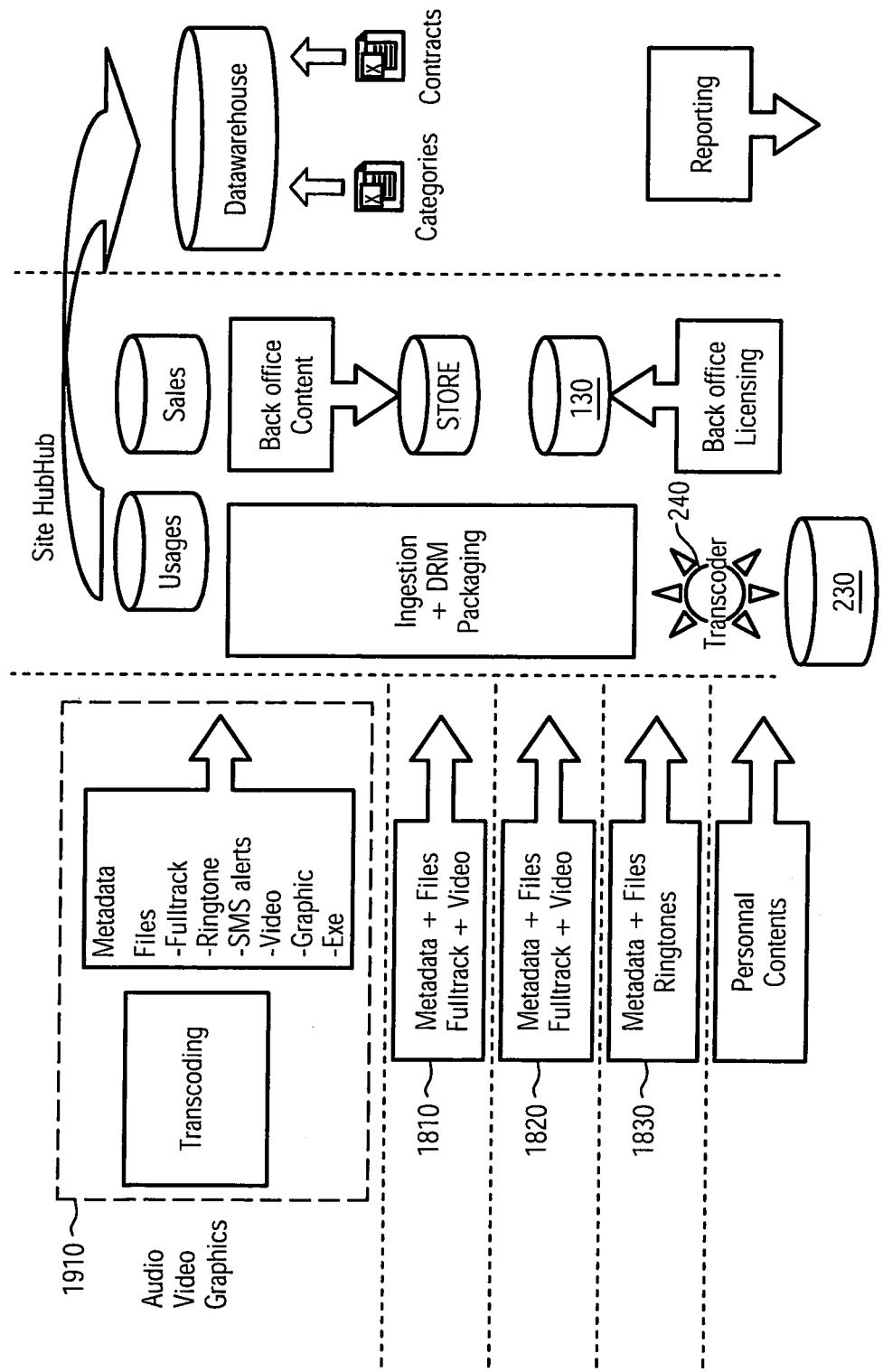
FIG. 19 is a more detailed schematic diagram of the ingestion and contract management scheme shown in FIG. 18.

FIG. 19 is a more detailed schematic diagram of the ingestion and contract management scheme shown in FIG. 18 according to a preferred embodiment. On the left hand side of FIG. 19 different content providers 1810, 1820 and 1830 of digital multi-media content are represented. All content providers 1810, 1820 and 1830 deliver additionally to the multi-media content files so-called Metadata which include information about the multi-media content files such as data format, kind or genre of content and others. These metadata are used to create the digital format keys 750 and 750' describing the digital formats in which the content is delivered. Unit 1910 delivers digital multi-media content of all sorts, i.e. audio, video, graphics. Although unit 1910 delivers commercial content unit 1910 allows transcoding of files which is visualized by a block transcoding. The multi-media content delivered by unit 1910 includes fulltrack, ringtone, SMS alerts, video, graphic and executable programs like video/computer games. Content provider 1810 delivers Metadata and files including fulltracks and videos. Content provider 1820 delivers Metadata and files including fulltracks and videos. Content provider 1830 delivers Metadata and files including ringtones. On the bottom of the left side personal content is represented which can also be put into system 100.

The personal content is uploaded into upload storage area 230, all content files are transcoded by transcoder 240.

The commercial content provided by content providers 1810, 1820 and 1830 is input to the ingestion unit, where the metadata is decoded for knowing and storing in which digital format (MP3, etc.) the multi media content is provided by the content providers 1810, 1820 and 1830. It is possible to provide the digital multi-media content in only one digital format, which gives the best quality for reproducing the digital multi-media content on a mobile phone but which has the inconvenience that only some mobile terminals will be able to play this digital multi-media content. Preferably, the digital multi-media content is provided in several different digital formats, thus providing a compromise between quality of reproduction and number of mobile terminals supporting this format. The content provider may also accept a transcoding of his files as does unit 1910. All information concerning the digital rights management (DRM) are entered into a database of the system.

The database contains also information concerning whether content bought by a user may be shared with other users. It is possible to allow free sharing, sharing with a limited number of friends, sharing for a limited time or no sharing at all or a combination of the above. This information may be given by the metadata or entered into the database after contracting.

The content provider may limit distribution of his digital multi-media content to the WEB or to the WAP interface. This channel restriction is equally entered into a database of the system. The content provider may equally limit distribution of his digital multi-media content to territories and authorized dates. As the mobile gives with his identification also identification of the country where the mobile terminal is based, a mobile may be given no access to certain digital multi-media content files which are not authorized for its country.

Although only one digital file is given for a specific multi-media content with a specific digital format from the content provider, this file represents a certain stock or a certain number of files, therefore, the digital multi-media content is limited to a certain number of resell which is followed up by the system 100 and which is entered into the database.

Further information entered into the database is whether the content provider agrees or not to special offers or limitation of access to special users for the provider's content.

According to the digital rights agreed upon the digital multi-media content is flagged. The digital formats in which the multi-media content is provided are marked in the second bit field.

When all digital rights are negotiated and noted the digital multi-media content files are stored in the storage means 130 which is connected to a back office managing the before mentioned digital rights and licensing agreements with the content providers.

The users purchase the multi-media content files via a store, which is accessible via a graphic representation showing the different multi-media contents available for sale.

Usages of the system and sales are reported inside the system and stored in a data warehouse, sorted by categories and/or contracts.

A reporting unit allows preparation of all sort of statistics.

As outlined above the embodiments of the present invention can be implemented in various ways using hardware and software. It is recognized that the various above mentioned methods as well as the various logical blocks and modules described above may be implemented or performed using computing devices, as for example general purpose processors, digital signal processors (DSP), application specific integrated circuits (ASIC), field programmable gate arrays (FPGA) or other programmable logic devices, etc. The various embodiments of the present invention may also be performed or embodied by a combination of these devices.

Further, the various embodiments of the present invention may also be implemented by means of software modules which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc.

Moreover, the various embodiments of the present invention may also be implemented by means of distributed servers and databases in a local area network or in a distributed network.

The various embodiments of the present invention as described above have the advantage that they provide the possibility that multi-media content is provided depending on the capabilities of the mobile terminal via which the multi-media content has been requested. As the various models of mobile terminals vary drastically in its capabilities, not every multi-media content can be displayed or played or decoded on every mobile terminal. Therefore, it might happen that the user downloads via mobile terminal multi-media content which then cannot be displayed, played or decoded on the mobile terminal.

In order to avoid such a situation, the inventive system and method is provided which automatically filters multi-media content in accordance with the capabilities of the mobile terminal via which the mobile content is requested. In many cases the user of the mobile terminal even does not know the capabilities of the mobile terminal, in particular not the very specific ones which are necessary to know to specify all digital formats which are supported by the mobile terminal used. Therefore, the inventive system and method provides a database with compatibility codes, preferably compatibility key, in which information is provided which indicates the capabilities of respective mobile terminals. As the model of the mobile terminal is automatically detected by the inventive system and method, the respective compatibility key for a model or type of mobile terminal sending the request can be retrieved. Thus, it is not necessary for the user of the mobile terminal to register the capabilities of the mobile terminal by himself or herself. Furthermore, there is no need to identify the mobile terminal manually. As the user does not need to specify the capabilities of his mobile terminal in his profile, he can access the inventive system via a variety of mobile terminals. In every case he will be provided only with the content which is supported by the mobile terminal actually in use. This provides a high flexibility of the system and a high level of user friendliness.

The invention claimed is:

1. A system for accessing multi-media content, the system being adapted to be accessed by a mobile terminal through a radio network, the system comprising:

storage adapted to store a plurality of multi-media content files having different digital formats;

a mobile terminal unit adapted to provide mobile terminal capabilities information indicating at least one capability of the mobile terminal; and a matching unit adapted to identify a subset of the plurality of multi-media content files having at least one specific digital format wherein the at least one specific digital format is supported by the at least one capability of the mobile terminal, wherein the system is adapted to provide the subset of the plurality of multi-media content files having the at least one supported digital format to the mobile terminal, wherein the mobile terminal unit is further adapted to receive terminal identification information from the mobile terminal and to provide the terminal capabilities information based on the terminal identification information, and the matching unit is further adapted to identify the subset of the plurality of multi-media content files based on the terminal capabilities information, wherein the terminal capabilities information is a bit key of a specific length, and the storage is further adapted to store multi-media format information corresponding to each of the plurality of multi-media content files, wherein the system further comprises a receiver and transmitter for receiving a request from the mobile terminal for specific multi-media content files, and the mobile terminal unit is further adapted to identify a type and/or a model of the mobile terminal accessing the system based on the terminal identification information and to retrieve the terminal capabilities information based on the identified type and/or model of the mobile terminal, and wherein the bit key has a length of 256 bits and specific bit positions of the bit key represent specific capabilities of the identified type and/or model of the mobile terminal, wherein the multi-media format information has a length of 256 bits and specific bit positions of the multi-media format information correspond to specific digital formats, and wherein a specific digital format supported by a specific capability has the same bit position in the multi-media format information as the specific capability in the bit key.

2. The system according to claim 1, wherein the mobile terminal unit further comprises a database, wherein the terminal capabilities information is stored, and wherein the mobile terminal unit is further adapted to get the terminal capabilities information from the database corresponding to the terminal identification information.

3. The system according to claim 1, wherein the terminal identification information comprises terminal capabilities information.

4. The system according to claim 1, wherein the matching unit is further adapted to identify the subset of multi-media content files by comparing the bit key with the multi-media format information.

5. The system according to claim 1, wherein the matching unit is further adapted to give the mobile terminal access only to the subset of the specific multi-media content files.

6. The system according to claim 1, wherein the system is adapted to provide no access to multi-media content files having digital formats which are not supported by the at least one capability of the mobile terminal.

7. A method for accessing multi-media content by a mobile terminal through a radio network, the method comprising:
storing a plurality of multi-media content files having different digital formats;
providing mobile terminal capabilities information indicating at least one capability of the mobile terminal;
identifying a subset of the plurality of multi-media content files having at least one specific digital format wherein the at least one specific digital format is supported by the at least one capability of the mobile terminal; and
providing the subset of the plurality of multi-media content files having the at least one supported digital format to the mobile terminal,
wherein the step of providing mobile terminal capabilities information comprises the sub step of receiving terminal identification information from the mobile terminal, the terminal capabilities information is provided based on the terminal identification information, and the subset of the plurality of multi-media content files is identified based on the terminal capabilities information,
wherein the terminal capabilities information is a bit key of a specific length, and multi-media format information corresponding to each of the plurality of multi-media content files is stored,
wherein the method further comprises receiving a request from the mobile terminal for specific multi-media content files, identifying a type and/or a model of the mobile terminal accessing the system based on the terminal identification information and retrieving the terminal capabilities information based on the identified type and/or model of the mobile terminal, and
wherein the bit key has a length of 256 bits and specific bit positions of the bit key represent specific capabilities of the identified type and/or model of the mobile terminal, wherein the multi-media format information has a length of 256 bits and specific bit positions of the multi-media format information correspond to specific digital formats, and wherein a specific digital format supported by a specific capability has the same bit position in the multi-media format information as the specific capability in the bit key.

8. The method according to claim 7, wherein the terminal capabilities information is stored in a database, and wherein the terminal capabilities information is received from the database corresponding to the terminal identification information.

9. The method according to claim 7, wherein the terminal identification information comprises terminal capabilities information.

10. The system according to claim 7, wherein the subset of multi-media content files is identified by comparing the bit key with the multi-media format information.

* * * * *